US011465250B2

(12) United States Patent
Chen

(10) Patent No.: US 11,465,250 B2
(45) Date of Patent: Oct. 11, 2022

(54) TOOL CHANGE UNIT AND TOOL CHANGE DEVICE INCLUDING SAME

(71) Applicant: Chun-Chieh Chen, Taichung (TW)

(72) Inventor: Chun-Chieh Chen, Taichung (TW)

( * ) Notice: Subject to any disclaimer, the term of this patent is extended or adjusted under 35 U.S.C. 154(b) by 139 days.

(21) Appl. No.: 15/930,444

(22) Filed: May 13, 2020

(65) Prior Publication Data

US 2020/0376618 A1     Dec. 3, 2020

(30) Foreign Application Priority Data

May 28, 2019   (TW) .................................. 108118455

(51) Int. Cl.
*B23Q 3/157* (2006.01)
*B23Q 3/155* (2006.01)

(52) U.S. Cl.
CPC ....... *B23Q 3/1554* (2013.01); *B23Q 3/15526* (2013.01); *B23Q 3/15534* (2016.11); *B23Q 3/15553* (2013.01); *B23Q 3/15722* (2016.11); *B23Q 3/15724* (2016.11); *B23Q 3/15726* (2013.01); *B23Q 3/15746* (2013.01); *B23Q 2003/15527* (2016.11); *B23Q 2003/15531* (2016.11); *B23Q 2003/155421* (2016.11); *B23Q 2003/155425* (2016.11); *B23Q 2003/155428* (2016.11); *B23Q 2003/155432* (2016.11);

(Continued)

(58) Field of Classification Search
CPC ......... Y10T 483/1762; Y10T 483/8136; Y10T 483/1764; Y10T 483/1781; Y10T 483/1882; B23Q 2003/155432; B23Q 2003/155421; B23Q 3/15534; B23Q 2003/15531; B23Q 3/15722; B65G 47/904; B65G 47/907

USPC .................................... 483/42, 62, 43, 50, 67
See application file for complete search history.

(56) References Cited

U.S. PATENT DOCUMENTS 3,492,717 A * 2/1970 Russell ................ B23Q 3/1574
                                                                    483/42
3,608,188 A * 9/1971 Seidel ................ B23Q 3/15713
                                                                    483/68
3,719,987 A * 3/1973 Seidel .................. B23Q 3/1574
                                                                    483/42

(Continued)

FOREIGN PATENT DOCUMENTS

CN      201042764 Y  *  4/2008
CN      201856112 U  *  6/2011
(Continued)

OTHER PUBLICATIONS

Machine Translation of JP 04-002436-A, which JP '436 was published Jan. 1992.*

(Continued)

*Primary Examiner* — Erica E Cadugan
(74) *Attorney, Agent, or Firm* — Leong C. Lei

(57) ABSTRACT

A tool change unit includes a base and two tool arms rotatably mounted on the base and respectively located on two sides of the base. Each arm body includes a position-returning element, a gripping element, and an actuation element. The position-returning element enables the tool arm to rotate for upward and downward moving between a first position and a second position. The gripping element functions to grip a main-axle tool or a magazine tool. The tool change unit is combinable with a power unit to form a tool change device. The power unit drives the tool change unit to do rotation or rotation and upward and downward movement.

20 Claims, 47 Drawing Sheets

(52) U.S. Cl.
CPC .............. *B23Q 2003/155439* (2016.11); *Y10S 483/902* (2013.01); *Y10T 483/1762* (2015.01); *Y10T 483/1809* (2015.01); *Y10T 483/1836* (2015.01); *Y10T 483/1882* (2015.01); *Y10T 483/1891* (2015.01)

(56) References Cited

U.S. PATENT DOCUMENTS

| | | | | |
|---|---|---|---|---|
| 3,722,711 | A * | 3/1973 | Seidel | B23Q 3/1554 483/42 |
| 4,835,838 | A * | 6/1989 | Hirose | B23Q 3/15706 483/54 |
| 5,134,767 | A * | 8/1992 | Yasuda | B23Q 3/15534 483/47 |
| 5,704,885 | A * | 1/1998 | Lee | B23Q 3/15526 483/65 |
| 5,908,374 | A * | 6/1999 | Kato | B23Q 3/16 483/42 |
| 5,947,877 | A * | 9/1999 | Wei | B23Q 3/15526 483/62 |
| 2021/0379713 | A1 * | 12/2021 | Sun | B23Q 16/025 |

FOREIGN PATENT DOCUMENTS

| | | | |
|---|---|---|---|
| FR | 2242195 A1 | * | 3/1975 |
| FR | 2243776 A | * | 4/1975 |
| JP | 57-054044 A | * | 3/1982 |
| JP | 01-115540 A | * | 5/1989 |
| JP | 04-002436 A | * | 7/1992 |
| JP | 2005-271179 A | * | 10/2005 |
| KR | 10-2011-0064327 A | * | 6/2011 |

OTHER PUBLICATIONS

Machine Translation of JP 2005-271179-A, which JP '179 was published Oct. 2005.*
Machine Translation of FR 2243776-A, which FR '776 was published Apr. 1975.*
Machine Translation of CN 201042764-Y, which CN '764 was published Apr. 2008.*
Machine Translation of CN 201856112-U, which CN '112 was published Jun. 2011.*

* cited by examiner

TOOL CHANGE UNIT AND TOOL CHANGE DEVICE INCLUDING SAME

TECHNICAL FIELD OF THE INVENTION

The present invention relates generally to a tool change device of a metalworking machine, and more particularly to a tool change unit that enables tool change through upward/downward movements of a main axle or achieves tool change through upward/downward movements and rotational movements of a tool change device.

DESCRIPTION OF THE PRIOR ART

Contemporary automatic metalworking machines are mostly equipped with tool magazines and automatic tool changers. The tool magazine receives and holds a number of tools that provide different effects of cutting or have different shapes and sizes. The automatic tool changer carries out change of tools between the tool magazine and the working machine.

Reference is made to Taiwan Utility Model Publication No. 106202581, which will be referred to as the first reference document, disclosing a tool gripper position-returning mechanism of an automatic tool change system. As shown in FIGS. 1 and 2, the first reference document uses a tool magazine, which is commonly referred to as a grip arm style tool magazine 12, in which a main axle 11 is movable upwards and downwards to allow the main axle 11 to make a change with a selected tool in the grip arm style tool magazine 12. As shown in FIGS. 1 and 2, the grip arm style tool magazine 12 is mounted to a front side of the main axle 11 in order to allow tool change to be carried out easily and efficiently. However, there are drawbacks as follows:

Firstly, no large number of tools can be used. This is because when a large number of tools are involved, the entire size of the grip arm style tool magazine 12 would become extremely bulky and would cause interference with a front side 13 of a metalworking machine 10 that requires often opening and closing. Since the grip arm style tool magazine 12 cannot hold a relatively large number of tools, any need for diversification of metal working that the metalworking machine 10 used in combination with the grip arm style tool magazine 12 may work on would not be met.

Secondly, to select a tool in the grip arm style tool magazine, the operation of tool selection can be performed only when the main axle has moved upward away from the magazine so as not to interfere with the operation of the magazine. This makes the efficiency of tool change poor.

Thirdly, in case that a large number of tools is involved, the diameter of the grip arm style tool magazine must be greatly enlarged so that to change with a tool at an opposite side, the distance that the tool needs to move is greatly extended, making the time required for change of the tool increased, and consequentially, leading to a similar problem of poor tool change efficiency.

Additional reference is made to Taiwan Utility Model Publication No. 107202369, which will be referred to as the second reference document, disclosing a tool change mechanism of a processing machine. As shown in FIGS. 3-7, the second reference document uses a cam style tool change device 20 in combination with a circular disc style tool magazine 24 and tool change is generally carried out by having the cam style tool change device 20 drive a tool change arm 23 to move upwards and downwards and rotate. The cam style tool change device 20 is made up of a drive motor 21 and a cam box 22. The drive motor 21 drives a toothed cam 201 and a planar cam 203 to rotate so as to drive a cogged wheel 202 mounted on a rotational axle 205 and a crankarm 204 rotatably mounted to the planar cam 203, so that the rotational axle 205 may drive a tool change arm 23 mounted under the rotational axle 205 to move upwards and downwards and rotate. Referring to FIGS. 7 and 4, the prior art cam style tool change device 20 has a movement locus that makes the tool change arm 23 assumes a standby position and, after a magazine tool 207 and a main axle tool 206 are both set at tool gripping positions, makes the tool change arm 23 rotate counterclockwise for 90 degrees to finish a tool gripping operation. Referring to FIG. 5, the tool change 23, upon finishing the tool gripping operation, is driven to move downwards to a predetermined location and then rotate counterclockwise for 180 degrees to carry out tool change so that the positions of the magazine tool 207 and main axle tool 206 switch with each other. Further referring to FIG. 6, the tool change arm 23 is then driven to move upwards to a predetermined location to carry out a tool insertion operation to have the original main axle tool 206 inserted into the circular disc style tool magazine 24 and the magazine tool 207 inserted into the main axle 25. The tool change arm 23 then rotate clockwise for 90 degrees to resume the standby position. In such an arrangement of the prior art cam style tool change device 20 in combination with the circular disc style tool magazine 24, the circular disc style tool magazine 24 is located beside, rather than in front of, the main axle 25, so that it is possible to provide a greater number of tools without causing interference with the front side of the metalworking machine that requires often opening and closing. However, such an arrangement suffers two shortcomings. The first is that the cam box 22 has a complicated structure and machining of the planar cam 203 and the toothed cam 201 is difficult and is hard to control the precision thereof. This consequentially makes the production cost high. The second shortcoming is that the tool change arm 23 must rotate for 360 degrees in order to complete a cycle of tool change and this makes the tool change efficiency poor;

SUMMARY OF THE INVENTION

The primary objective of the present invention is to provide a tool change unit and a tool change device including the tool change unit, wherein the tool change unit is equally applicable to tool change performed with upward and downward movement of a main axle or performed with upward and downward movement and rotation of a tool change device, so that the tool change unit is limited to one specific way of tool change and possess expanded applicability.

Another objective of the present invention is to provide a tool change unit and a tool change device including the tool change unit, wherein the tool change unit performs tool change in a rotating way and is usable in combination with a circular disc style tool magazine or a chain style tool magazine for tool change and thus allows an arrangement of a large number of tools in the tool magazine, allowing the need for diversification of machining of a metalworking machine to be satisfied.

A further objective of the present invention is to provide a tool change unit and a tool change device including the tool change unit, wherein two tool arms of the tool change unit being drivable to rotate for downward movement does not interfere with a normal downward movement of a main axle, so that the tool change unit completes a tool change operation by making only rotation of 180 degrees thereby effectively shortening the time needed for tool change.

Yet a further objective of the present invention is to provide a tool change unit and a tool change device including the tool change unit, wherein two tool arms of the tool change unit being drivable to rotate for upward and downward movement makes it possible to provide a power unit that is used to drive the tool change unit with flexibility of selection among various models.

Thus, the present invention provides a tool change unit, which at least comprises: a base and two tool arms rotatably mounted on the base and respectively located on two sides of the base, the base comprising a coupling section for coupling to a power unit, each of the tool arms comprising an arm body, a position-returning element, a gripping element, and an actuation element;

wherein the arm body has one end forming a pivoting end coupled to the base and an opposite end forming a gripping end that is mounted with a gripping element;

the position-returning element is arranged and connected between the arm body and the base, so that by means of the arrangement of the position-returning element, the arm body is rotatable for moving upwards and downwards between a first position and a second position;

the gripping element is formed with an opening for gripping and holding a tool bar;

the actuation element is mounted on the arm body and is adapted to be driven by a main axle to cause the arm body to rotate for downward moving.

The above tool change unit is used in combination with a power unit that drives the tool change unit for 180-degree rotation to form a tool change device. The power unit comprises a servomotor having a rotational axle or may alternatively comprises a drive motor in combination with an indexing device as a substitute for the servomotor. The above two types of tool change device are applicable in a mode in which tool change is carried out by means of upward/downward movement of a main axle.

The tool change unit is also usable in combination with a power unit that drives the tool change unit to perform upward and downward movement and rotating motion to alternatively form a different type of tool change device. The power unit may comprise a known cam box in combination with a drive motor or alternatively comprises a pneumatic cylinder or a rotational axle in combination with a servomotor to achieve an operation of upward and downward movement and rotating motion of the tool change unit. The two types of tool change device requires no upward and downward movement of a main axle for tool change and is instead provided that the power unit itself exhibits a property of driving the tool change unit to move upwards and downwards and rotate for tool change.

It can be appreciated from the above description that the tool change unit is equally applicable to tool change performed with upward and downward movement of a main axle or performed with upward and downward movement of a tool change device, so that the tool change unit is limited to one specific way of tool change and possess expanded applicability. Further, tool arms of the tool change unit may automatically rotate for downwards or upwards moving by following the upward and downward movement of the main axle, so that the tool change unit does not interfere with a normal downward movement that the main axle takes for carrying out a machining operation. A such, a tool change operation that is carried out with the tool change unit driven by the power unit can be completed with just rotation of 180 degrees, so that the time required for tool change can be effectively reduced.

DETAILED DESCRIPTION OF THE PREFERRED EMBODIMENT

Figure 1:
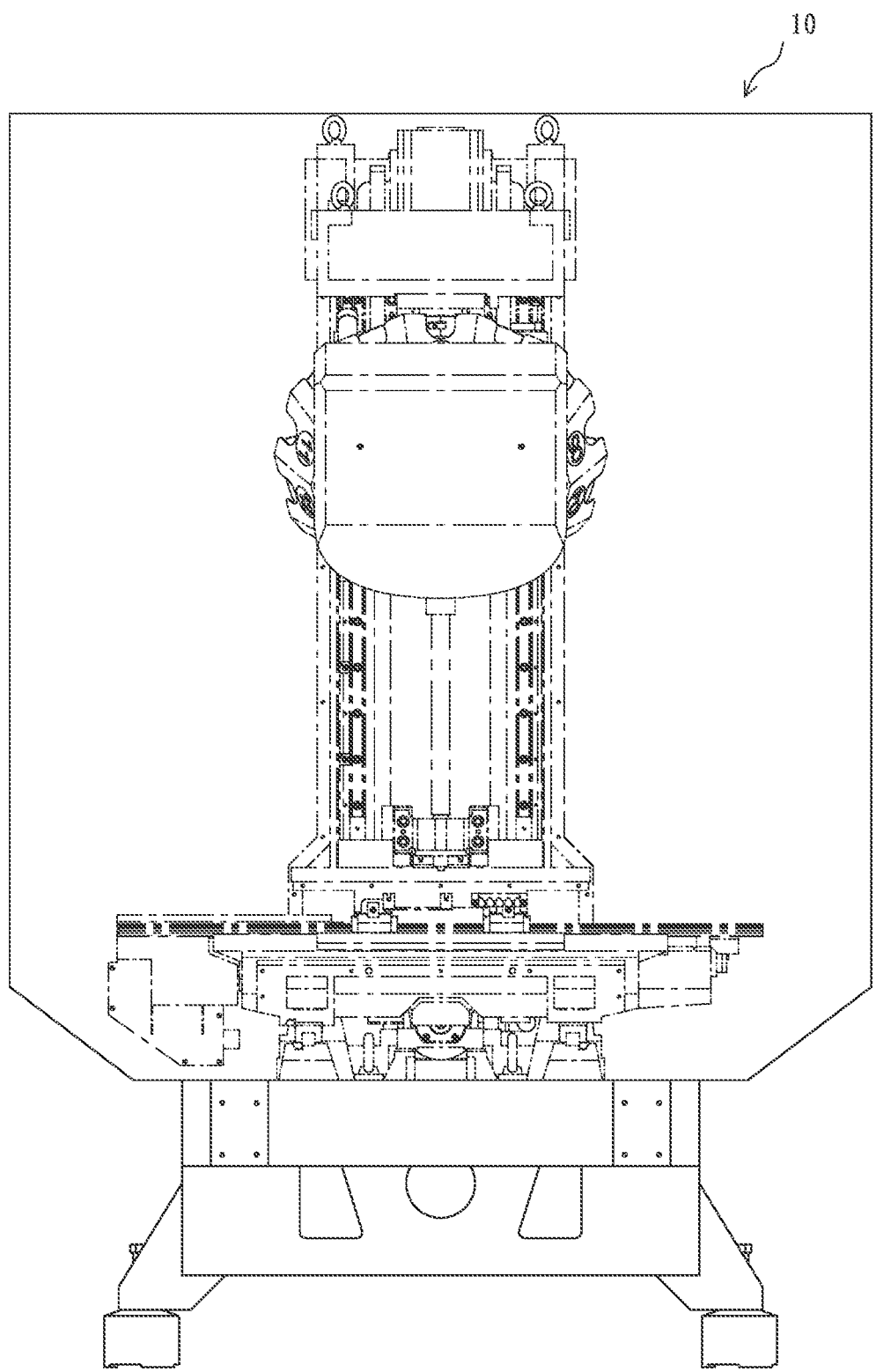
FIG. 1 is a front view showing a grip arm style tool magazine used in a metalworking machine.
Figure 2:
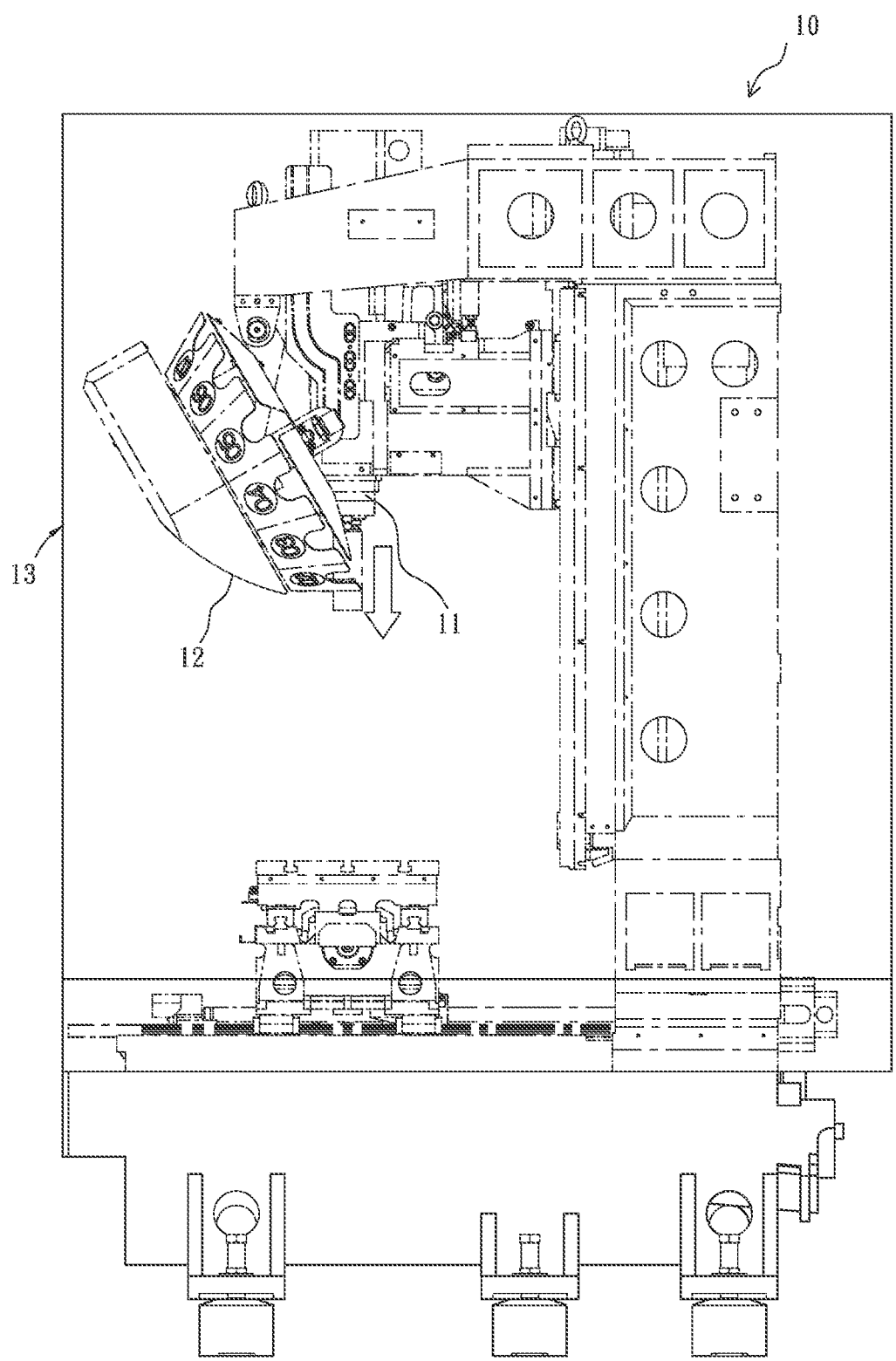
FIG. 2 is a right-side elevational view showing the grip arm style tool magazine used in the metalworking machine to illustrate tool change carried out with upwards and downwards movement of a main axle.
Figure 3:
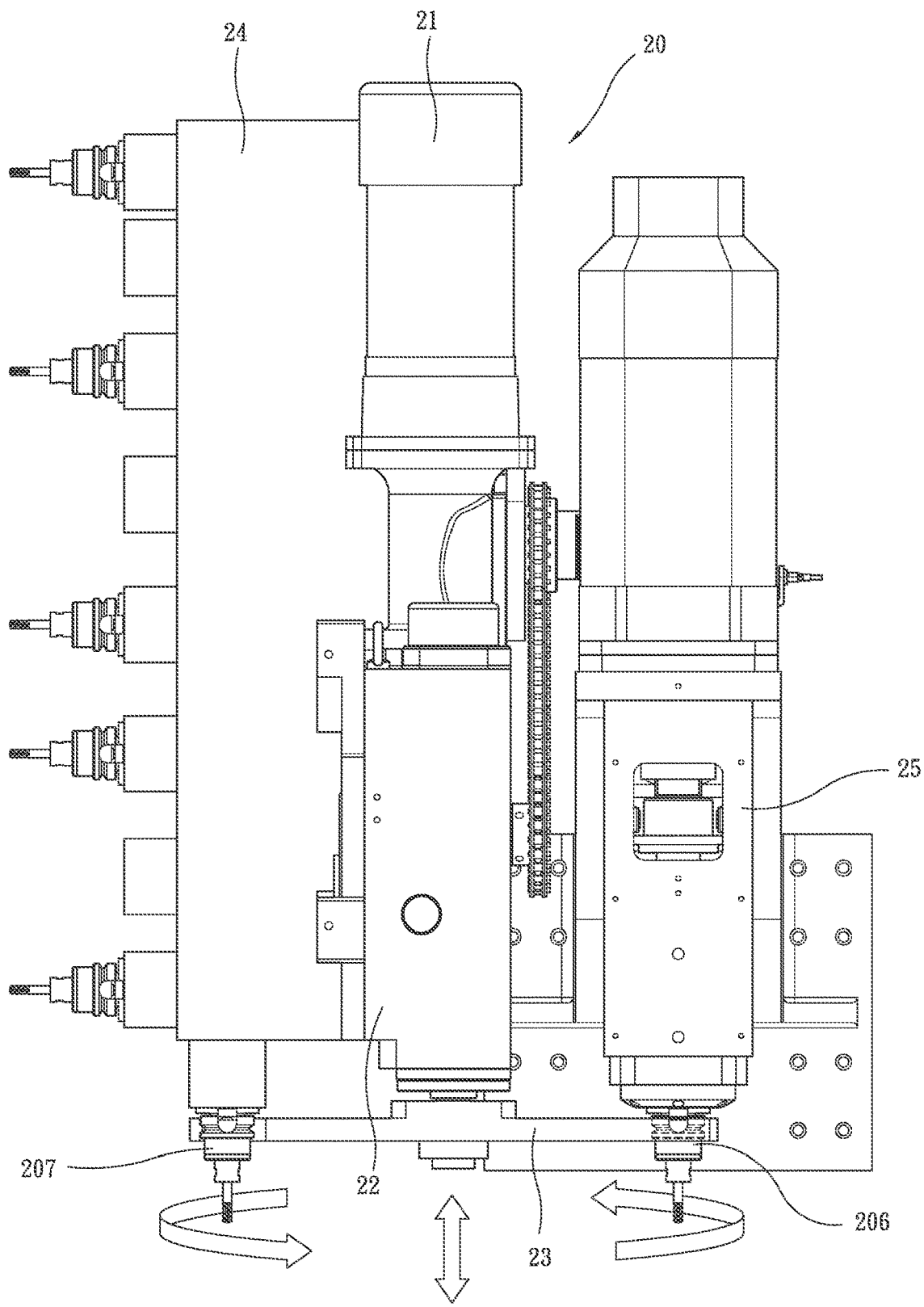
FIG. 3 is a partial front view showing a prior art circular disc style tool magazine used in a metalworking machine to illustrate tool change carried out with a tool change device that is upwards and downward movable and rotatable.
Figure 4:
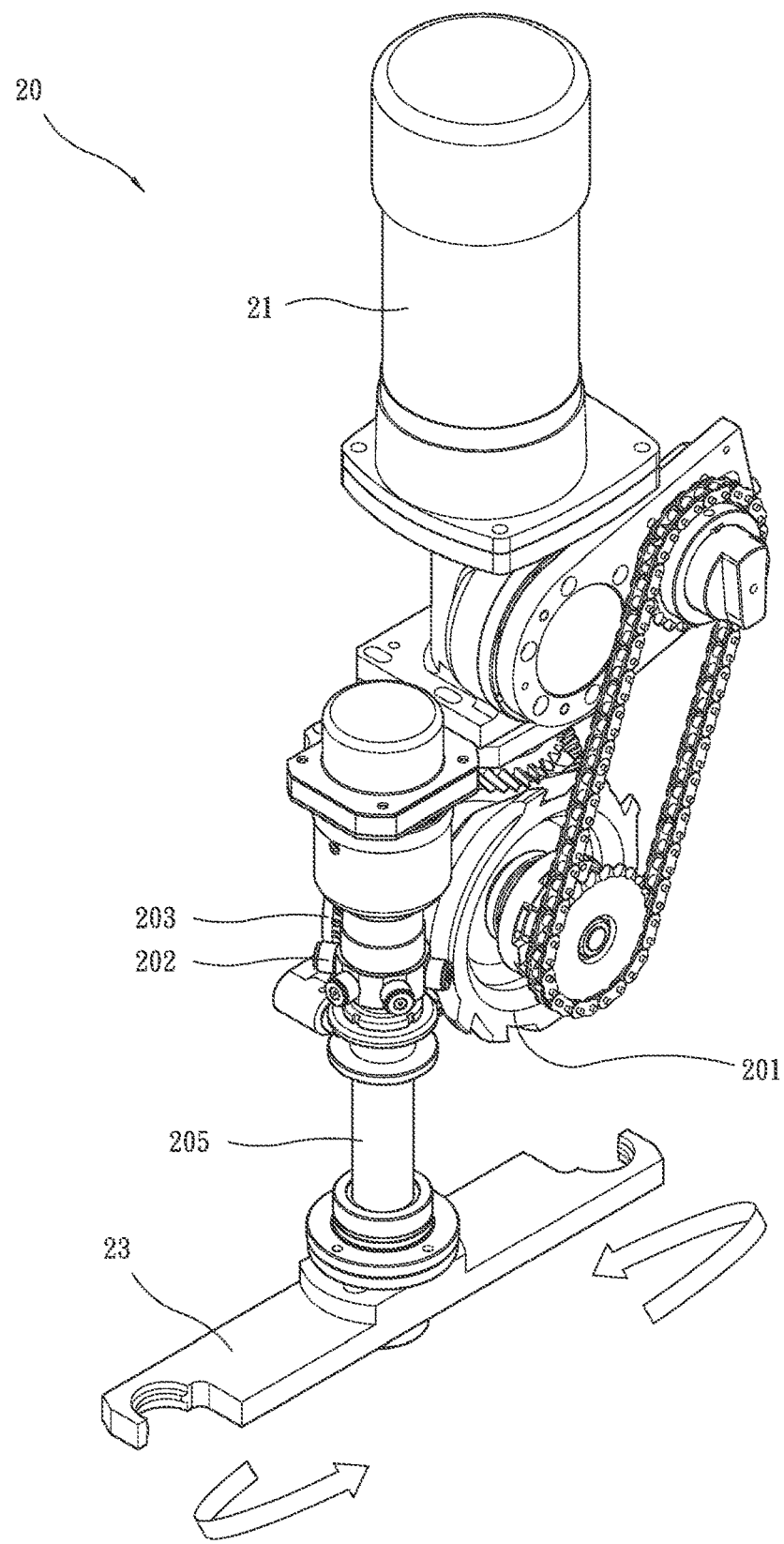
FIG. 4 is a perspective view showing an inside structure of a prior art cam style tool change device.
Figure 5:
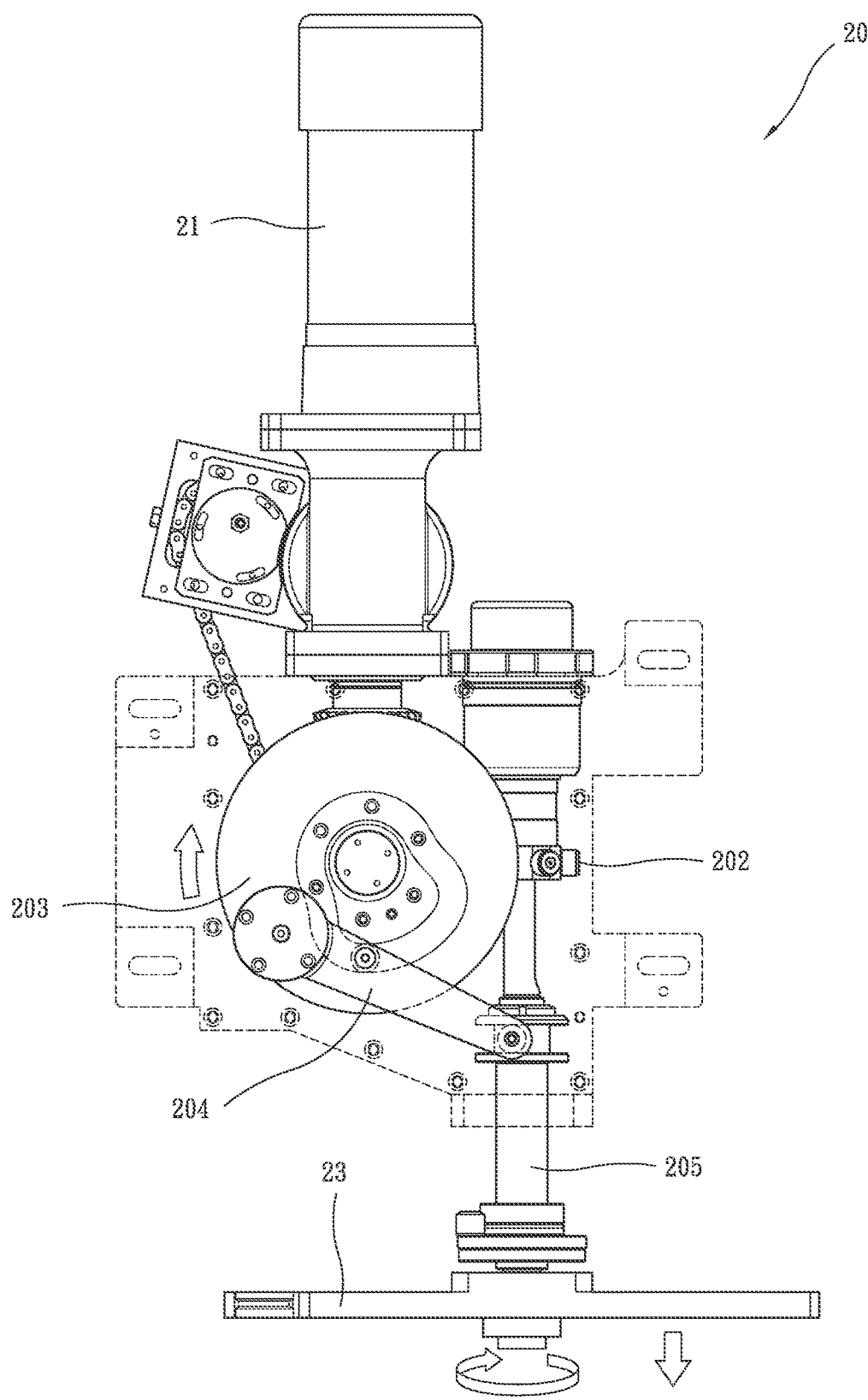
FIGS. 5 and 6 are schematic views illustrating an operation of the prior art cam style tool change device.
Figure 6:
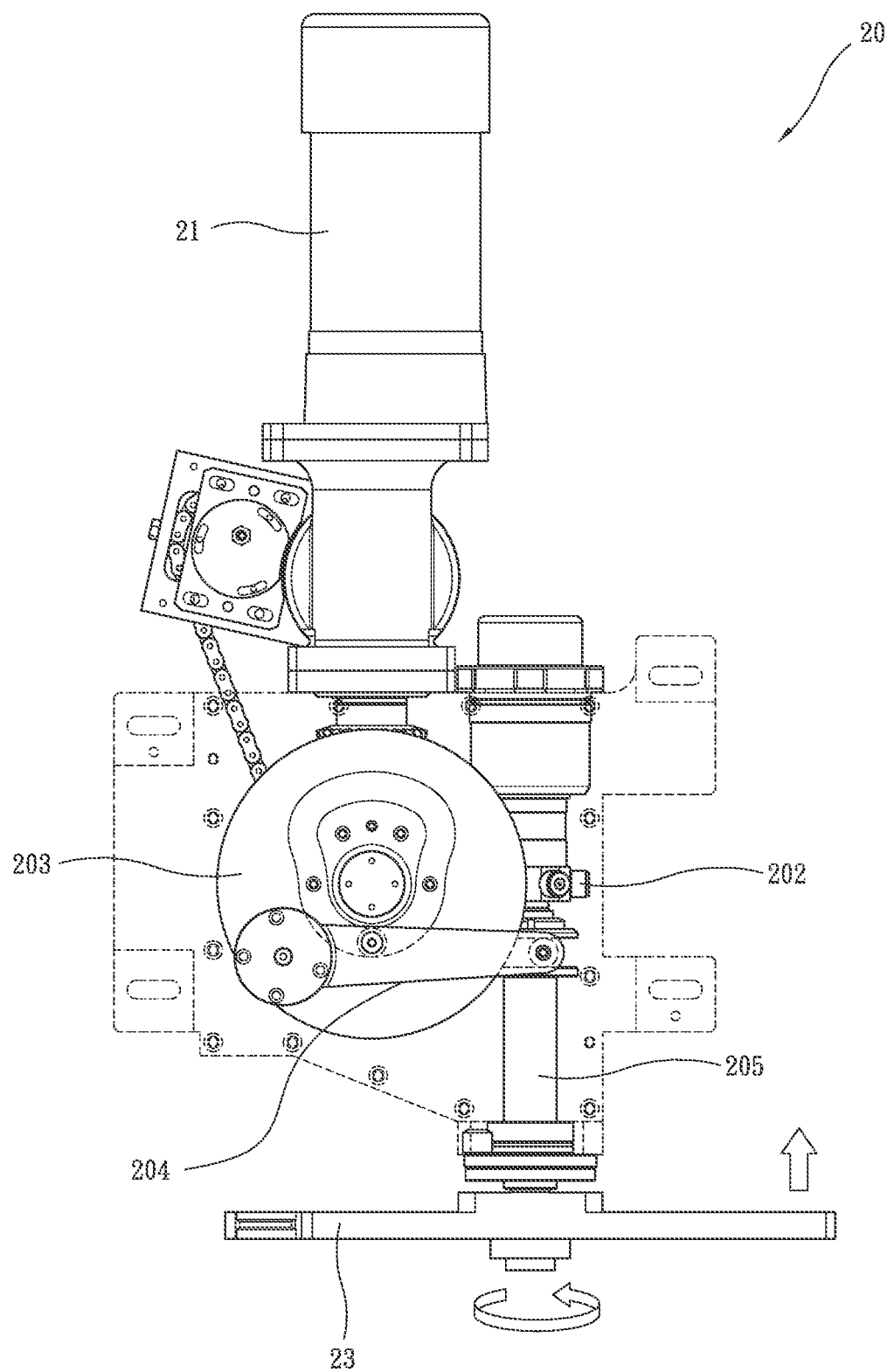
Figure 7:
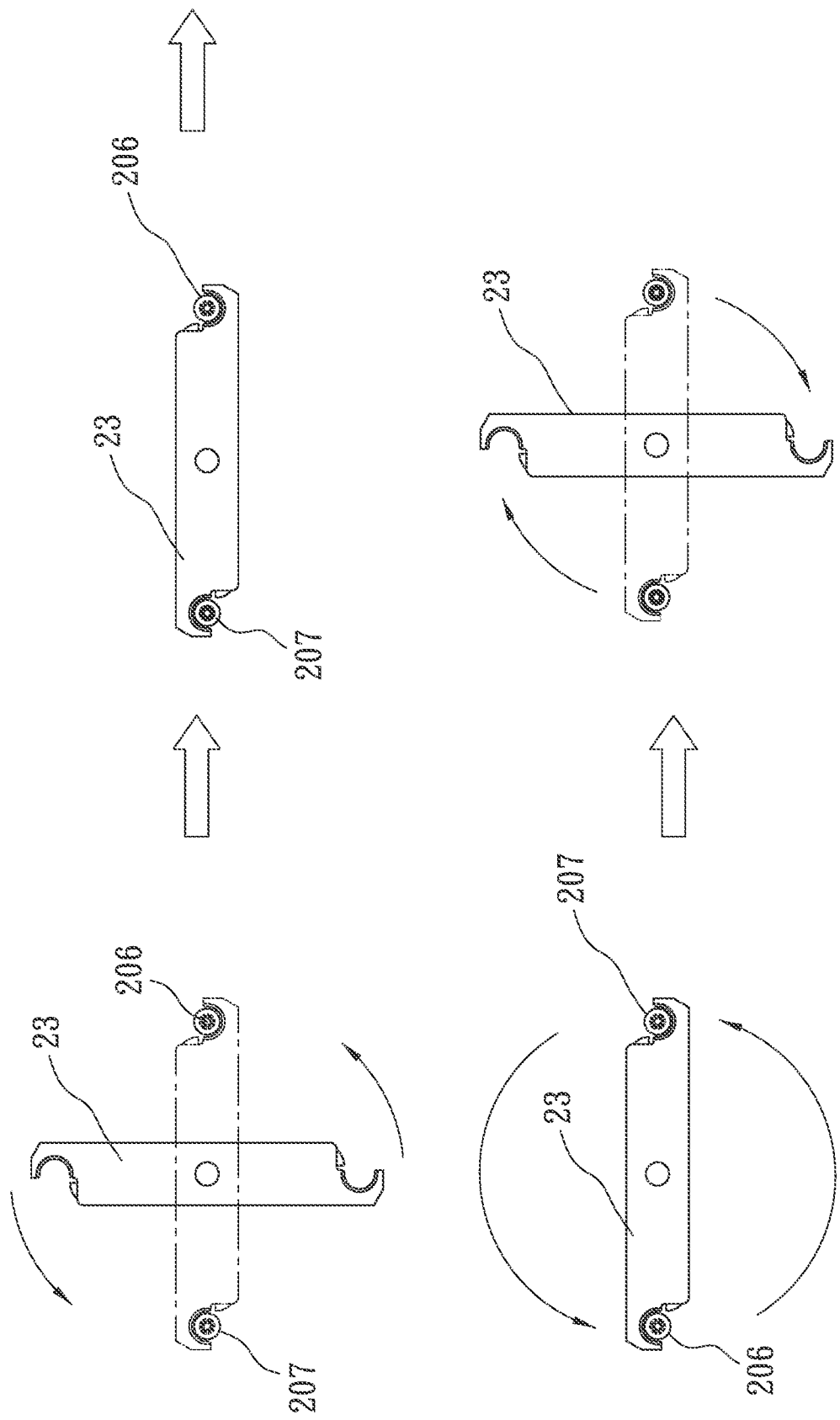
FIG. 7 is a schematic view illustrating a movement locus of a tool change arm of the prior art cam style tool change device.
Figure 8:
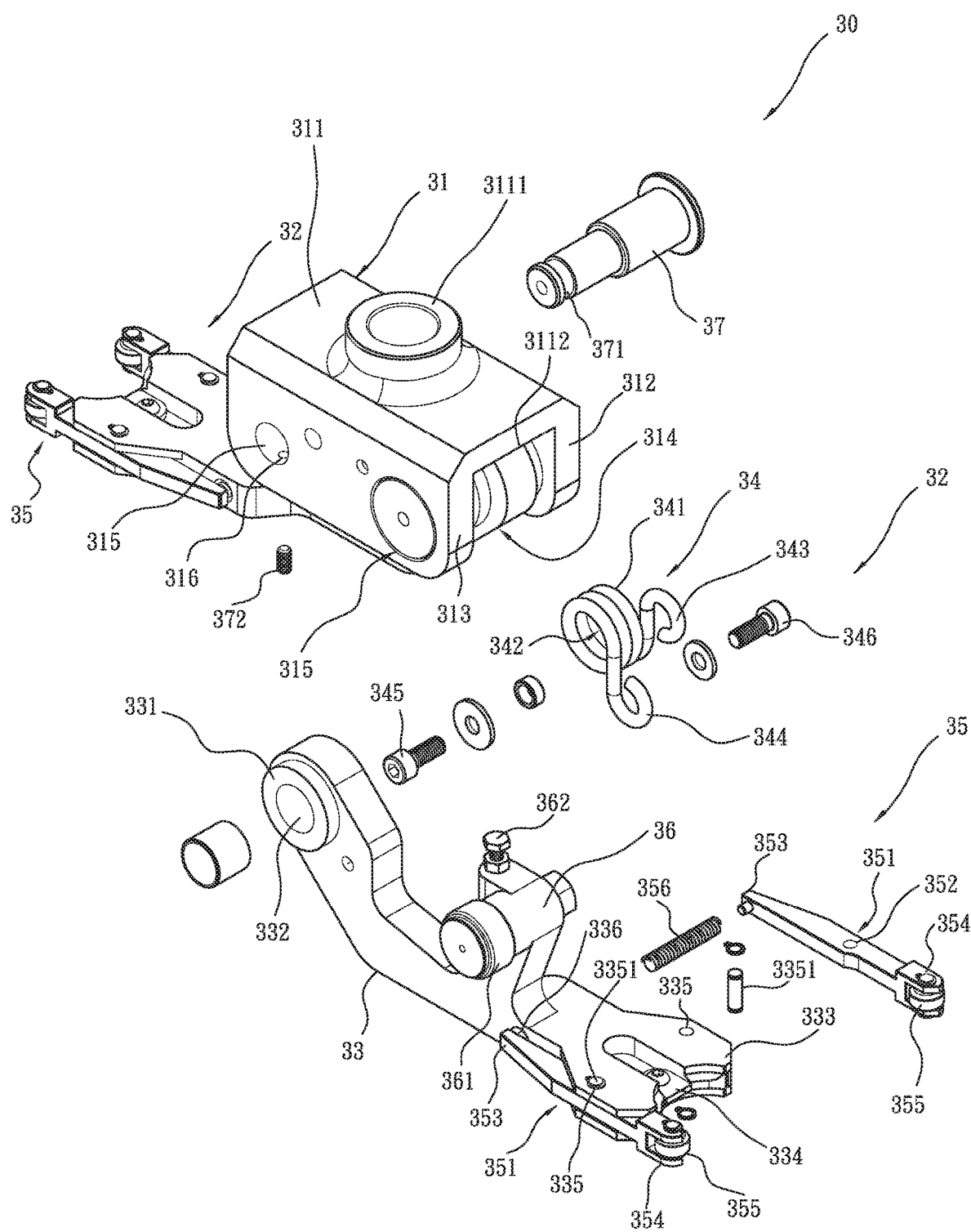
FIG. 8 is an exploded view showing a tool change unit according to a first embodiment of the present invention.
Figure 9:
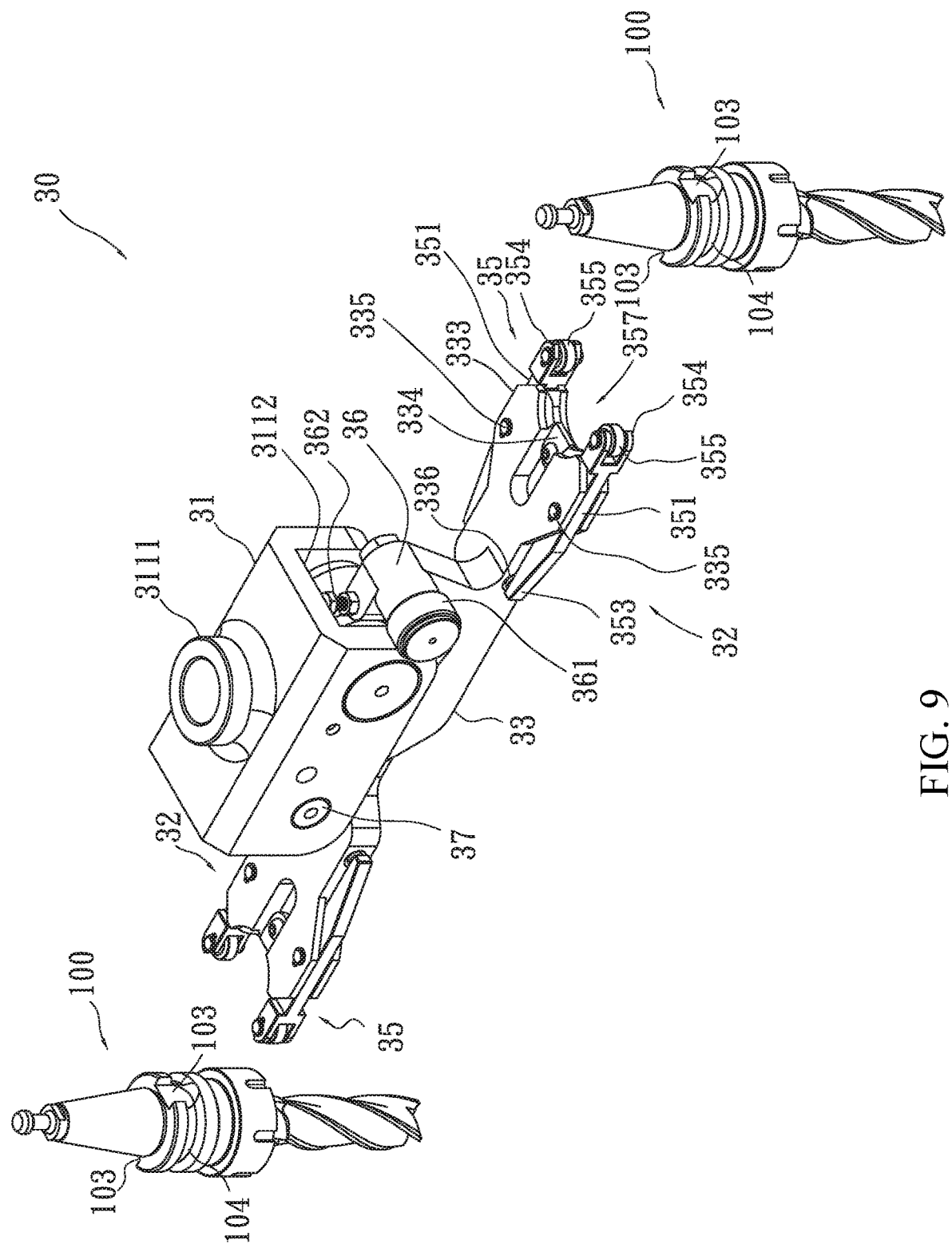
FIG. 9 a perspective view showing the tool change unit according to the first embodiment of the present invention in an assembled form.

Referring to FIGS. 8-11, a tool change unit 30 according to the instant embodiment comprises a base 31 and two tool arms 32 pivotally mounted to the base 31.

The base 31 includes a U-shaped body, which includes a top surface 311 and sidewalls 312, 313 extending downwards from two sides of the top surface 311 and has an interior that defines an accommodation space 314 in communication with the outside. The top surface 311 includes a coupling section 3111 that can be coupled with and attached to a rotational axle. The two sidewalls 312, 313 includes two sets of paired penetration holes 315 that are in communication with each other. The tool arms 32 have ends rotatably mounted to the base 31 and also have opposite-side ends respectively set at two sides of the base 31. Each of the tool arms 32 includes an arm body 33, a position-returning element 34, a gripping element 35, an actuation element 361, and a stop element 362. The two tool arms 32 are of the same structure and details will provided hereinafter for one of the tool arms 32 only.

The arm body 33 has one end forming a pivoting end 331, which includes a penetrating pivoting hole 332. The pivoting hole 332 is set in alignment with one of the sets of the penetration holes 315 of the base 31 and an axle bar 37 penetrates from one of the sidewalls 312 through the pivoting hole 332 to reach an opposite one of the sidewalls 313. The axle bar 37 has an end-portion circumferential surface that is formed with a circumferential groove 371. The circumferential groove 371 is provided for a counterbore bolt 372 that is screwed from a bottom of the sidewalls 313 and extending out of a threaded hole 316 to get abutting engagement therewith so as to prevent the axle bar 37 from detaching and thus pivotally mounting the arm body 33 in the base. An opposite end of the arm body 33 forms a gripping end 333 to which the gripping element 35 is mounted. Arranged between the pivoting end 331 and the gripping end 333 is an actuation section 36 that is raised from a top. Curving is formed between the pivoting end 331 and the arm body 33 to define an angle.

Figure 10:
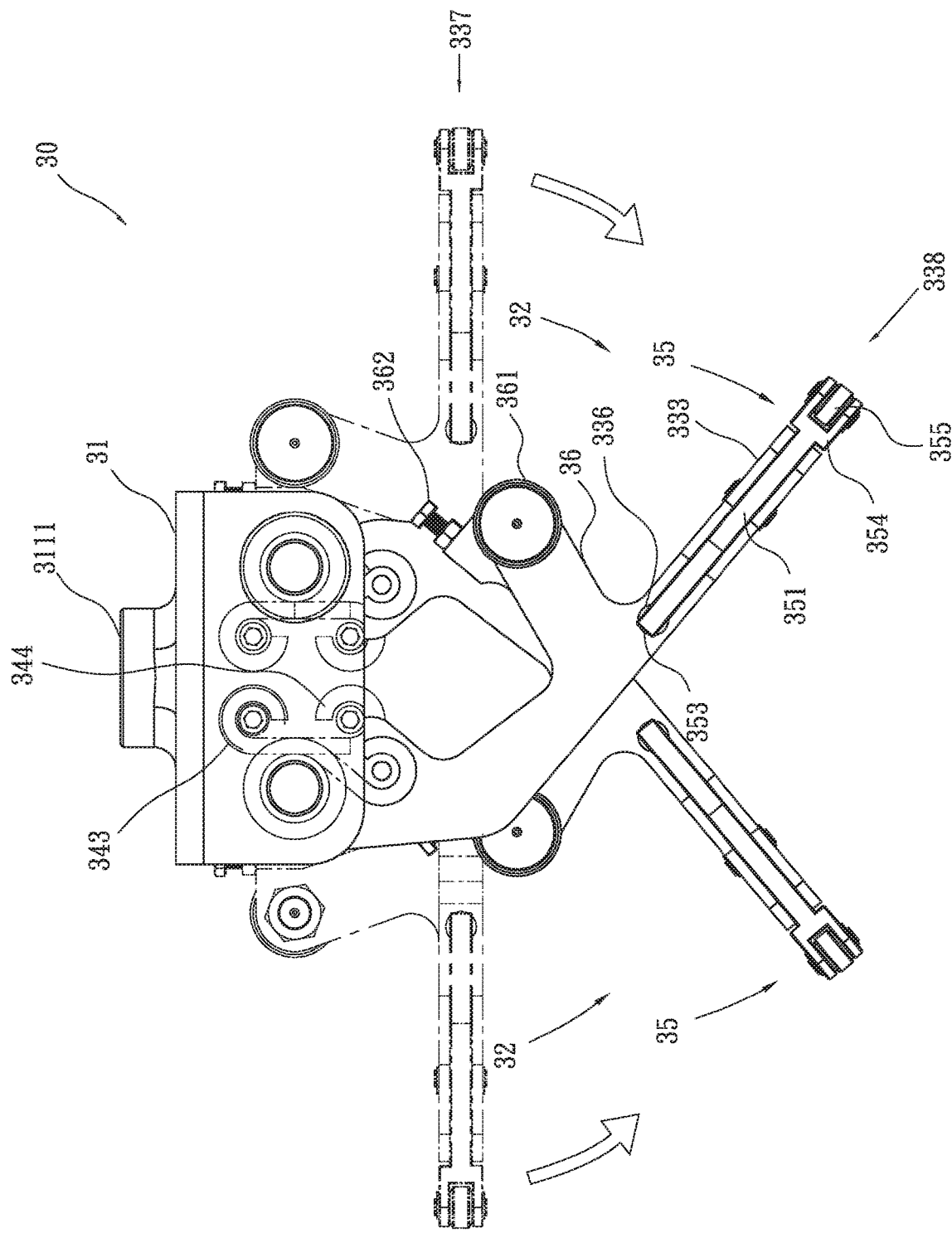
FIG. 10 is a front view of FIG. 9 illustrating an operation thereof, in which phantom lines and solid lines are used to indicate positions before and after the operation.
Figure 11:
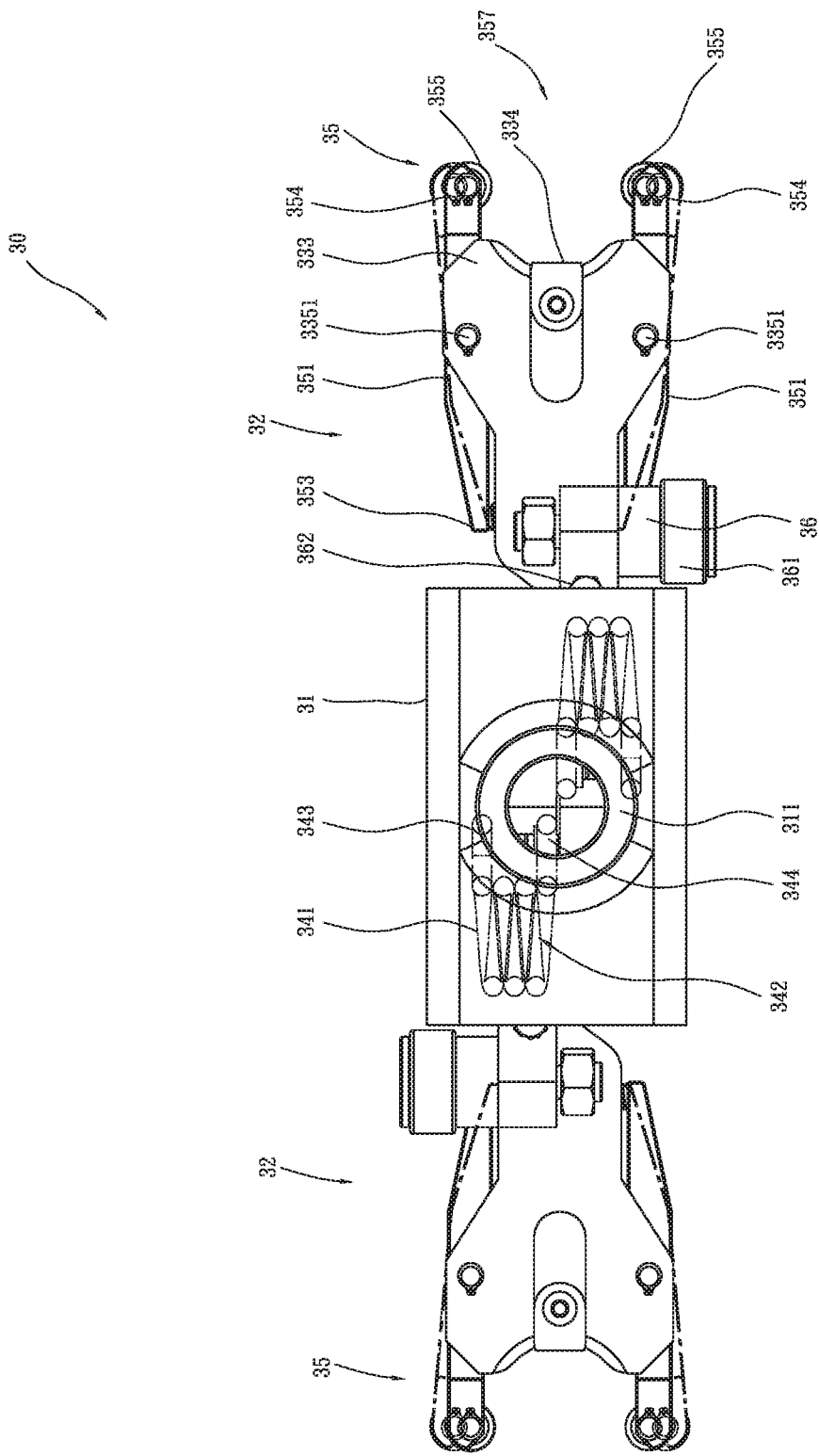
FIG. 11 is a top view of FIG. 9 illustrating the operation thereof, in which phantom lines and solid lines are used to indicate positions before and after the operation.

The position-returning element 34 is arranged and connected between the arm body 33 and the base 31, so that by means of the arrangement of the position-returning element 34, the arm body 33 is rotatable for moving between a first position 337 and a second position 338 (as shown in FIG. 10). In the instant embodiment, the position-returning element 34 is a torsion spring 341. The torsion spring 341 has a spring center hole 342 that receives the axle bar 37 to penetrate therethrough. The torsion spring 341 has a first end 343 that is fixed by a fastening member 345 to the sidewalls 312 and a second end 344 that is fixed by a fastening member 346 to the arm body 33. The two fastening member 345, 346 can each be a bolt.

The gripping element 35 is made up of two gripping claws 351, a compression spring 356, and a locking block 334. The locking block 334 is mounted, in a detachable manner, to an end face of the gripping end 333 of the arm body 33. Each of the gripping claws 351 is formed, at a location close to a middle portion, with a pivoting hole 352. Two sides of the gripping end 333 of the arm body 33 are each formed with a pivoting hole 335 corresponding to the pivoting hole 352 of each of the gripping claws 351, and a pivot pin 3351 penetrates therethrough to rotatably mount each of the gripping claws 351 to the gripping end 33. The compression spring 356 is disposed in a penetrating accommodation hole 336 of the arm body 33. Gripping-claw rear ends 353 of the two gripping claws 351 are respectively supported on two ends of the compression spring 356 and are acted upon by the compression spring 356 for being pushed outward. Gripping-claw front ends 354 of the two gripping claws 351 and the end face of the gripping end 333 form an opening 357. Each gripping-claw front end 354 is rotatably mounted with a roller 355. The two gripping-claw front ends 354 and the rollers 355 are receivable in and engageable with a e circumferential groove 104 of a tool bar 100 and the locking block 334 is fit into a fitting trough 103 of the tool bar 100 to make the tool bar 100 securely gripped by the gripping element 35.

The actuation element 361 is mounted on the actuation section 36 of the arm body 33 and is driven by a main axle to cause the arm body 33 to rotate for downwards moving. In the instant embodiment, the actuation element 361 is a roller rotatably mounted on the actuation section 36.

The stop element 362 is selectively mounted on the base 31 or the actuation section 36 of the arm body 33. In the instant embodiment, the stop element 362 is a bolt, which is screwed to the actuation section 36 and is adjustable in respect of a height thereof, so as to abut an inner top surface 3112 of the base 31 when the arm body 33 is rotated upwards from a lower side. By adjusting the height of the bolt, the degree of levelness of the gripping end 333 and the two gripping claws 351 of the arm body 33 can be adjusted.

Figure 12:
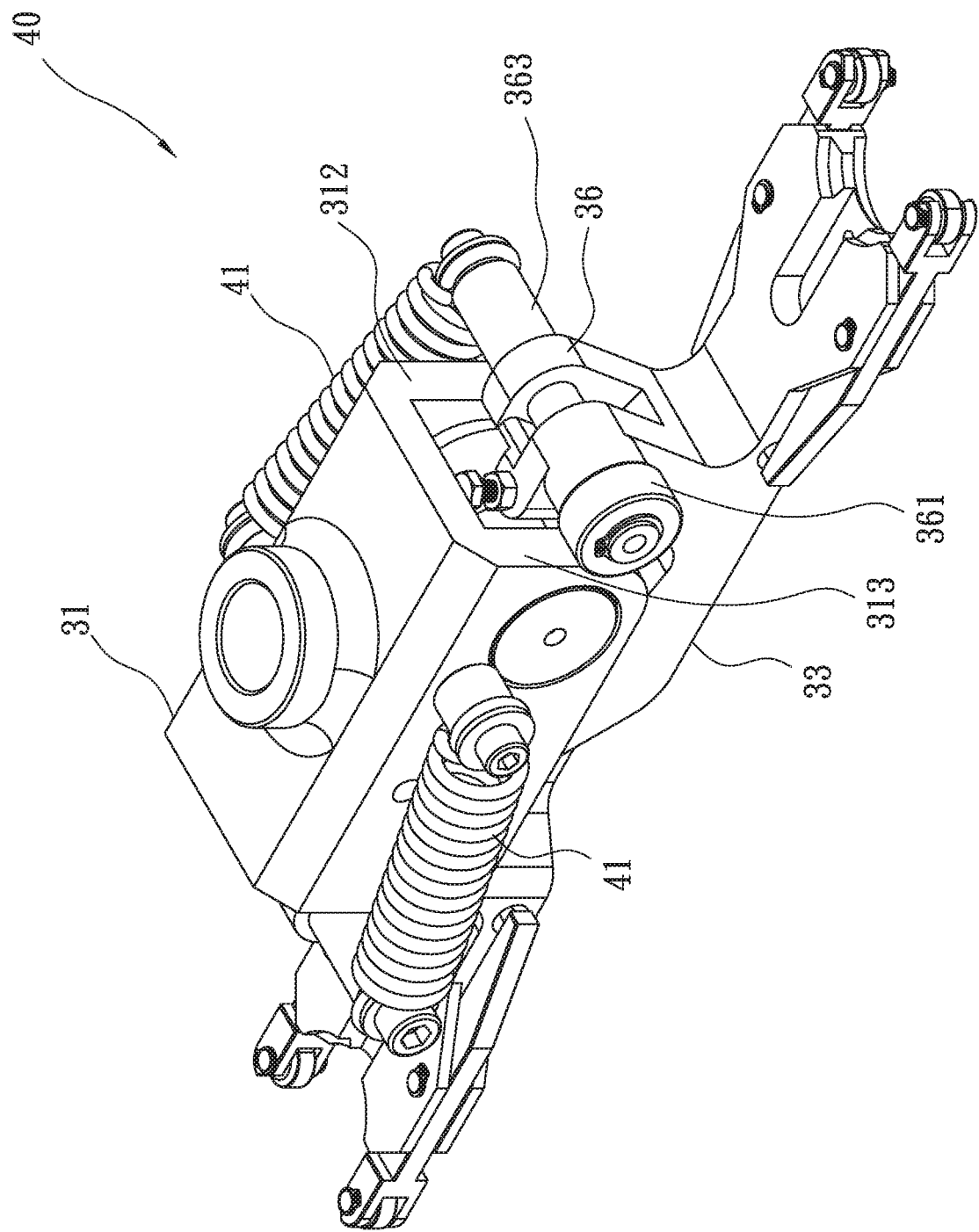
FIG. 12 is a perspective view showing a tool change unit according to a second embodiment of the present invention.
Figure 13:
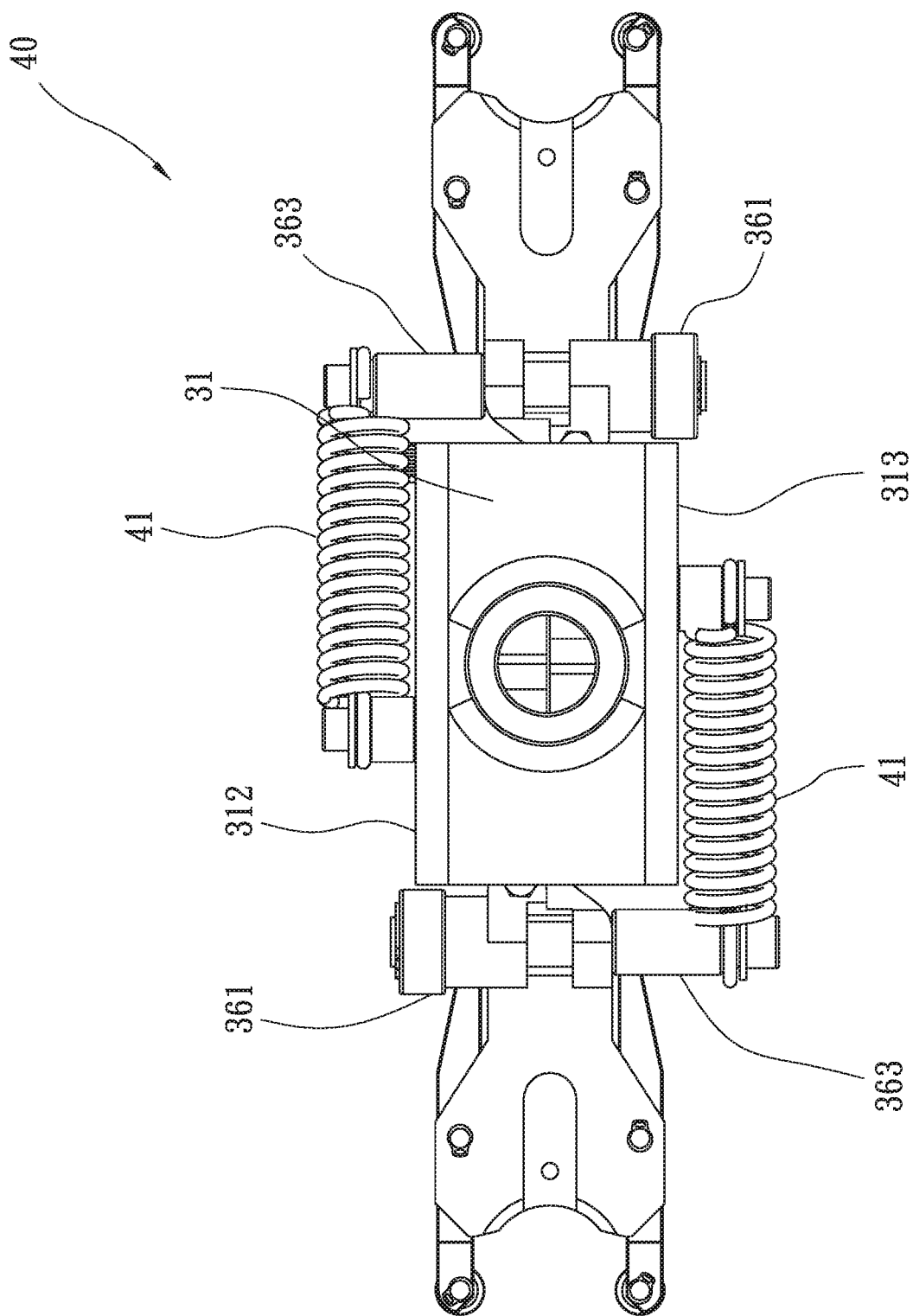
FIG. 13 is a top view of FIG. 12.

Referring to FIGS. 12 and 13, a tool change unit 40 according to a second embodiment of the present invention is shown and is generally similar to the tool change unit 30 of the first embodiment except having a different structure for the position-returning element 34, in which a position-returning element 41 includes an extension spring. Each of the extension springs has an end fixed to the sidewalls 312, 313 of the base 31 and an opposite end connected to an axle pin 363 rotatably extending through the actuation section 36, so that a spring force of the extension spring acts on the arm body 33 that has been rotated for downwards moving to achieve an effect of automatically returning to an original position.

Figure 14:
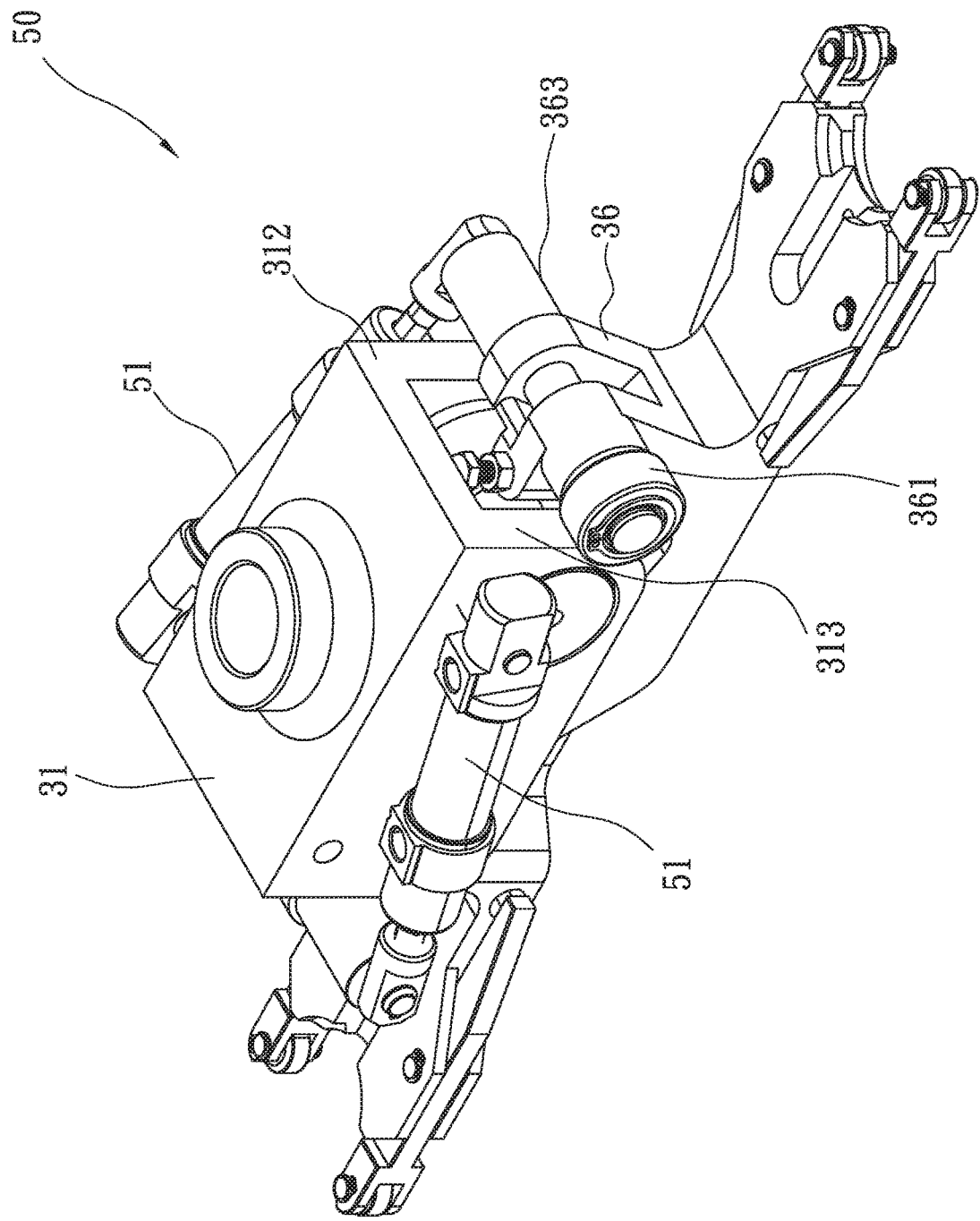
FIG. 14 is a perspective view showing a tool change unit according to a third embodiment of the present invention.
Figure 15:
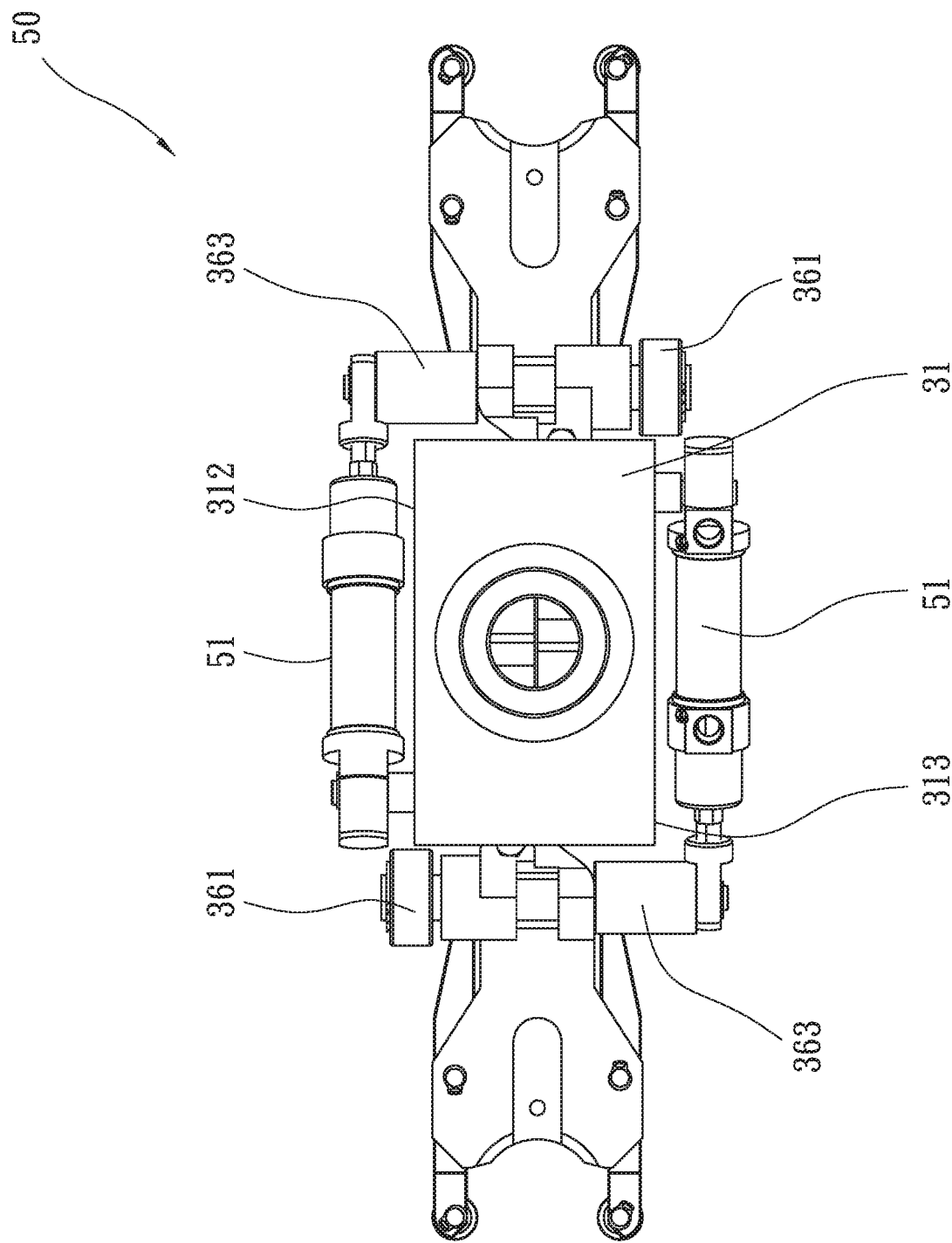
FIG. 15 is a top view of FIG. 14.

Referring to FIGS. 14 and 15, a tool change unit 50 according to a third embodiment of the present invention is shown and is generally similar to the tool change unit 30 of the first embodiment except having a different structure for the position-returning element 34, in which a position-returning element 51 includes a pneumatic cylinder. Each of the pneumatic cylinders has an end fixed to the sidewalls 312, 313 of the base 31 and an opposite end connected to an axle pin 363 rotatably extending through the actuation section 36, so that a push or pull operation performed by the pneumatic cylinder causes the arm body 33 to rotate for upwards or downwards moving to a desired position.

Figure 16:
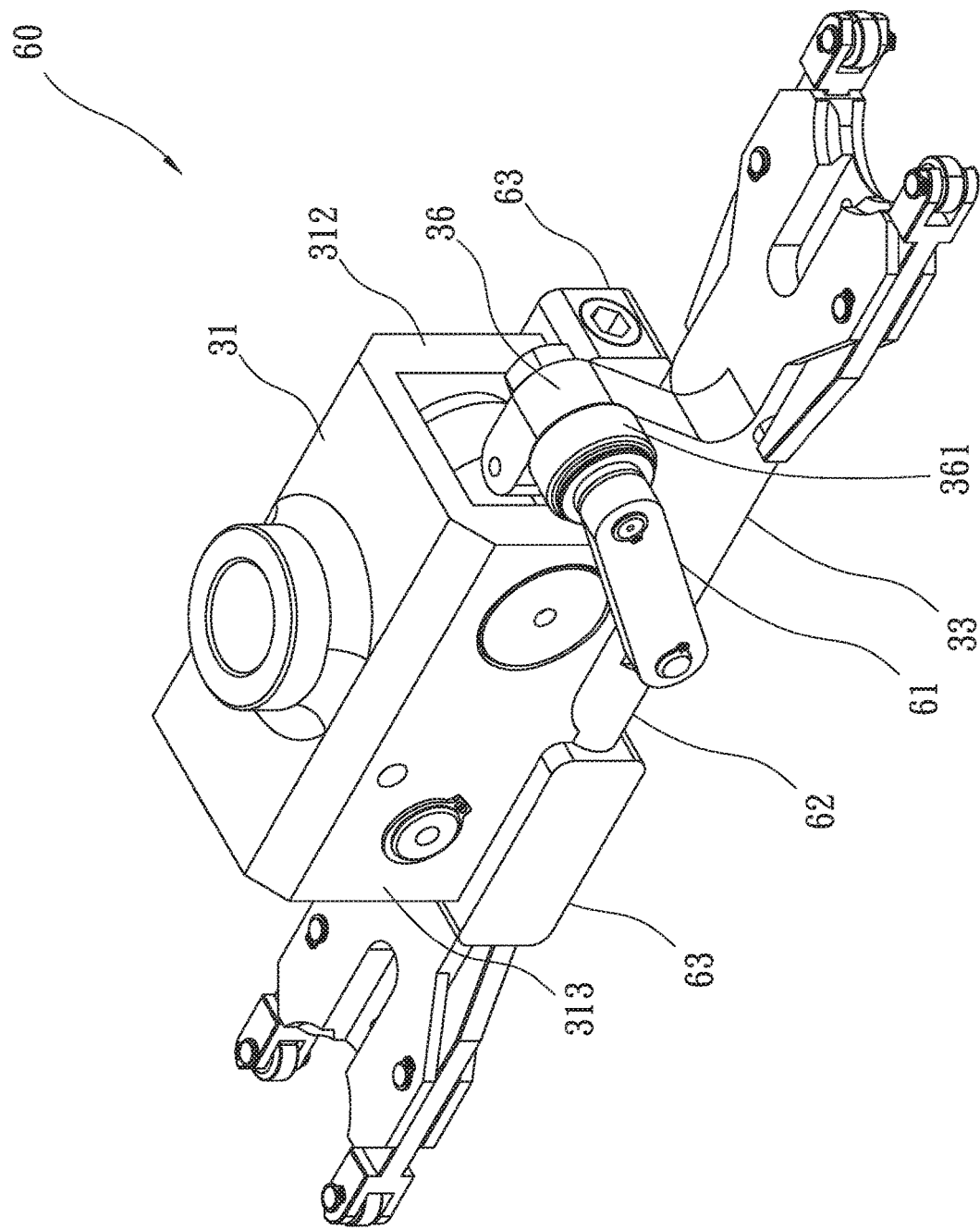
FIG. 16 is a perspective view showing a tool change unit according to a fourth embodiment of the present invention.
Figure 17:
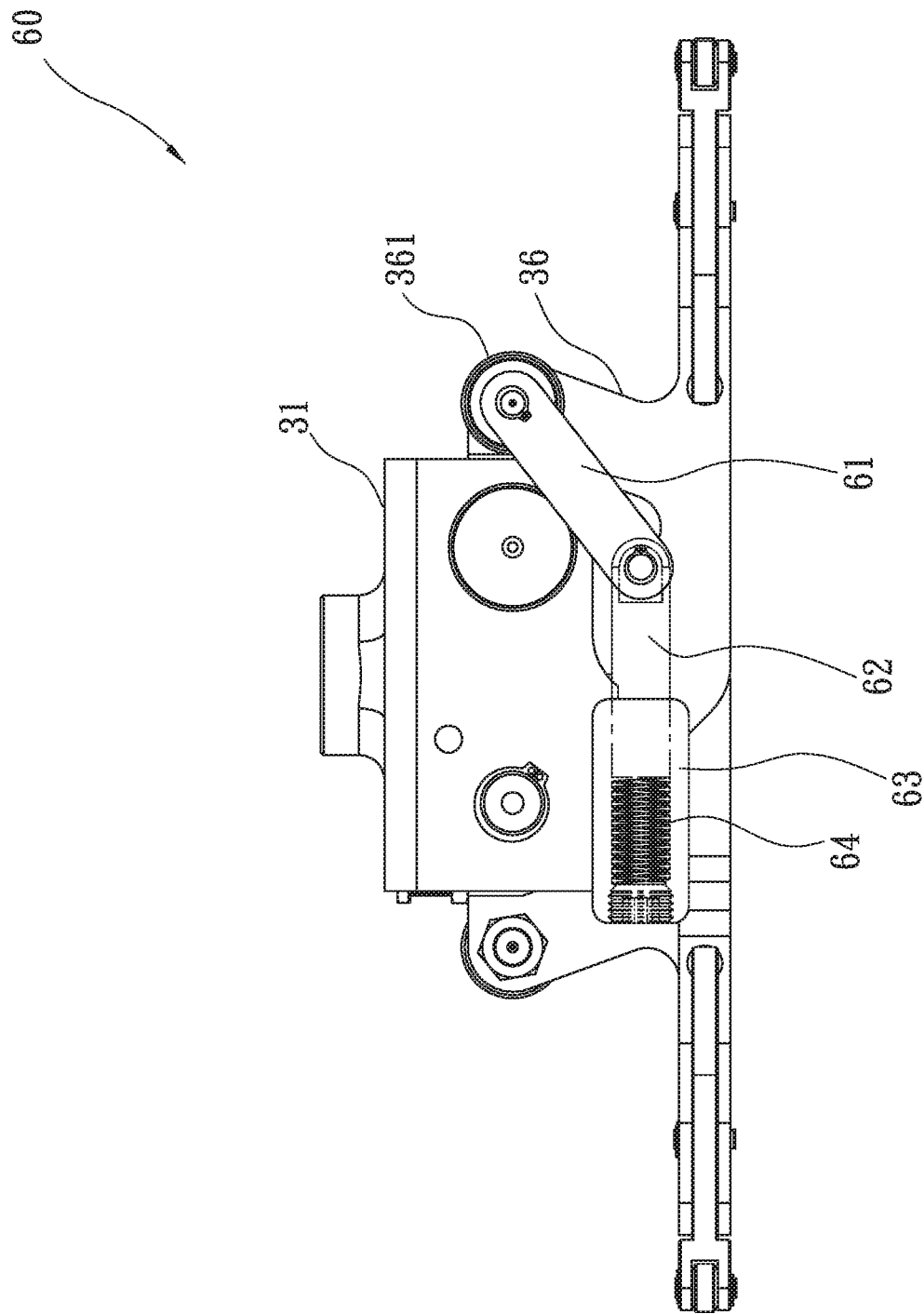
FIG. 17 is a front view of FIG. 16.

Referring to FIGS. 16 and 17, a tool change unit 60 according to a fourth embodiment of the present invention is shown and is generally similar to the tool change unit 30 of the first embodiment except having a different structure for the position-returning element 34. The position-returning element comprises a barrel 63, a compression spring 64, a push rod 62, and a link rod 61. The barrel 63 is fixed to a side portion of an underside of the base 31. The compression spring 64 is disposed in the barrel 63. The push rod 62 has an end pivotally mounted to the link rod 61 and an opposite end supported by the compression spring 64. An opposite end of the link rod 61 is rotatably mounted on the actuation section 36. When the actuation element 361 is driven by a main axle (not shown) to rotate for downwards moving, the link rod 61 drives the push rod 62 to push against the compression spring 64, so that the compression spring 64 accumulates an elastic reaction force. When the main axle reduces or releases a force applied to the actuation element 361, the compression spring 64 pushes, in an opposite direction, against the push rod 62, the link rod 61, and the arm body 33 to rotate for upwards moving.

Referring to FIGS. 18-24, the above-discussed four embodiments of the tool change unit, respectively designated at 30, 40, 50, 60, can each be used in combination with a power unit to form a tool change device 70. The following provides just a description for the tool change unit 30 of the first embodiment used in combination of each of various power units 71, 72, 73, 74.

Figure 18:
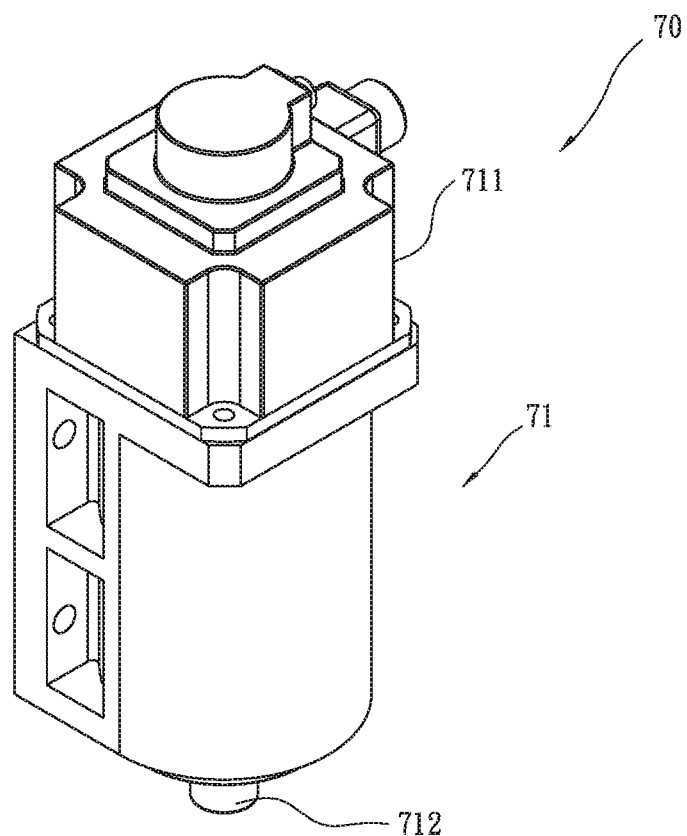
FIG. 18 is a perspective view showing a tool change unit and a first type power unit according to the present invention in a detached condition.
Figure 18:
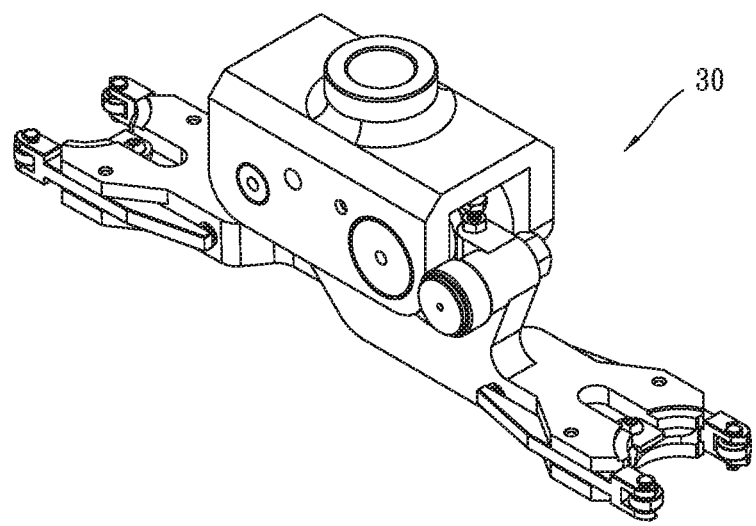
Figure 19:
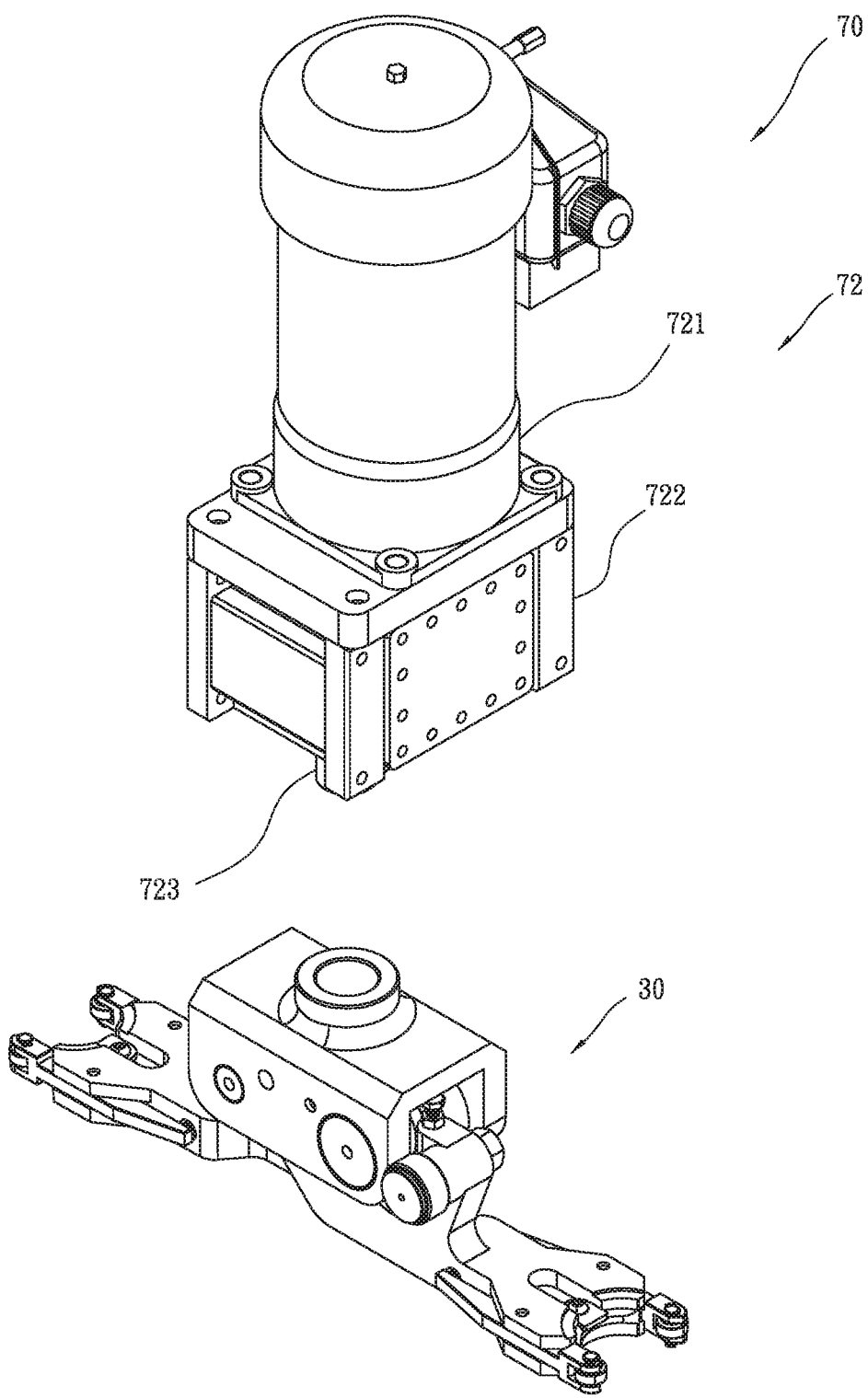
FIG. 19 is a perspective view showing a tool change unit and a second type power unit according to the present invention in a detached condition.

When used in a mode in which tool change is performed by means of upward/downward movement of a main axle, the tool change unit 30 according to the present invention can be mounted to a rotational axle 712 of a power unit 71 shown in FIG. 18, or can alternatively mounted to a rotational axle 723 of a power unit 72 shown in FIG. 19, to form a tool change device 70, wherein the power unit 71 at least comprises a servomotor 711 and the rotational axle 712 that is driven by the servomotor 711, so that by means of an effect of high precision positioning that the servomotor 711 provides, the tool change unit 30 can make a precise rotational movement of 180 degrees to a predetermined location; and the power unit 72 includes a drive motor 721 in combination with an indexing device 722 (the indexing device 722 being a known device of which details will be omitted), so that by means of a positioning function inherent to the indexing device 722, in combination with rotation performed by the drive motor 721, the tool change unit 30 can also make a precise rotational movement of 180 degrees to a predetermined location.

Figure 20:
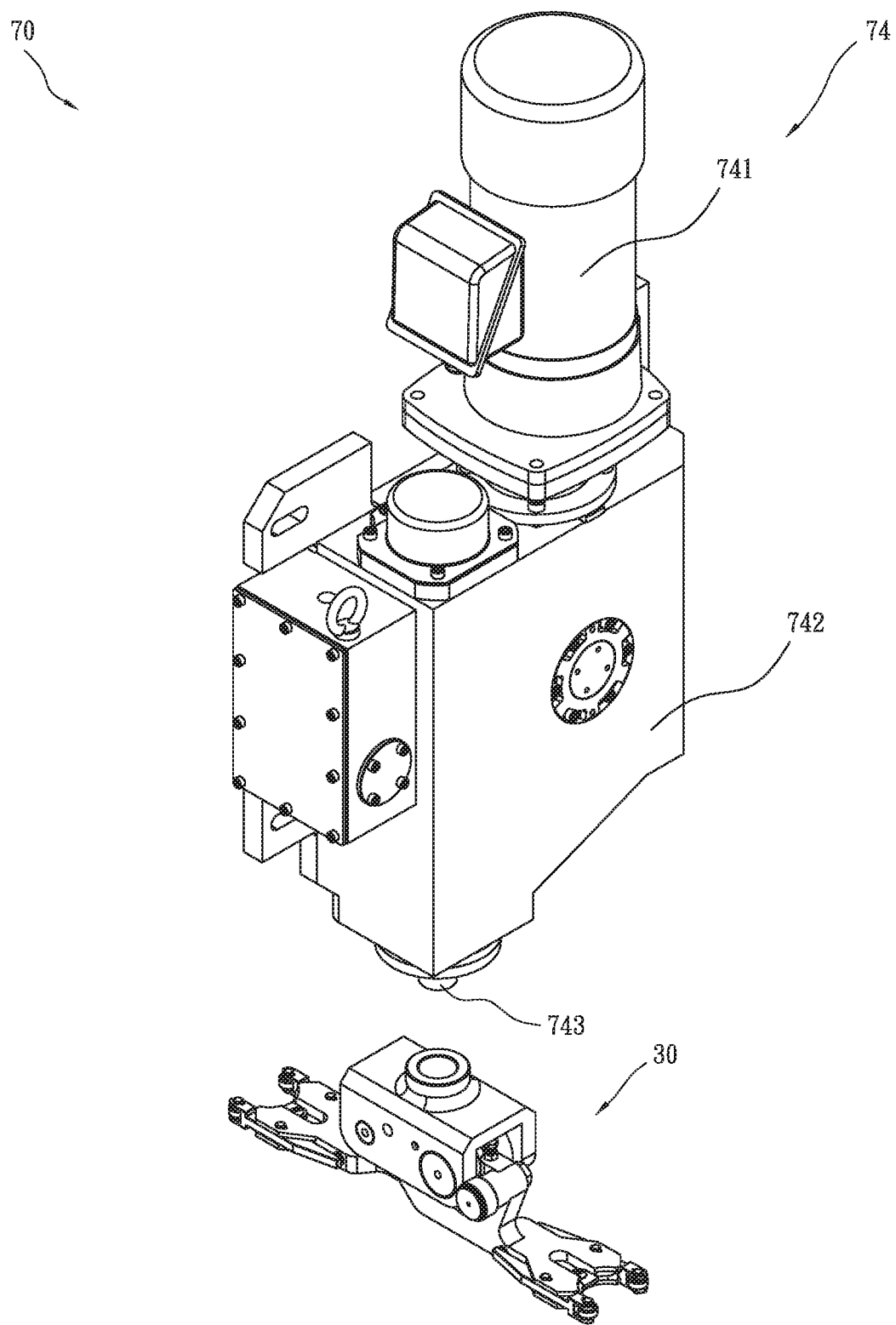
FIG. 20 is a perspective view showing a tool change unit and a third type power unit according to the present invention in a detached condition.
Figure 21:
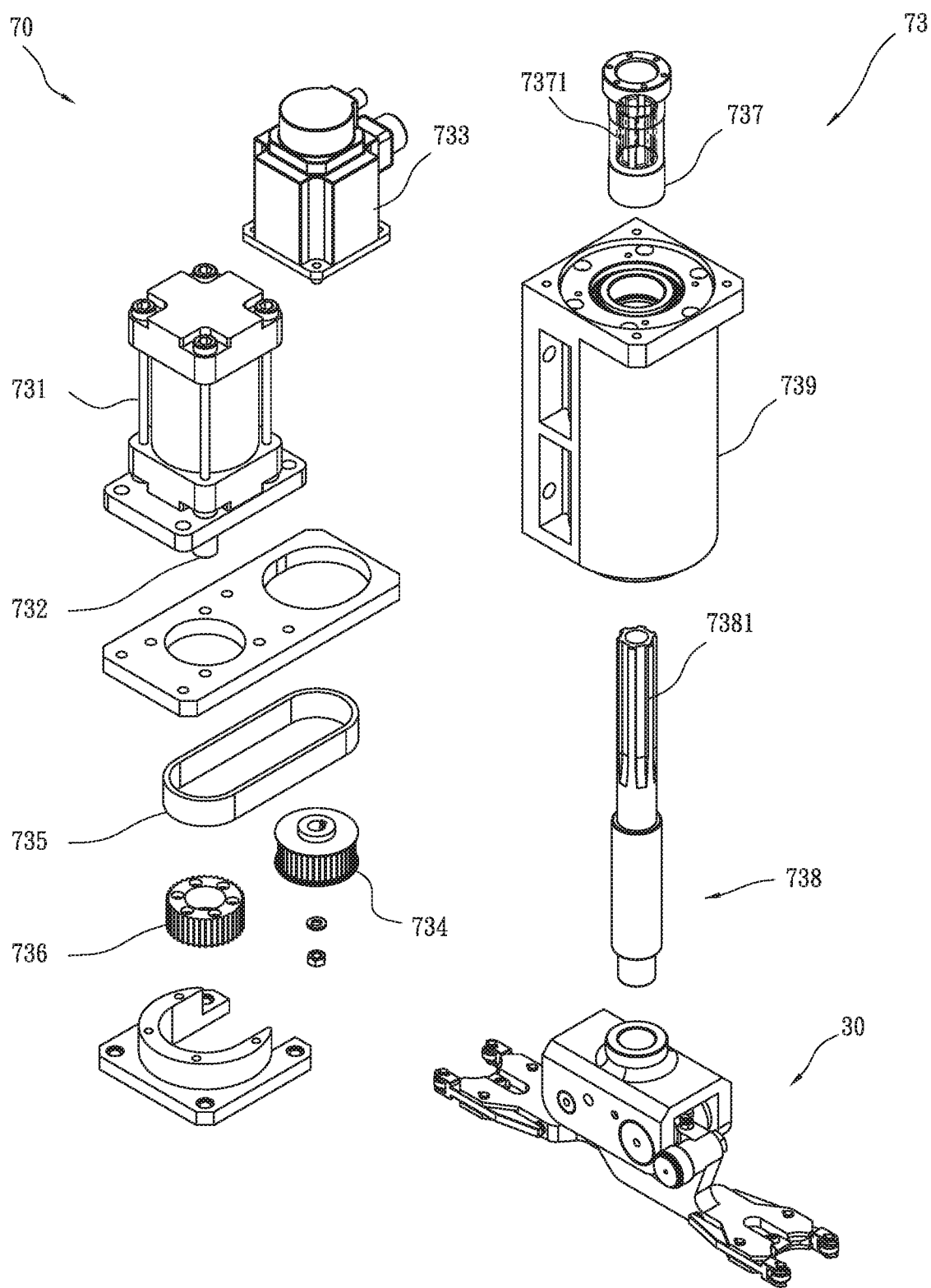
FIG. 21 is an exploded view showing a tool change unit and a fourth type power unit according to the present invention.
Figure 22:
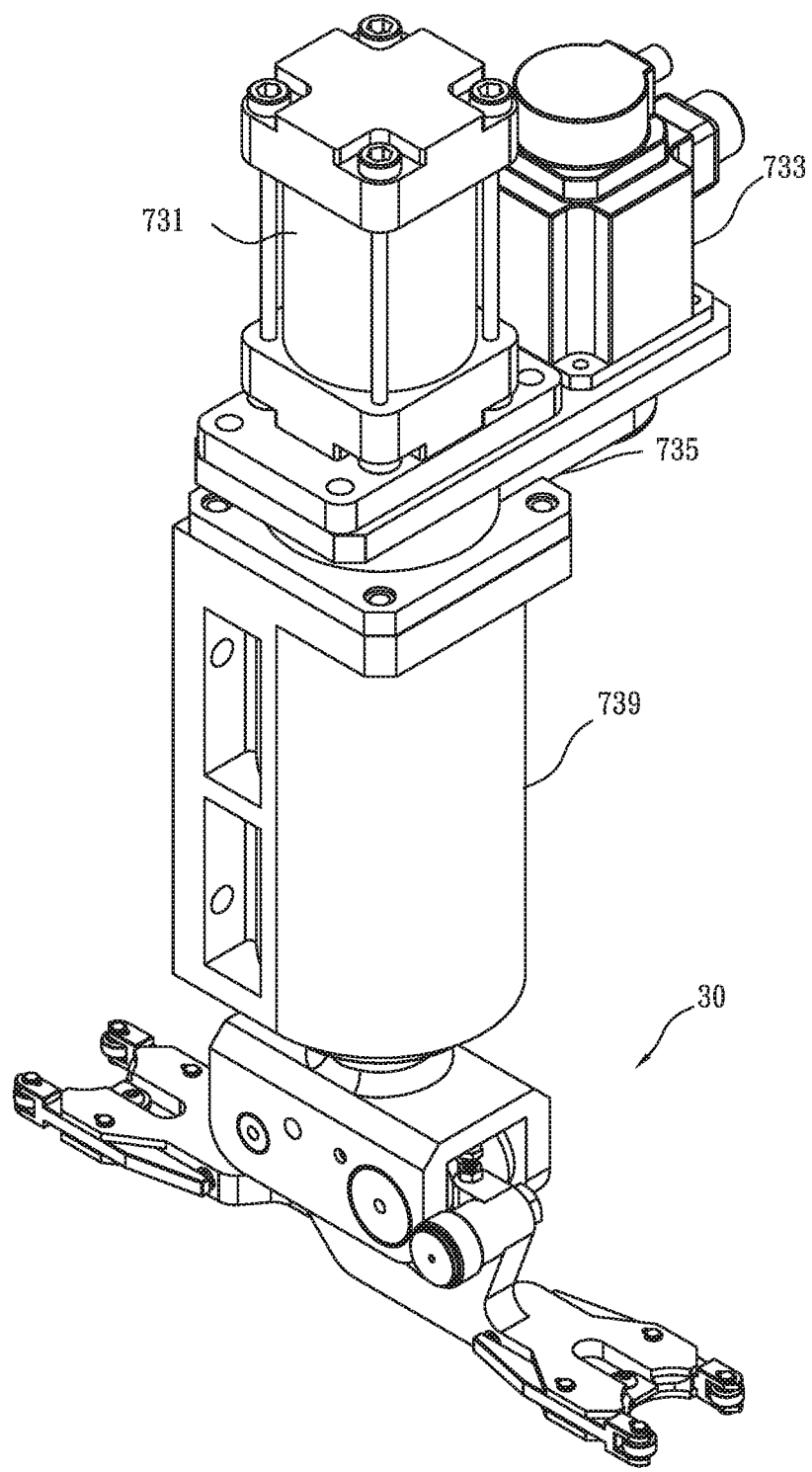
FIG. 22 is a perspective view showing the tool change unit and the fourth type of power unit according to the present invention in an assembled form.
Figure 23:
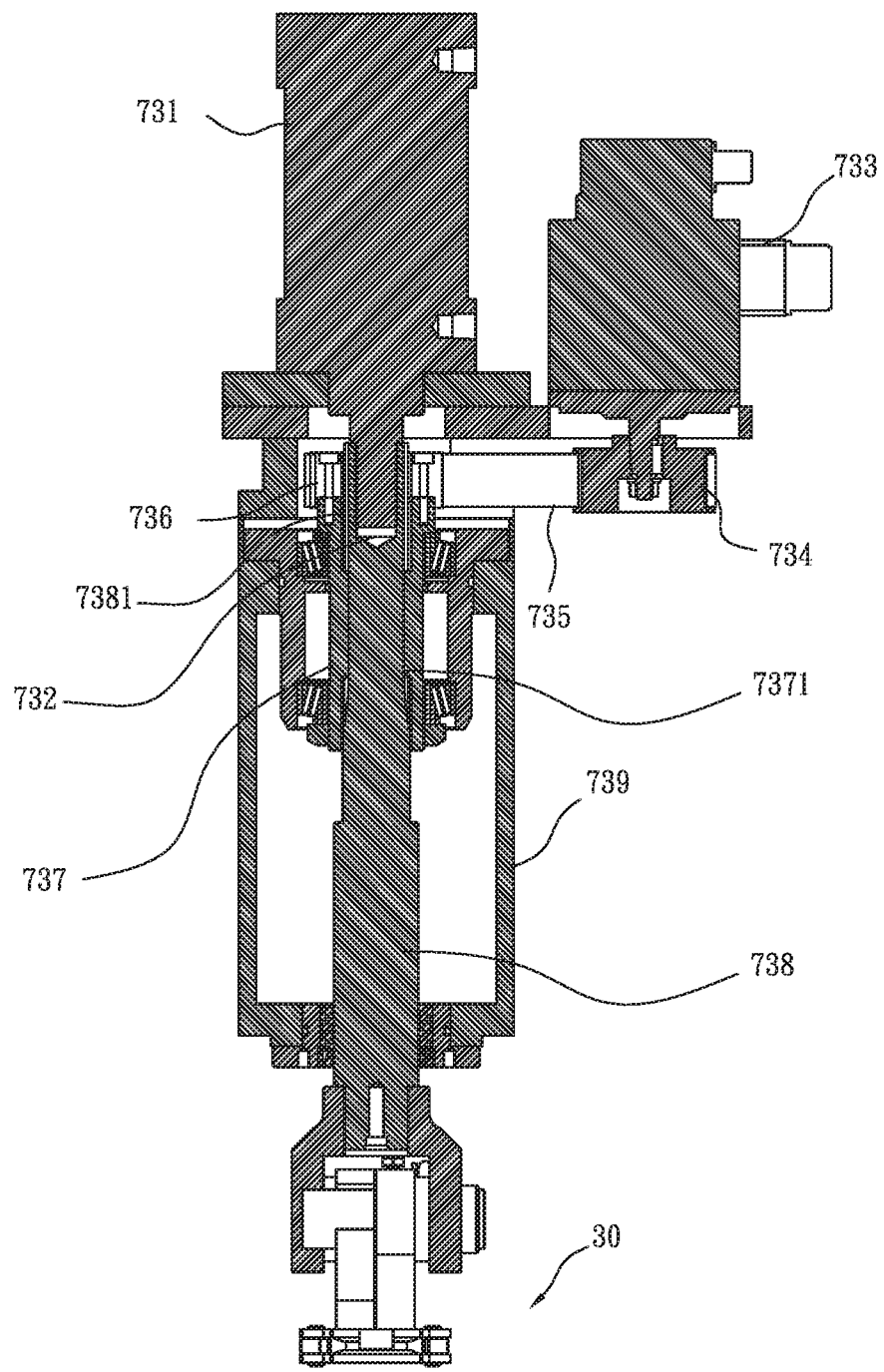
FIGS. 23 and 24 are cross-sectional views of the fourth type power unit to illustrate an operation thereof.
Figure 24:
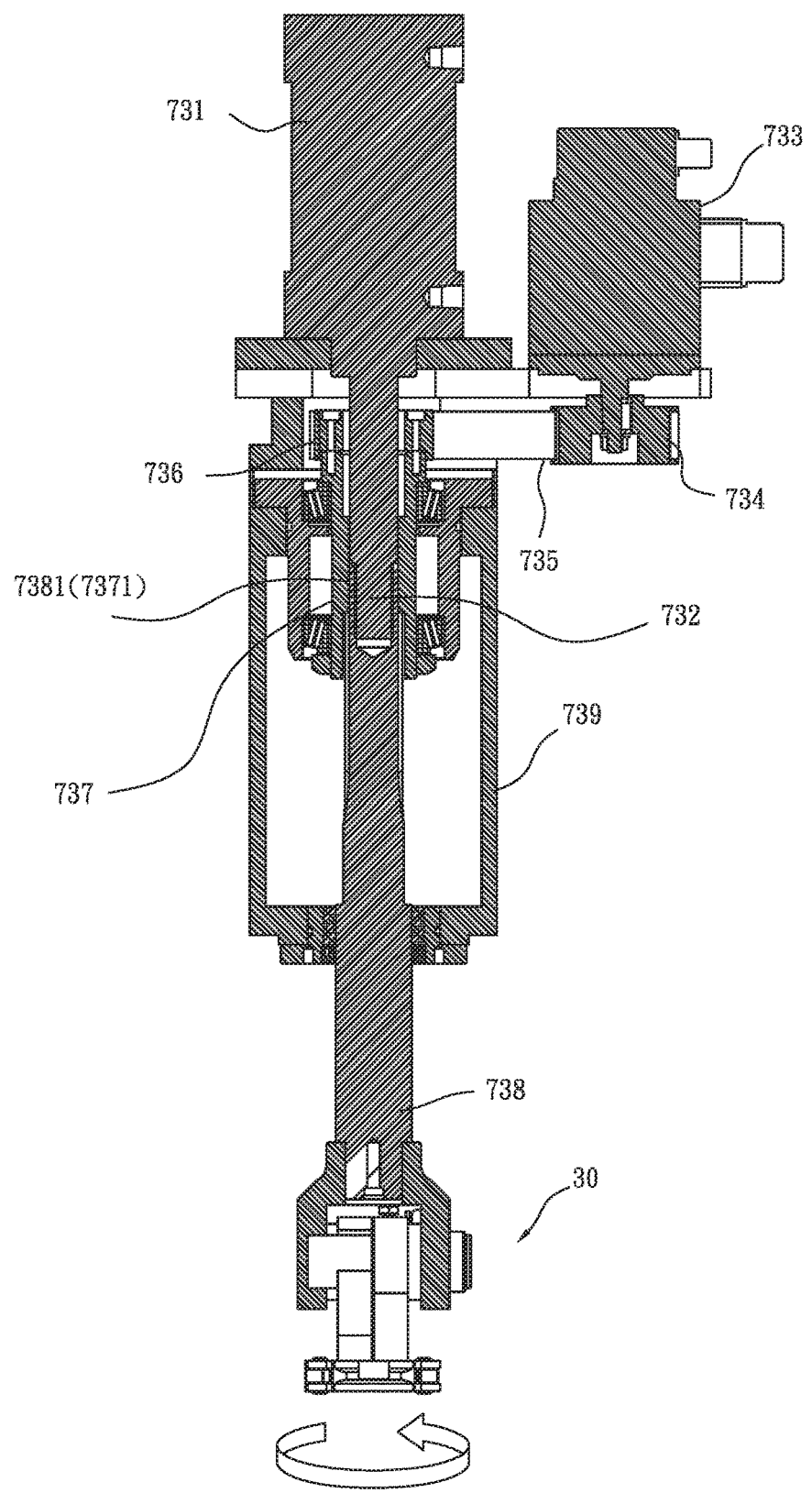

When the tool change unit 30 according to the present invention performs tool change but not using upward/downward movement of a main axle, the tool change unit 30 can be mounted to a rotational axle 743 of a power unit 74 shown in FIG. 20 to form a tool change device 70, or can alternatively mounted to a rotational axle 738 of a power unit 73 shown in FIG. 21 to form a tool change device 70, wherein the power unit 74 includes a drive motor 741 in combination with a cam box 742 (the cam box being a known device of which details will be omitted), so that by means of the drive motor 741 drives an operation of a planar cam and a cogged cam (not shown) included in the cam box 742, the tool change unit 30 can make upward/downward movement and rotation of 180 degrees to perform tool change; and the power unit 73 is made up of a pneumatic cylinder 731, a servomotor 733, a driving roller 734, a driven roller 736, a belt 735, a driving shaft 737 having an internal toothed section 7371, a rotational axle 738 having an external toothed section 7381, and a protective cylinder 739, wherein the driving roller 734 is driven by the servomotor 733 to rotate; the belt 735 is wound around the driving roller 734 and the driven roller 736; the driven roller 736 is coupled to and fixed to the driving shaft 737; the rotational axle 738 penetrates through the driving shaft 737 and the external toothed section 7381 of the rotational axle 738 is in mating engagement with the internal toothed section 7371 of the driving shaft 737, so that the servomotor 733 drives the rotational axle 738 to rotate; a top end of the rotational axle 738 is coupled to and fixed to a cylinder rod 732 of the pneumatic cylinder 731, so that the pneumatic cylinder 731 is operable to drive the rotational axle 738 to move upwards and downwards; the driving shaft 737 and the rotational axle 738 are received in the protective cylinder 739 and only a bottom end of the rotational axle 738 exposed outside the protective cylinder 739. By means of the above structural arrangement and an effect of high precision positioning that the servomotor 733 provides, the tool change unit 30 can be driven to do upward/downward movement and 180-degree rotation in order to perform tool change.

Figure 34:
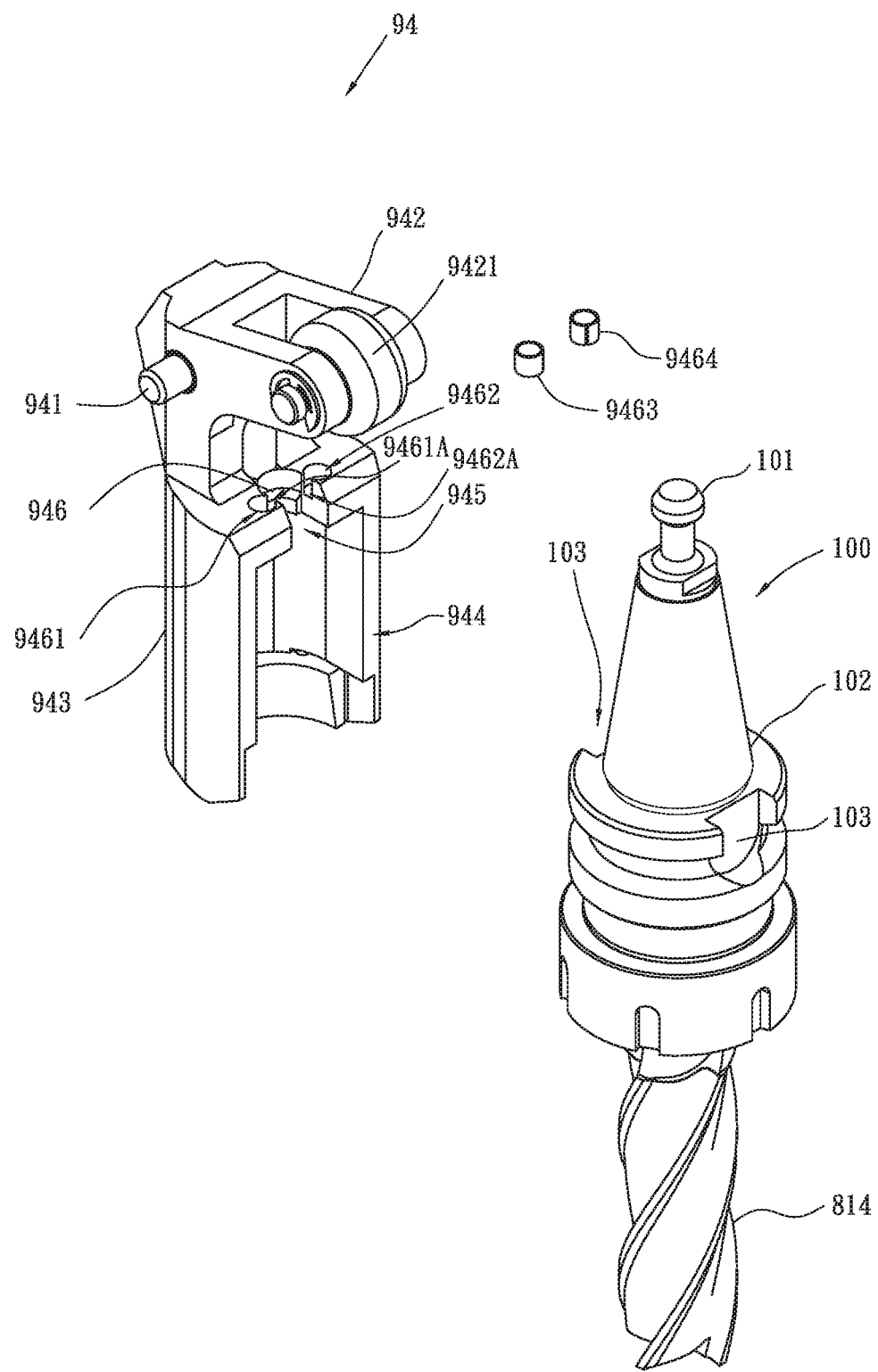
FIG. 34 is a perspective view showing a tool receptacle and a tool bar with a tool mounted thereto in a detached condition.
Figure 35:
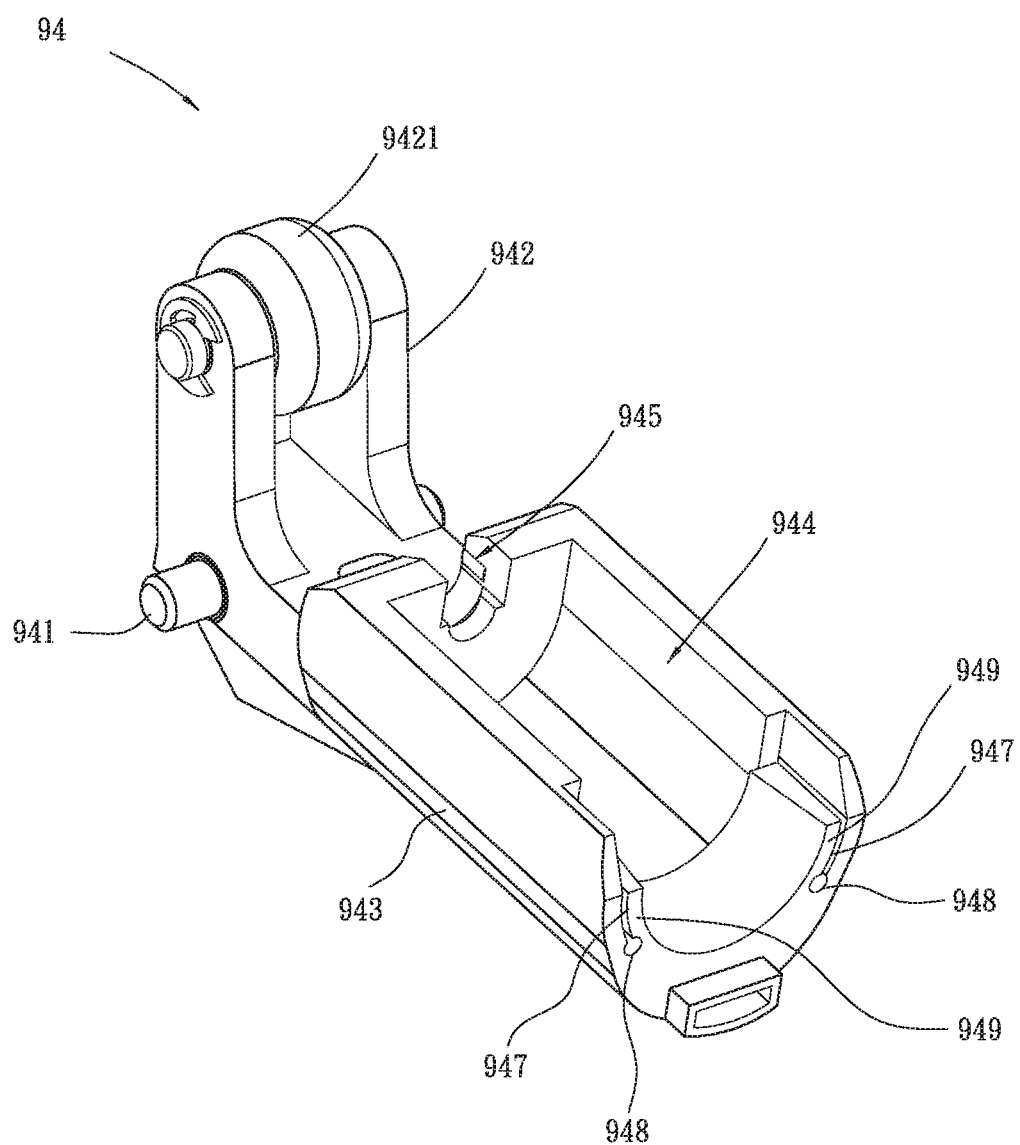
FIG. 35 is a perspective view showing the tool receptacle from a different angle.
Figure 36:
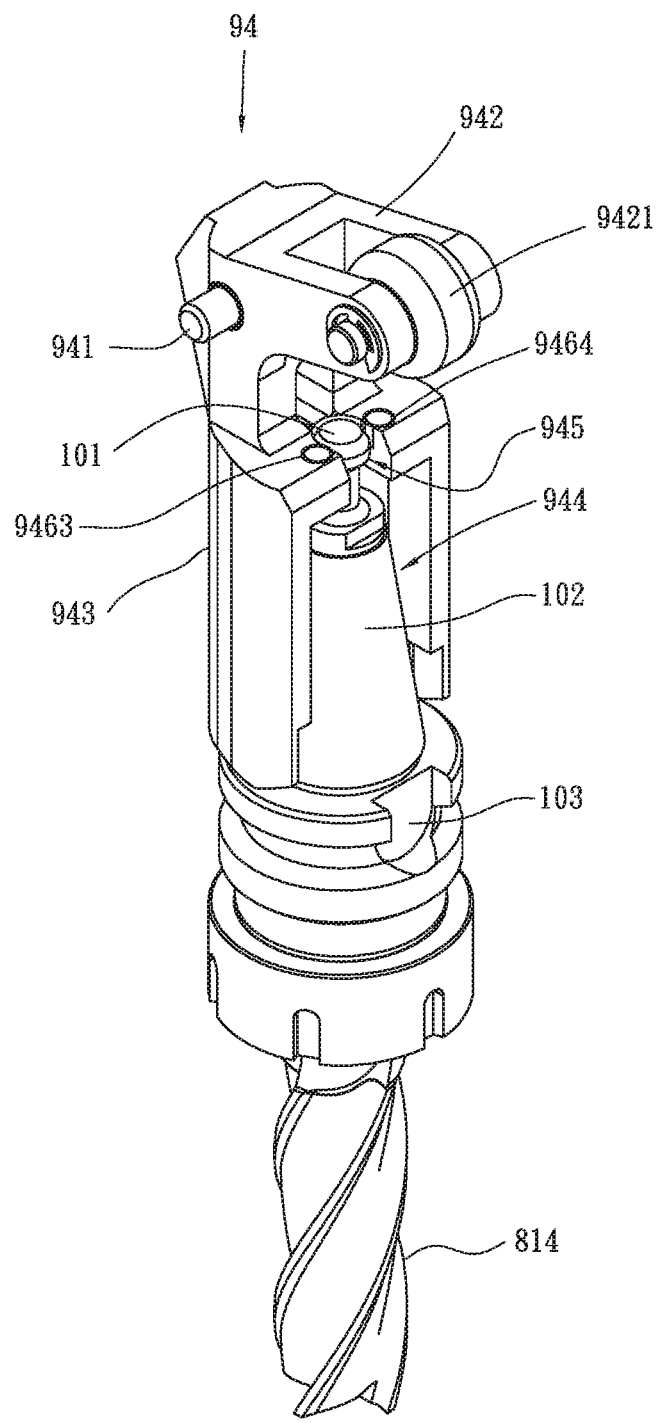
FIG. 36 is a perspective view showing the tool receptacle and the tool bar with the tool mounted thereto in an assembled form.

Referring to FIGS. 25-38, in the following, a tool change operation that is performed by the tool change unit 30 according to the present invention that is used in combination with the power unit 71, a circular disc style tool magazine 90 and a main axle 80 of a metalworking machine is provided for describing, exchange between a main-axle tool 814 and magazine tool 901 is carried out with a mode based on upward/downward movement of the main axle 80, wherein the main axle 80 includes a constraining section 81 movable in unison therewith. The constraining section 81 has an upper part that forms a straight-edge section 813 and a lower part that forms a slope-edge section 811. The slope-edge section 811 has a lowest end that defines a contact starting point 812. The circular disc style tool magazine 90 comprises a magazine body 91, a rotation disc 92, multiple tool receptacles 94 rotatably mounted on the rotation disc 92 and arranged annularly, a driving device 95, and an upward/downward push-pull device 93. The magazine body 91 is provided, on one side thereof, with a protruding ring 911 that protrudes axially. The rotation disc 92 includes a through hole 923, and multiple rotation bearings 922 arranged in an annular form and close to the through hole 923. Multiple driving bearings 921 are annularly arranged along an outer circumference of the rotation bearings 922. The annularly arranged multiple rotation bearings 922 are fit over the protruding ring 911 and are rotatable and rolling on the protruding ring 911. The driving device 95 is coupled to and fixed to the magazine body 91 and is located on the side that is opposite to the protruding ring 911 and includes a driving section 951 that can be driven to rotate. The driving section 951 is set in abutting engagement with each of the driving bearings 921, so that the driving section 951, when rotating, drives the rotation disc 92 to rotate forward or backward. The upward/downward push-pull device 93 is mounted to a mounting plate 932 and includes a push-pull section 931. The push-pull section 931 can be driven to move upwards and downwards. The upward/downward push-pull device 93 can be a pneumatic cylinder or a hydraulic cylinder. The mounting plate 932 is mounted to the protruding ring 911 to prevent the rotation disc 92 from separating from the protruding ring 911. Referring to FIGS. 34-36, each of the tool receptacles 94 includes a receptacle body 943 arranged in a longitudinal direction. The receptacle body 943 has a top end from which a constraining section 942 extends transversely to pivotally couple with the rotation disc 92. The constraining section 942 is provided with a roller 9421 rotatably mounted thereto. The top end of the receptacle body 943 is provided, on each of two sides thereof, with an axle bar 941 projecting outward therefrom. The receptacle body 943 has a bottom end that is made in a hollowed form. The receptacle body 943 is made in a partially covering form, including an opening 944 formed in one side and in communication with the outside. A top end of the opening 944 is formed as a narrowed opening 945 having a reduced diameter, and a positioning section 946 is formed inwardly of the narrowed opening 945. The narrowed opening 945 is in communication with an interior of the receptacle body 943. The positioning section 946 is made as a stepped rim extending along an outer circumference of the narrowed opening 945. The positioning section 946 is provided, on each of two sides thereof, with a recess 9461, 9462 that has a side opening 9461A, 9462A. Each of the recesses 9461, 9462 is provided, in an interior thereof, with a ring spring plate 9463, 9464. Each of the ring spring plates 9463, 9464 is exposed to the outside from the side opening 9461A, 9462A. Referring to FIG. 35, the tool receptacles 94 have a bottom end having two sides each of which is formed with a gripping section 949. The two gripping sections 949 each have a bottom end that is formed with an open slot 947 that is extended axially toward and connected to a top end. Each of the open slots 947 has an external end that is in communication with the outside, and the open slot 947 has an internal end that is formed with an expanded slot 948. Each the expanded slots 948 is also extended axially toward and connected to the top end. The two gripping sections 949 are expandable upon receiving a force acting thereon and is returnable back to an original form upon removal of the force acting thereon.

Figure 25:
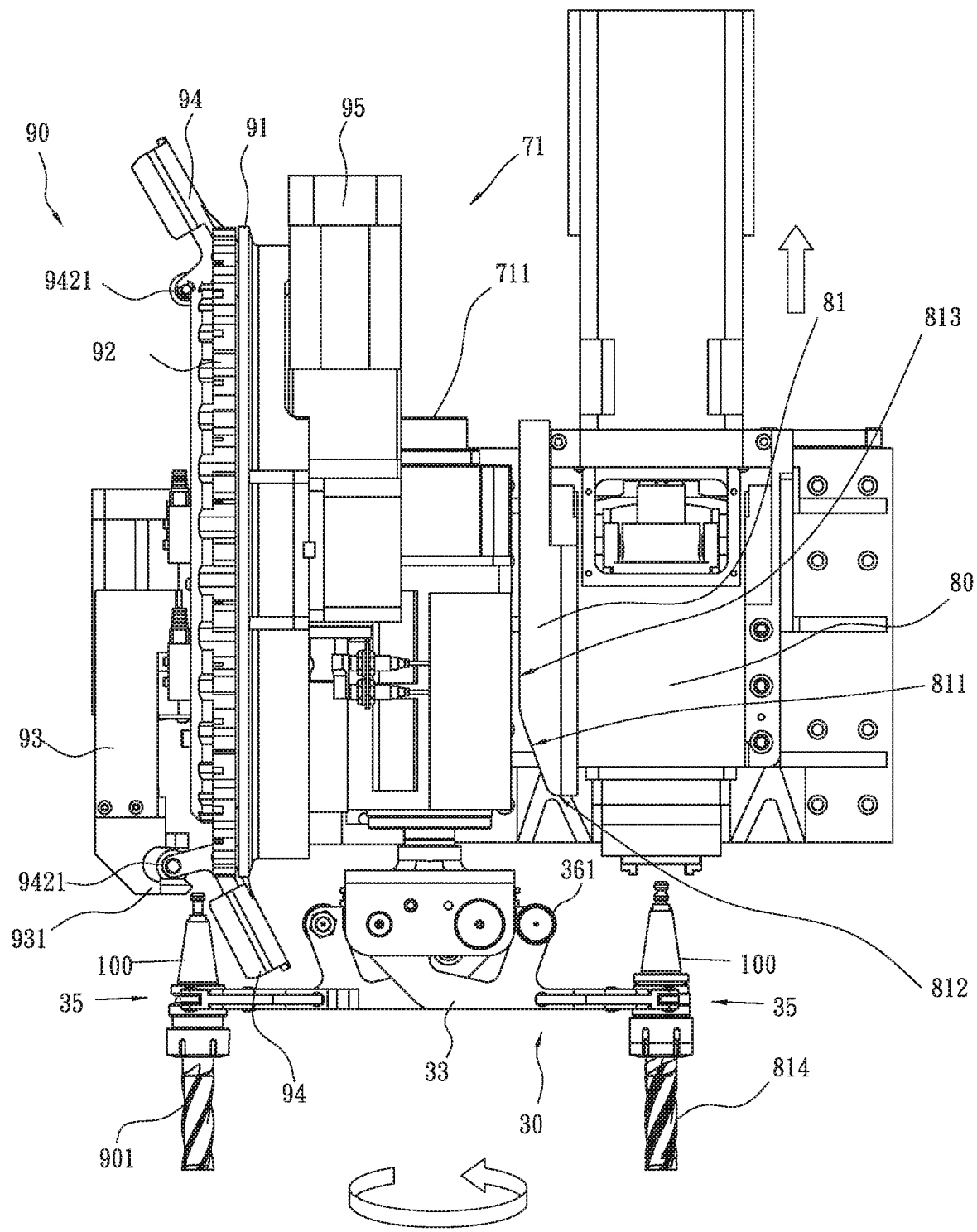
FIGS. 25-31 are schematic views showing the tool change unit according to the present invention carrying out a tool change operation through upwards and downwards movements of a main axle.

Referring to FIG. 25, each of the tool receptacles 94 is rotatably mounted on the rotation disc 92 to normally incline at angle toward an outer side of the rotation disc 92. When the rotation disc 92 is rotating, the roller 9421 of each of the tool receptacles 94 passes through the push-pull section 931 of the upward/downward push-pull device 93. When a specific one on magazine tools 901 is selected, the push-pull section 931 is driven to move downwards and pushes the roller 9421 of the tool receptacle 94 that holds the specific magazine tool 901 to cause the tool receptacle 94 to incline toward an inner side of the rotation disc 92 by an angle, and simultaneously causes the tool bar 100 to which the specific magazine tool 901 is mounted to be gripped by the gripping element 35 of the tool change unit 30 so as to be set in a ready-for-tool-change state; on the other hand, when change of the main-axle tool 814 is required, the main axle 80 is moved upwards, and the arm body 33 of the tool change unit 30 is caused by an abutting engagement relationship between the constraining section 81 and the actuation element 361 to gradually return back to an original position, and with subsequent and continuing upward movement of the main axle 80, the tool bar 100 to which the main-axle tool 814 is mounted is gripped by the gripping element 35 and no longer moves upwards with the main axle 80. Once the main axle 80 has moved upwards to a location of being not in interference with rotation of the tool change unit 30, the power unit 71 drives the tool change unit 30 to rotate by 180 degrees so as to switch the positions of the specific magazine tool 901 and the main-axle tool 814.

Figure 26:
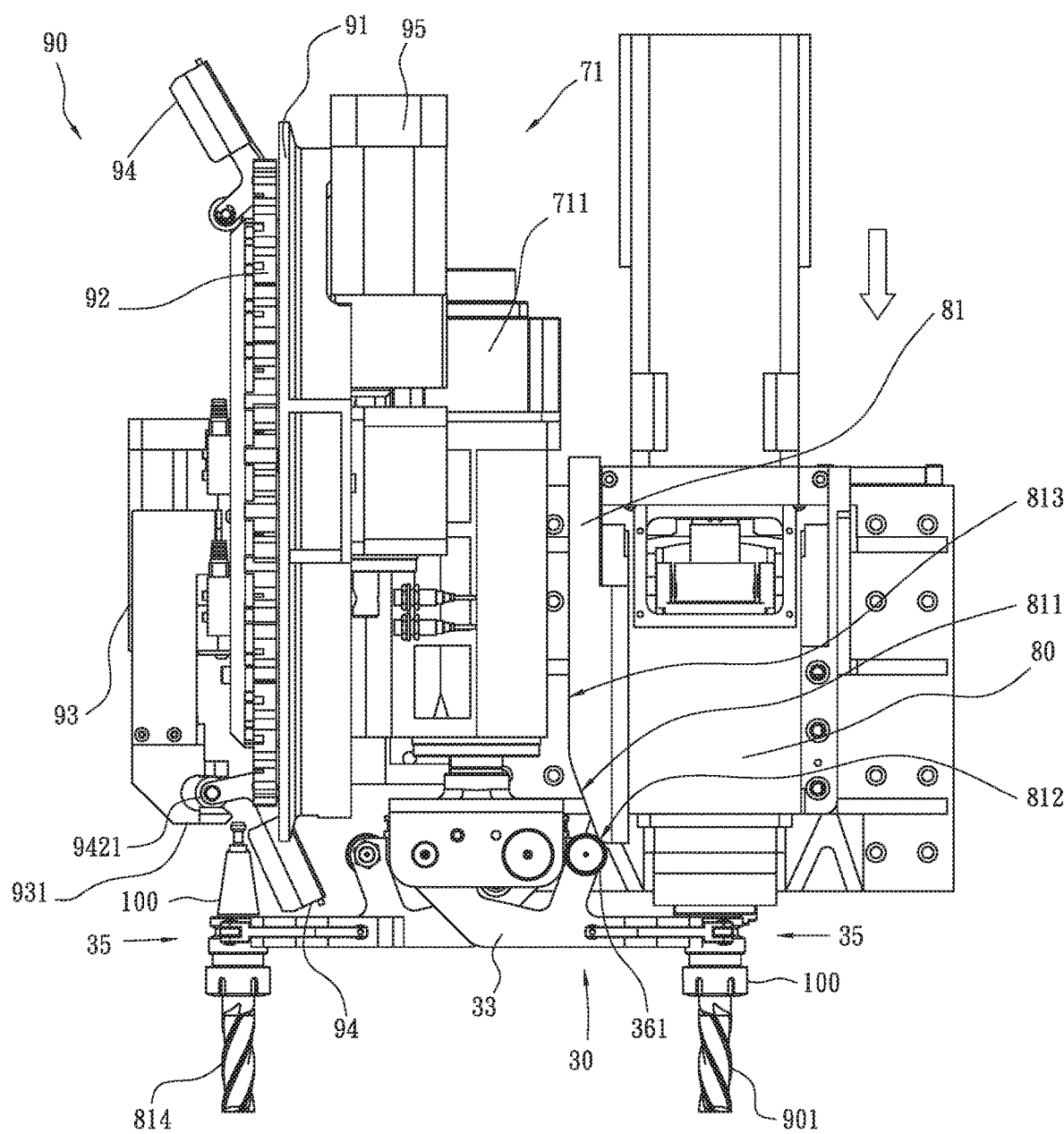
Figure 27:
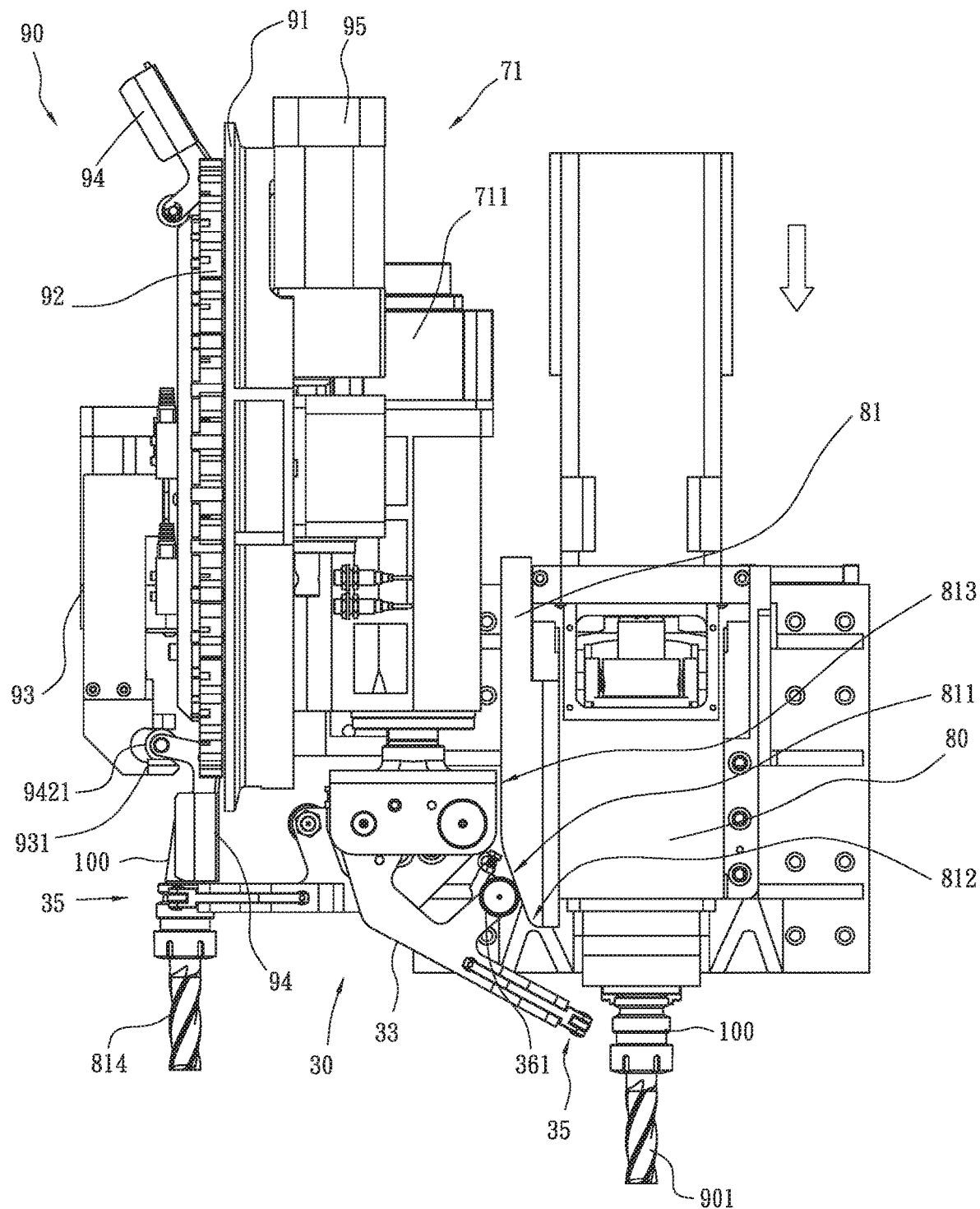
Figure 28:
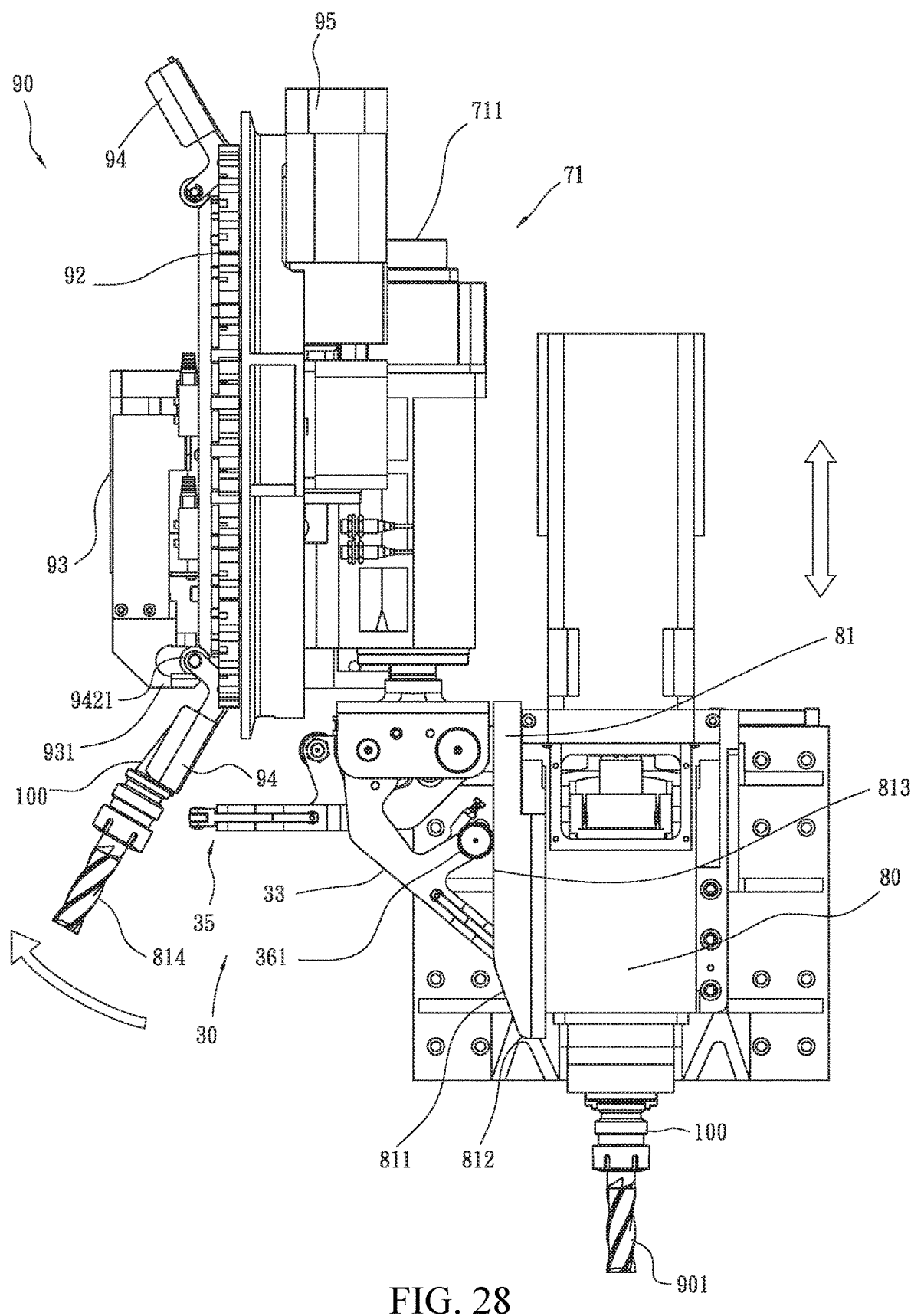

Referring to FIGS. 26-28, due to for example necessity for subsequent machining operation, the main axle 80 is moved downward again such that before the contact starting point 812 of the constraining section 81 gets into contact with the actuation element 361, the tool bar 100 to which the magazine tool 901 is mounted is gripped and held by the main axle 80, and with the main axle 80 moving further downwards, the slope-edge section 811 is brought into contact with and abutting the actuation element 361 to cause the arm body 33 to gradually rotate for downward movement so as not to interfere with the subsequent downward movement of the main axle 80 (as shown in FIG. 27). With further downward movement of the main axle 80, the straight-edge section 813 of the constraining section 81 is set in constant abutting engagement with the actuation element 361 to continuously keep the arm body 33 in a downward rotated and deflected state. An entire distance provided by the straight-edge section 361 is set to meet a stroke for upward/downward movement of the main axle 80 necessary for a machining operation to be carried out. Under this condition, to remove the main-axle tool 814 of which the position has been switched to located below the tool magazine 90, the push-pull section 931 is driven to pull upward and the tool receptacle 94 is caused to rotate for moving toward the outer side of the rotation disc 92 to set up an inclination angle relative to the rotation disc 92 (as shown in FIG. 28). During the process of rotating toward the outer side of the rotation disc 92, the tool receptacle 94 simultaneously grips and holds the tool bar 100 that carries the main-axle tool 814 thereon and is located on the tool change unit 30 (as shown in FIG. 27).

Figure 29:
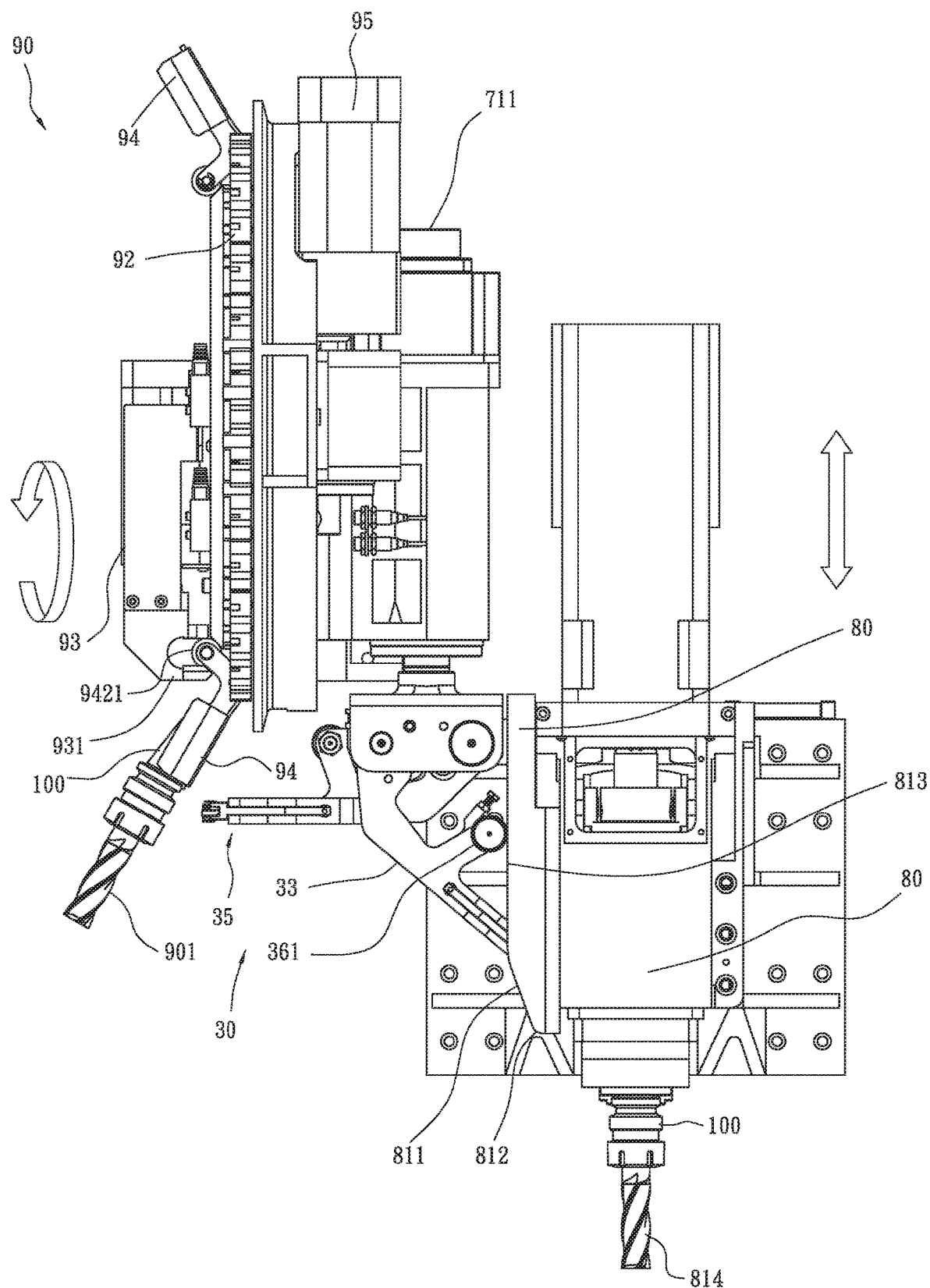
Figure 30:
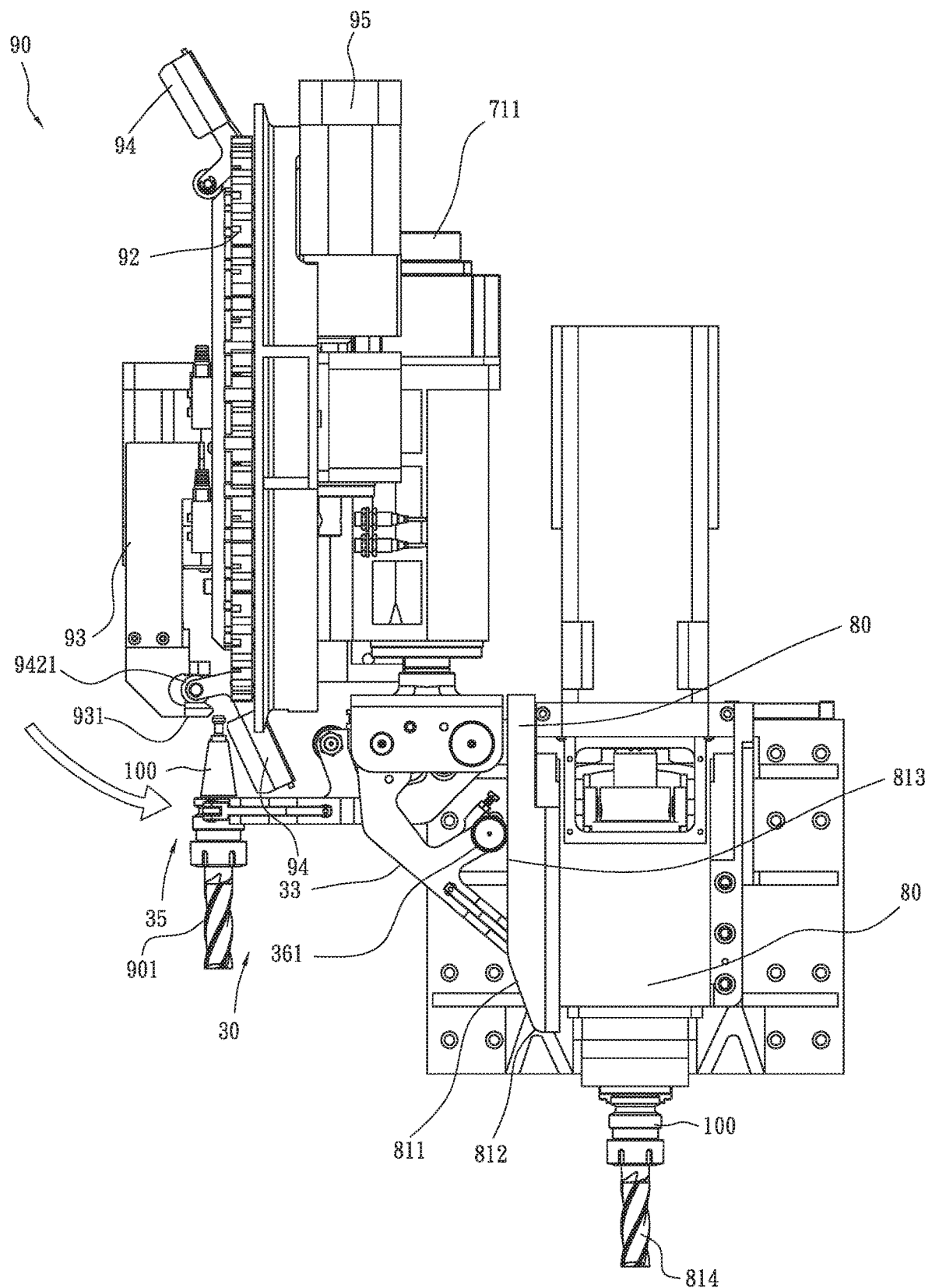
Figure 31:
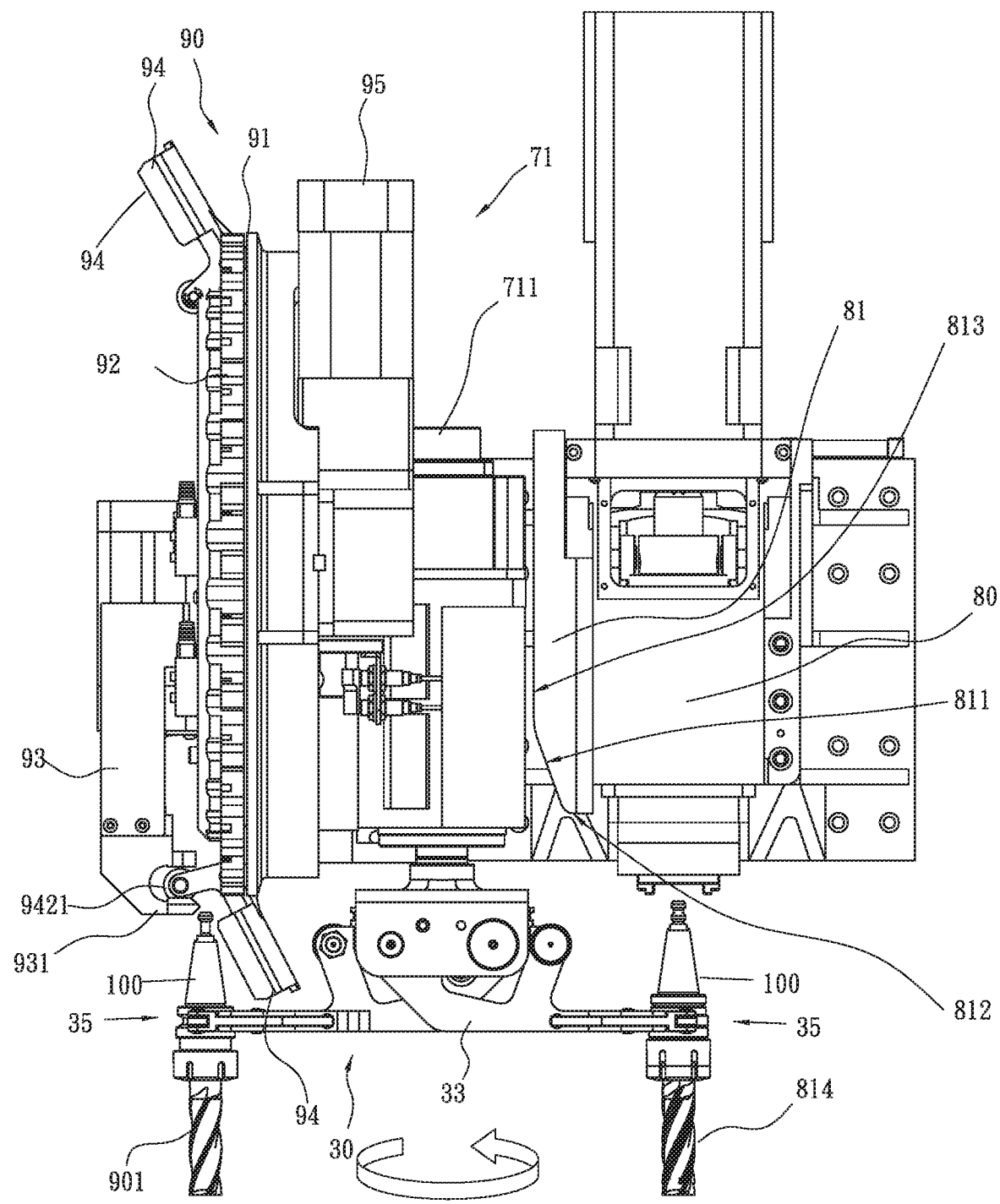
Figure 32:
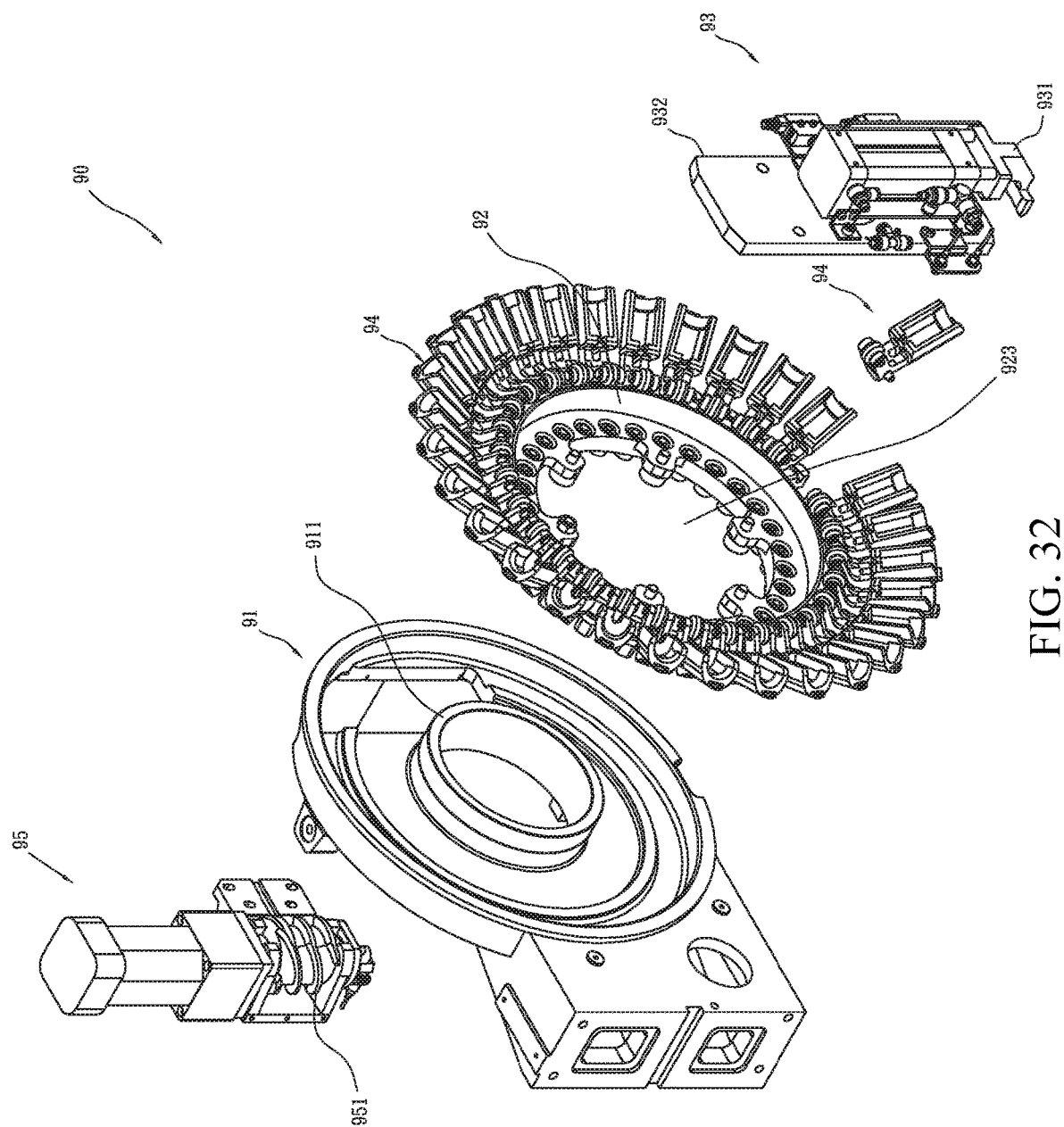
FIG. 32 is an exploded view showing a circular disc style tool magazine.
Figure 33:
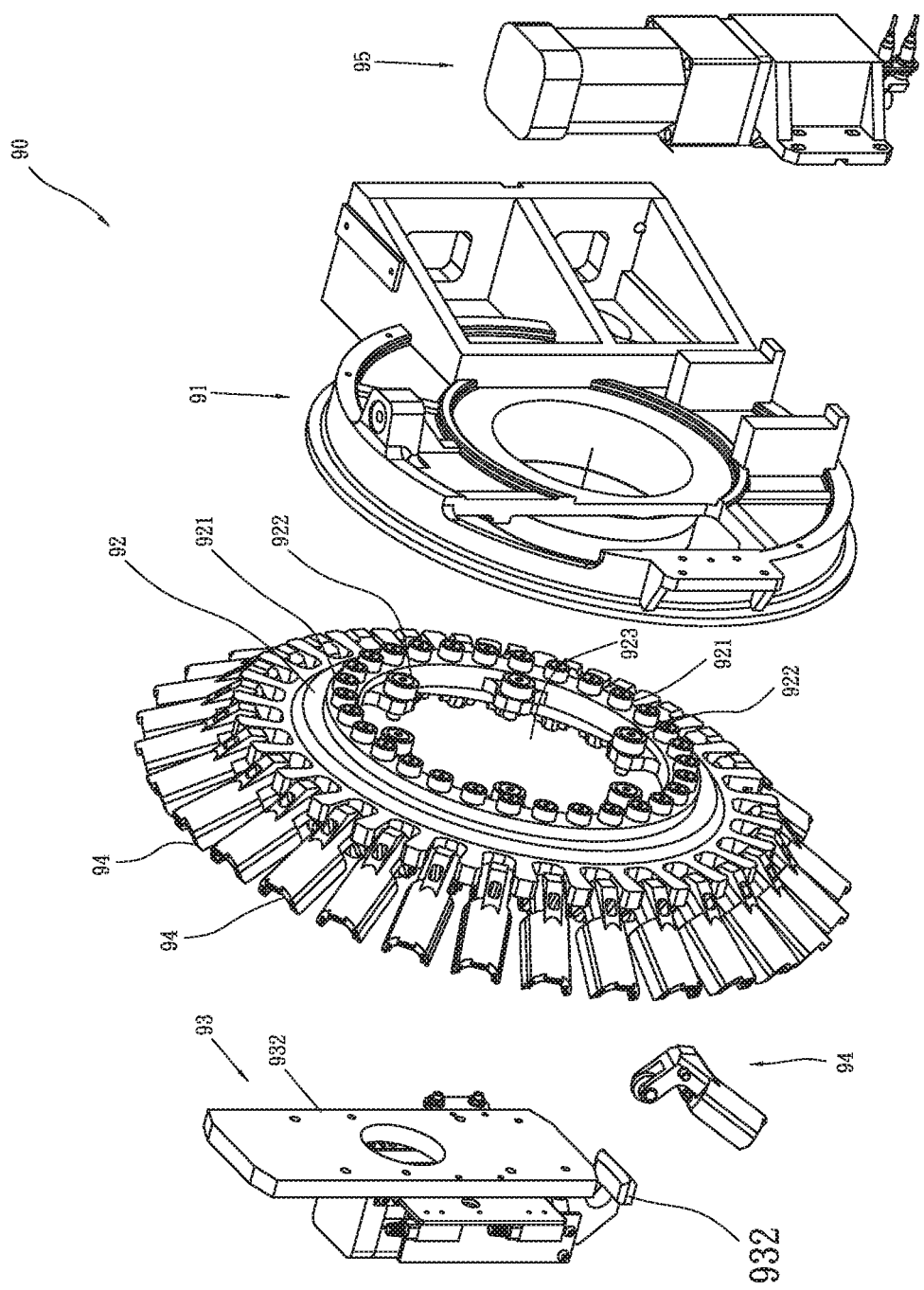
FIG. 33 is an exploded view showing the circular disc style tool magazine from a different angle.

Further referring to FIGS. 29-31, the rotation disc 92 is rotated according to settings of a predetermined procedure and stops when the tool receptacle 94 associated with a selected one of the magazine tools 901 is located at the push-pull section 931, wherein the push-pull section 931 is driven to move downwards and pushes the roller 9421 of the tool receptacle 94 that grips and holds the magazine tool 901, so as to cause the tool receptacle 94 to incline toward the inner side of the rotation disc 92 by an angle and also to make the tool bar 100 that carries the magazine tool 901 to be gripped by the gripping element 35 of the tool change unit 30 to be again set in the ready-for-tool-change state (as shown in FIG. 30). When it comes for the main axle 80 to change the main-axle tool 814 again, it moves upwards and the arm body 33 of the tool change unit 30 follows the abutting engagement relationship between the constraining section 81 and the actuation element 361 to gradually return back to an original position, and with subsequent and continuing upward movement of the main axle 80, the tool bar 100 that carries the main-axle tool 814 is gripped by the gripping element 35 and no longer moves upwards with the main axle 80. Once the main axle 80 has moved upwards to a location of being not in interference with rotation of the tool change unit 30, the power unit 71 drives the tool change unit 30 to rotate by 180 degrees so as to switch the positions of the magazine tool 901 and the main-axle tool 814 (here, the main-axle tool 814 being the magazine tool 901 that has been previously changed of the position thereof and being designated as 814 for distinguishing). It is appreciated from the above description, through repeating the steps of FIGS. 25-31, the main axle 80 can be repeatedly moved upwards and downwards for changing the main-axle tool.

Figure 37:
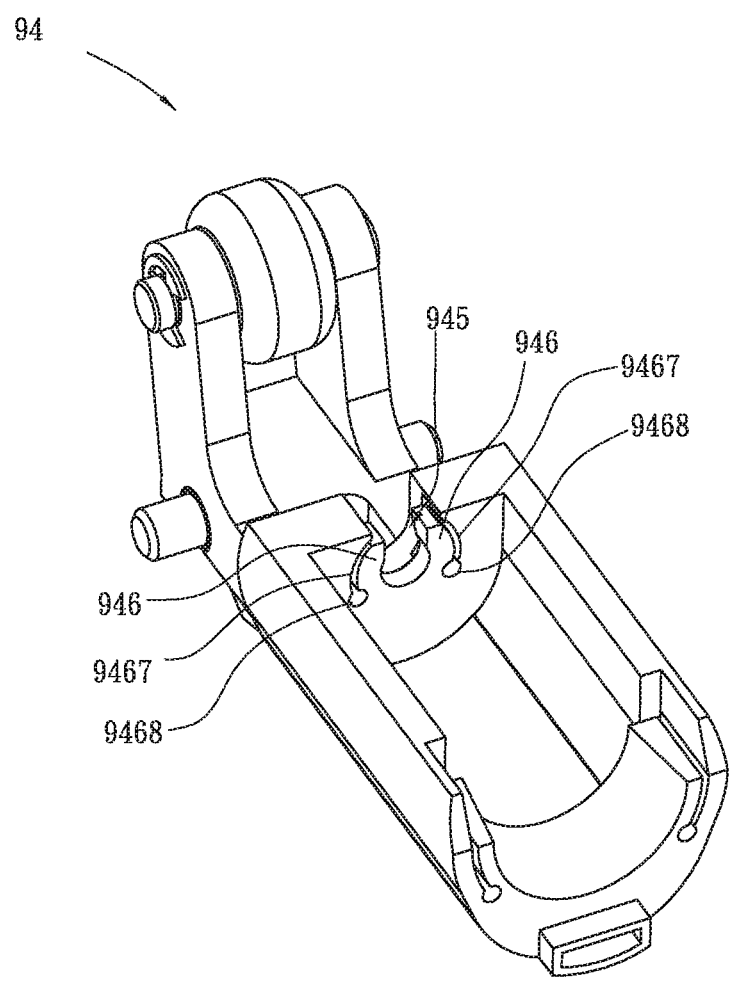
FIG. 37 is perspective view showing a second embodiment of a positioning section of the tool receptacle.
Figure 38:
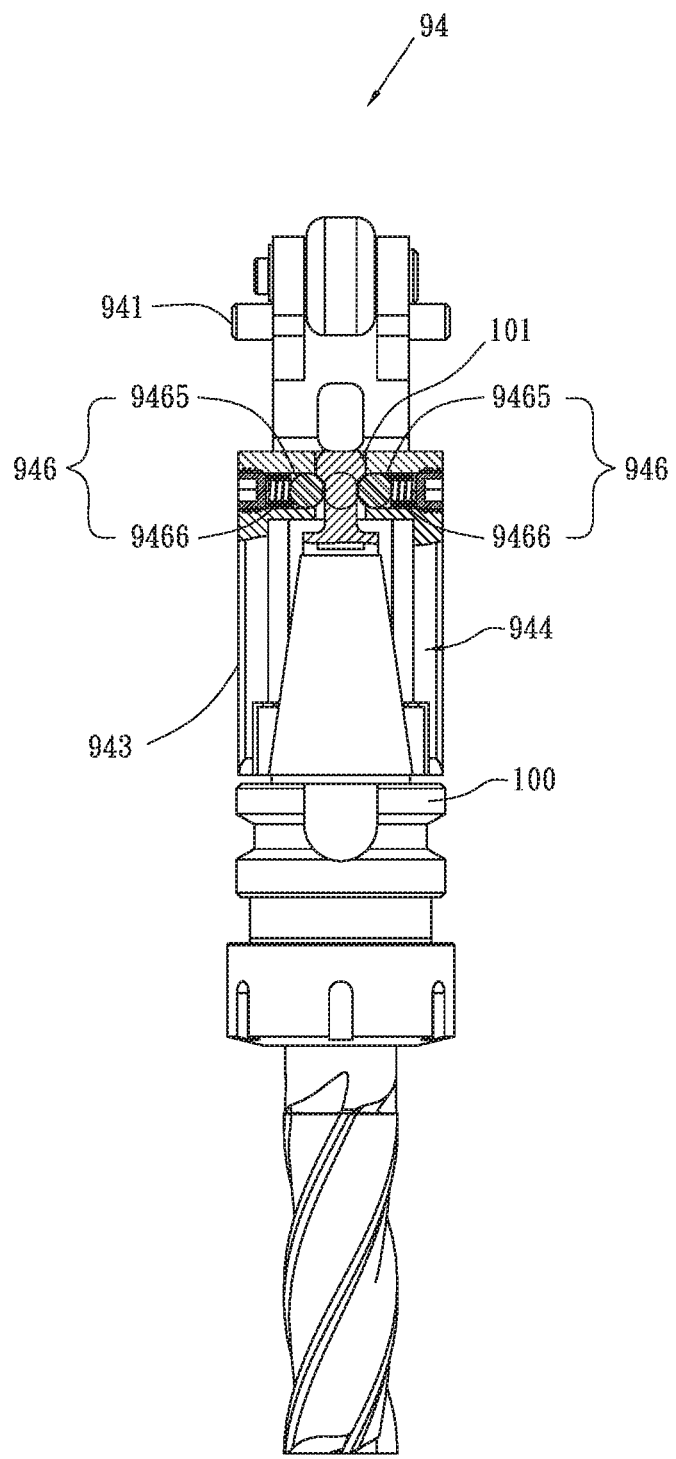
FIG. 38 is perspective view showing a third embodiment of the positioning section of the tool receptacle.

Referring to FIGS. 34-36, additional description concerning coupling and fixing between the tool bar 100 and the tool receptacle 94 will be provided. The tool bar has a necked head 101 that is fit to and engages with the positioning section 946 (stepped rim) of the tool receptacle 94 so as not to fall and is subjected to resilient compression from the two ring spring plates 9463, 9464 to not oscillate leftward and rightward. The tool bar 100 has a tapering body 102 that is confined and clamped by the two gripping sections 949 on the bottom part of the tool receptacle 94, so that the tool bar 100 is entirely and securely gripped and held. The two gripping sections 949 are pressed by the tapering body 102 to slightly expand outward and accumulate an elastic reaction force, so that once the tool bar 100 moves out of the tool receptacle 94, the two gripping sections 949 contract back to the original position. Referring to FIG. 37, a second embodiment of the positioning section 946 of the tool receptacle 94 is shown. When the positioning section 946 exhibits a form of a stepped rim, each of two sides of the positioning section 946 is formed with an arc open slot 9467 penetrating through upper and lower ends and extending from the outside toward the inside. Each of the arc open slots 9467 has an internal end that is formed with an expanded slot 9468 that penetrates through the upper and lower ends. The narrowed opening 945 divides the positioning section 946 into a left side and a right side, and the coupling section 946 and the narrowed opening 945 define therebetween a structure or configuration of an elastic gripping claw that grips and holds a tool bar 100 in a manner of being expanded due to application of a force thereto and restoring an original condition due to removal of the force. Since in such an embodiment, the positioning section 946 itself is elastic, there would be of no need to make an arrangement of the recesses 9461, 9462 and the ring spring plates 9463, 9464. Referring to FIG. 38, a third embodiment of the positioning section 946 of the tool receptacle 94 is shown, which is also made in a form free of a stepped rim and includes multiple beads 9465 embedded in an inner circumferential surface of the narrowed opening 945 to each work with a spring 9466. Each of the beads 9465 is elastically expandable and retractable. The necked head 101 of the tool bar 100 can be set in simultaneous engagement with multiple beads 9465 to prevent from falling and to be elastically constrained by each of the beads 9465 from oscillating.

Figure 46:
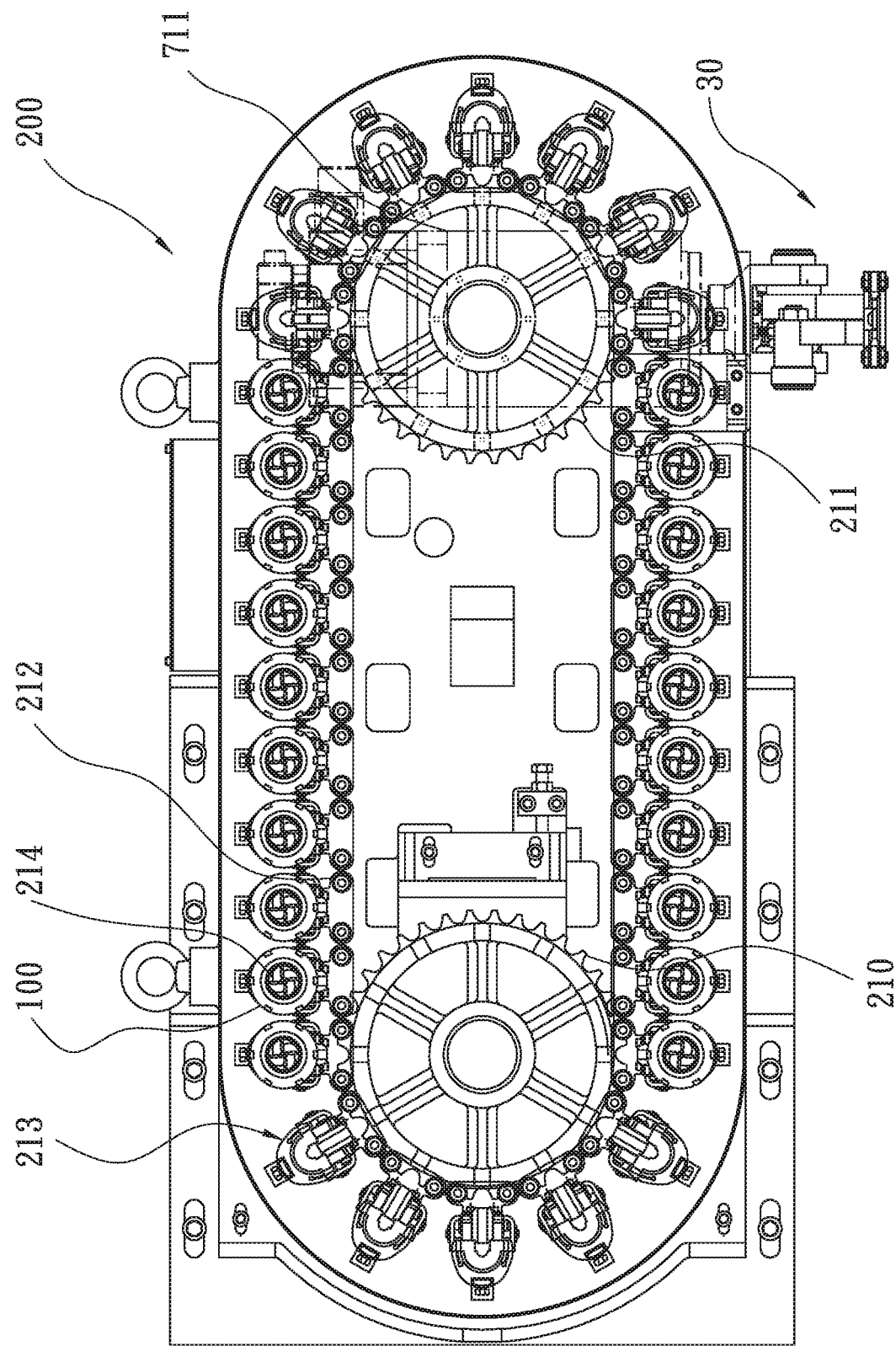
FIG. 46 is a side elevational view showing the present invention used with a chain style tool magazine.
Figure 47:
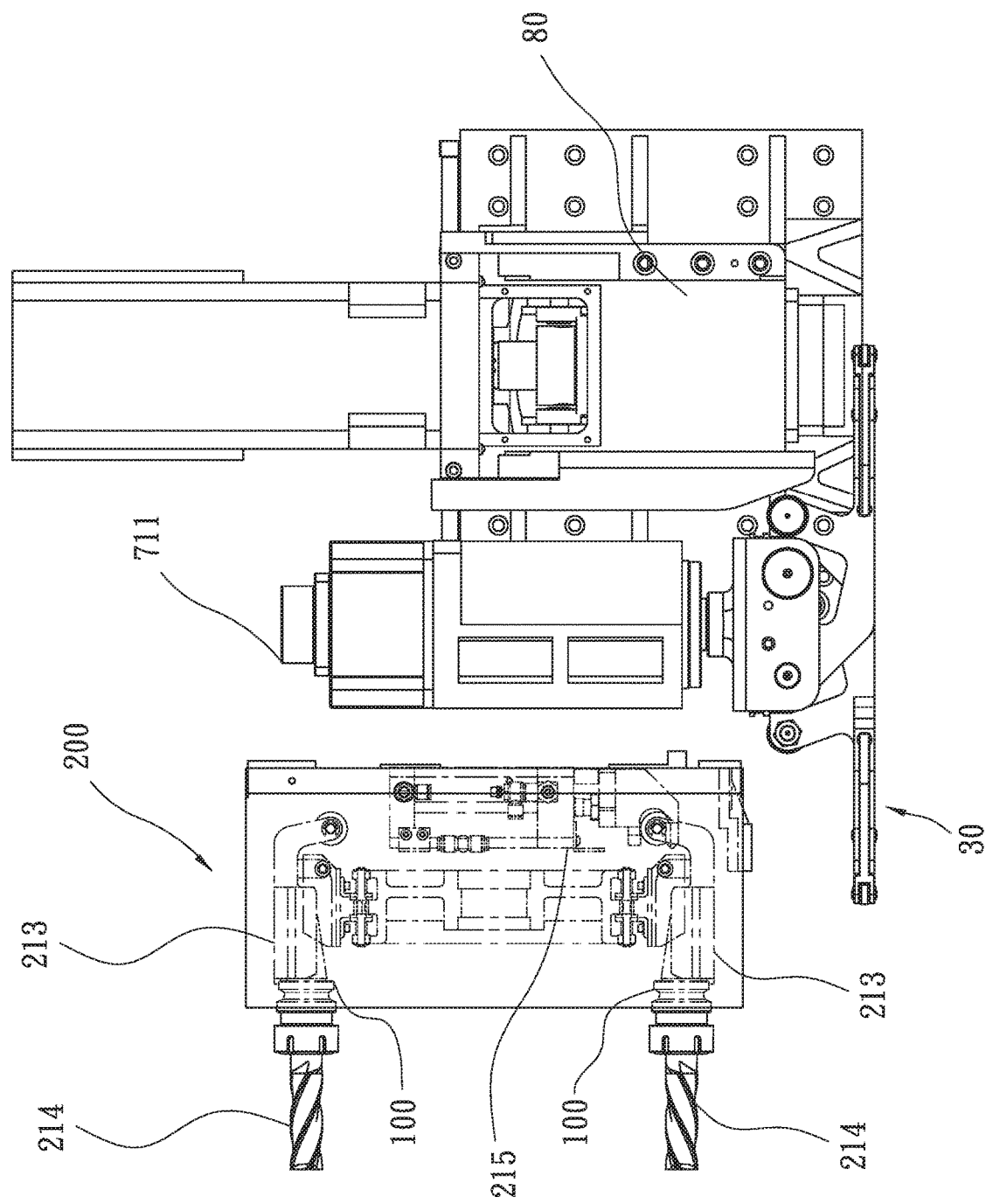
FIG. 47 is a schematic view showing the present invention used with a chain style tool magazine and a main axle.

Referring to FIGS. 46 and 47, a tool change device 70 formed of each of the tool change units 30, 40, 50, 60 according to the present invention and each of the power units 71, 72, 73, 74 used in combination therewith is also applicable to a chain style tool magazine 200 to carry out a tool change operation with respect to a main axle 80. The chain style tool magazine 200 at least includes a power roller 210, a driven roller 211, a chain 212 wound around the power roller 210 and the driven roller 211, multiple tool receptacles 213 rotatably mounted on the chain 212, and an upward/downward push-pull device 215. Each of the tool receptacles 213 receives and holds a tool bar 100 to which a magazine tool 214 is attached. The power roller 210, when rotating, drives the chain 212 and the driven roller 211 to rotate in unison therewith so as to drive the tool receptacles 213 and the tool bars 100 and the magazine tools 214 received in and attached to the tool receptacles 213 to carry out a tool selection operation. The tool receptacles 213 are completely identical to the tool receptacles 94 shown in FIG. 35 and repeated description will be omitted. However, the tool receptacle 213 can be embodied in the same way as the embodiment shown in FIG. 37 or 38. The upward/downward push-pull device 215 is operable to push and/or pull each of the tool receptacles 213 to rotate for moving. A tool change operation performed with respect to a main axle 80 by means of the chain style tool magazine 200 in combination with the tool change unit 30 and the power unit 71 according to the present invention is similar to that applied to the circular disc style tool magazine 90, and similar effect can be achieved, so that a detailed description of the tool change operation will be omitted.

Referring to FIGS. 39-45, the following provides a detailed description concerning a tool change unit 30 according to the present invention used in combination of a power unit 74 for application to a main axle 80 of a metalworking machine and a different circular disc style tool magazine 90A to illustrate a mode in which a drive motor 741 of the power unit 74 drive components of a cam box 742 to cause a rotational axle 743 to move upwards and downwards and rotate to carry out exchange between a main-axle tool 814 and a magazine tool 901A, wherein the main axle 80 also includes a constraining section 81 to move upwards and downwards in unison therewith. The constraining section 81 has an upper part forming a straight-edge section 813 and a lower part forming a slope-edge section 811. The slope-edge section 811 has a lowest point defining a contact starting point 812. Tool receptacles 94A of the circular disc style tool magazine 90A are of a known fully covering form. The tool receptacles 94A, during insertion or removal of tools, are driven to be in a longitudinal direction and is perpendicular to the ground surface and are driven to be in a transverse direction to be parallel with the ground surface during rotation for tool section.

Figure 39:
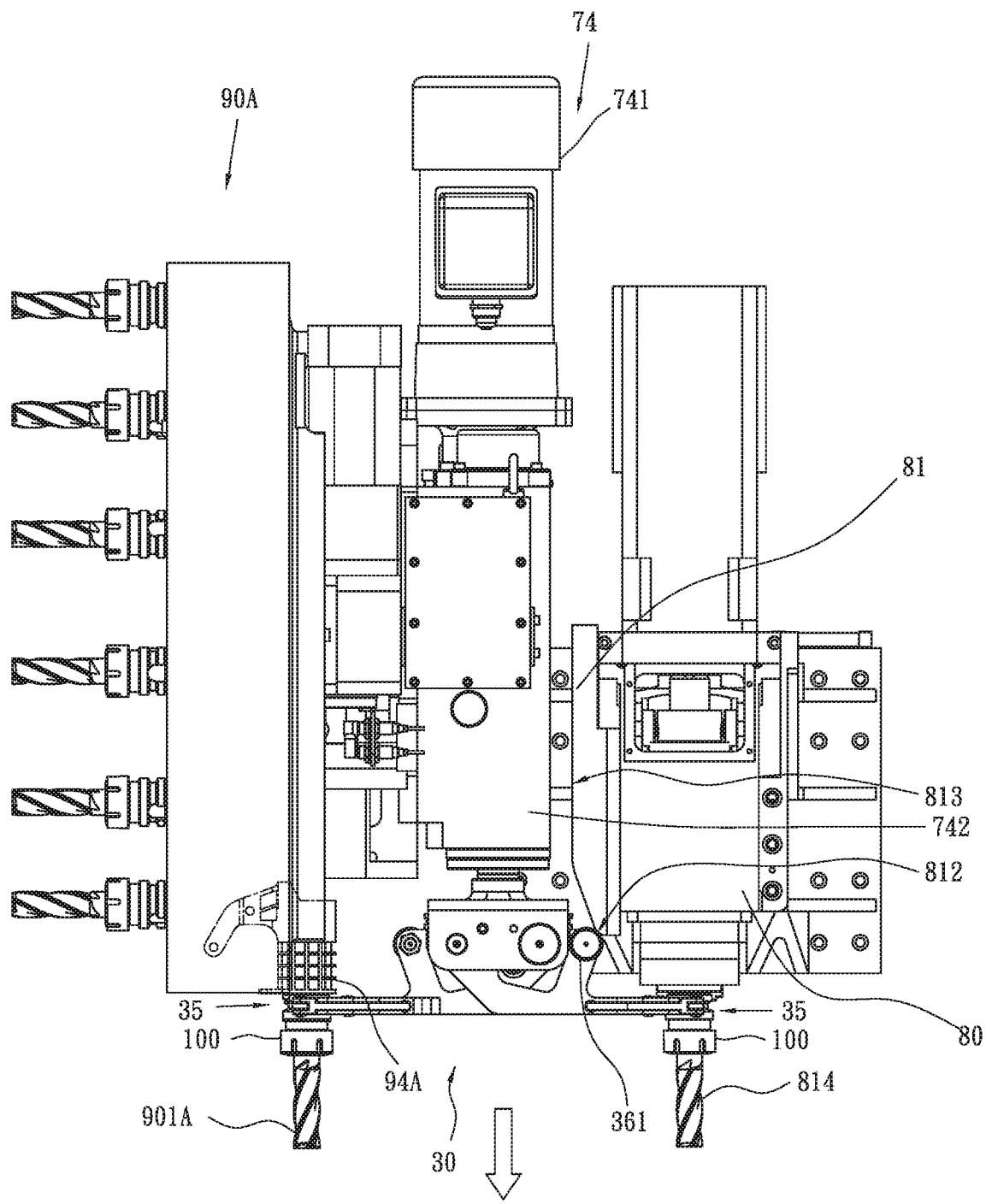
FIGS. 39-45 are schematic views showing the tool change unit according to the present invention carrying out a tool change operation through upwards and downwards movements of a tool change device.
Figure 40:
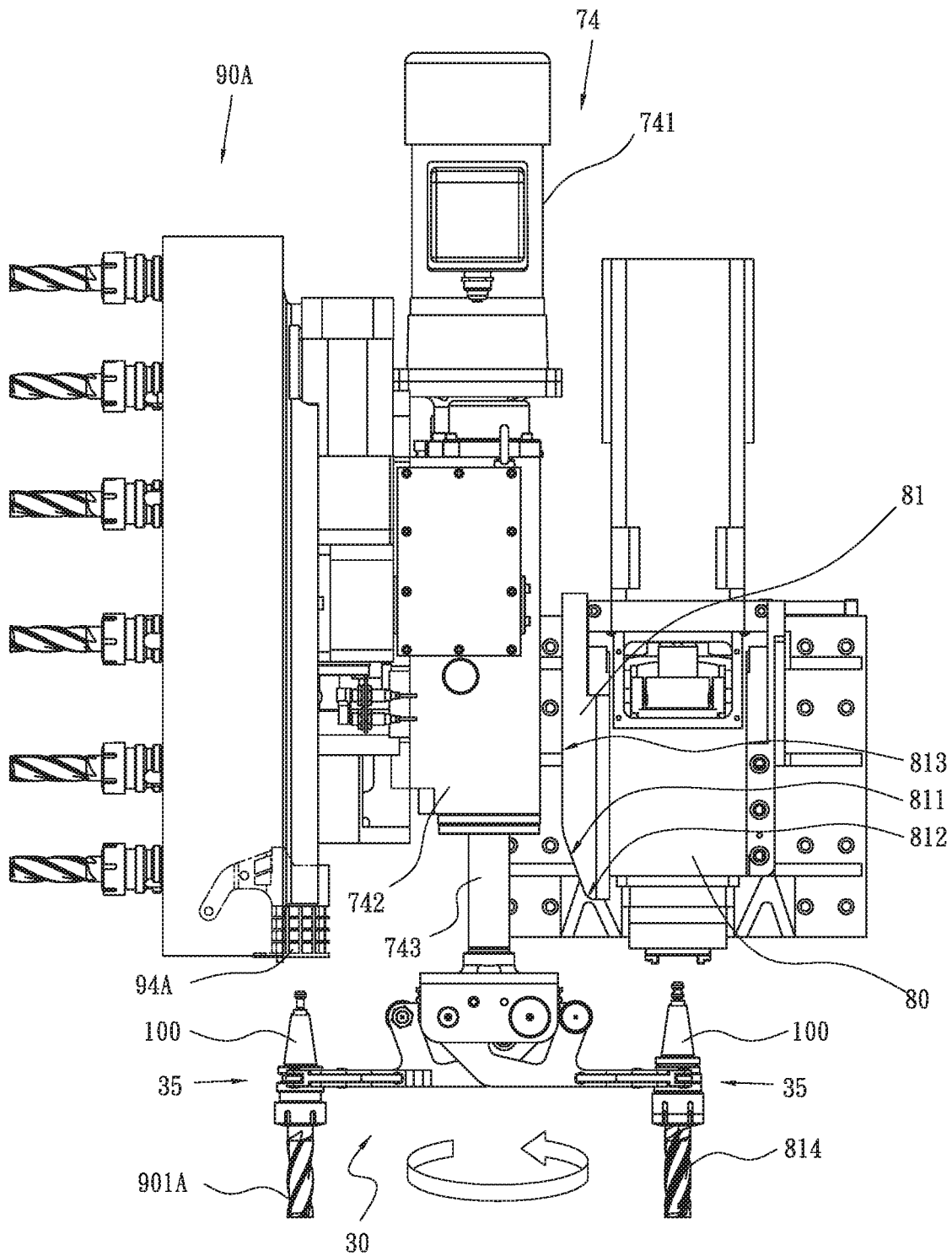
Figure 41:
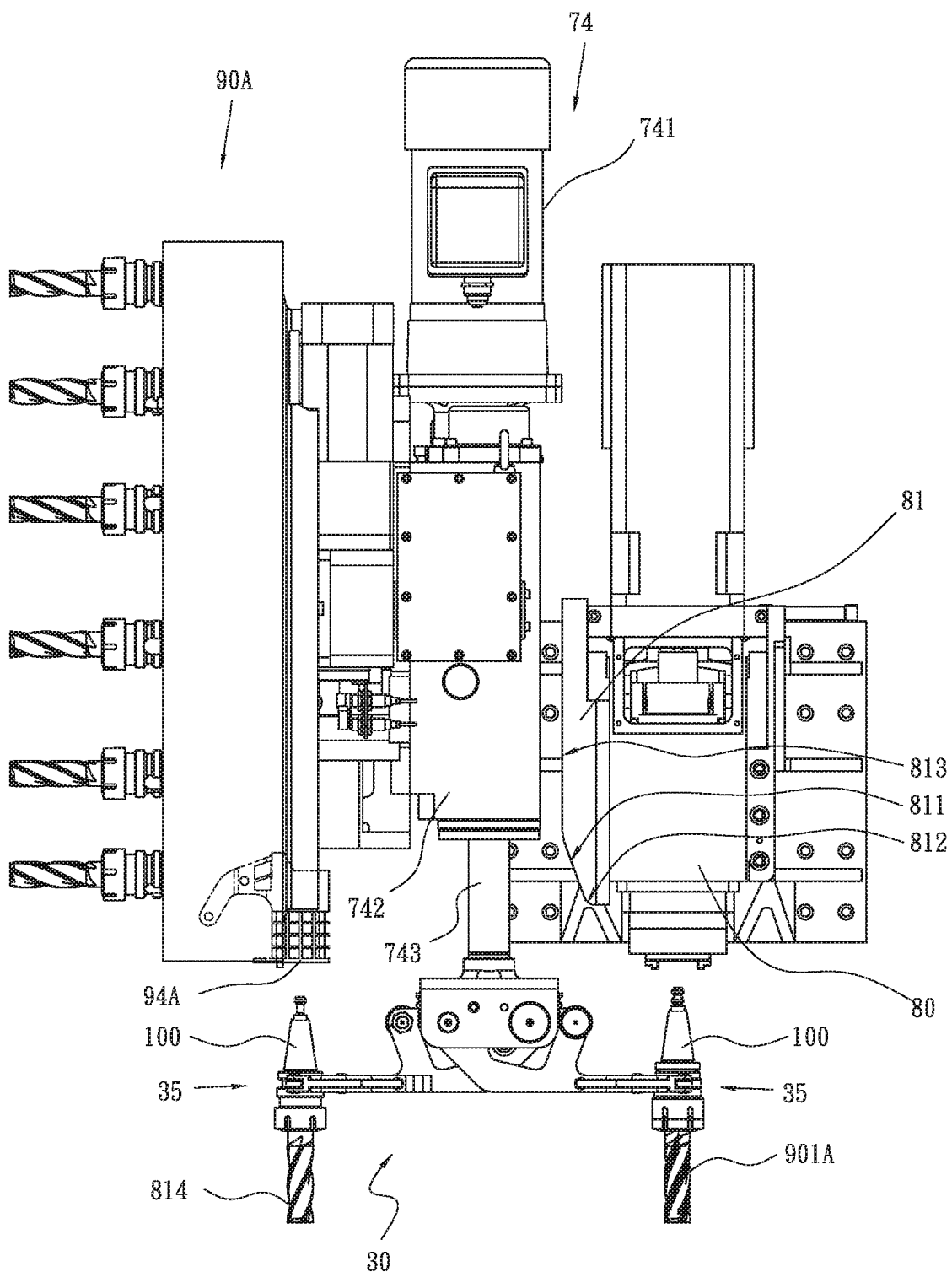
Figure 42:
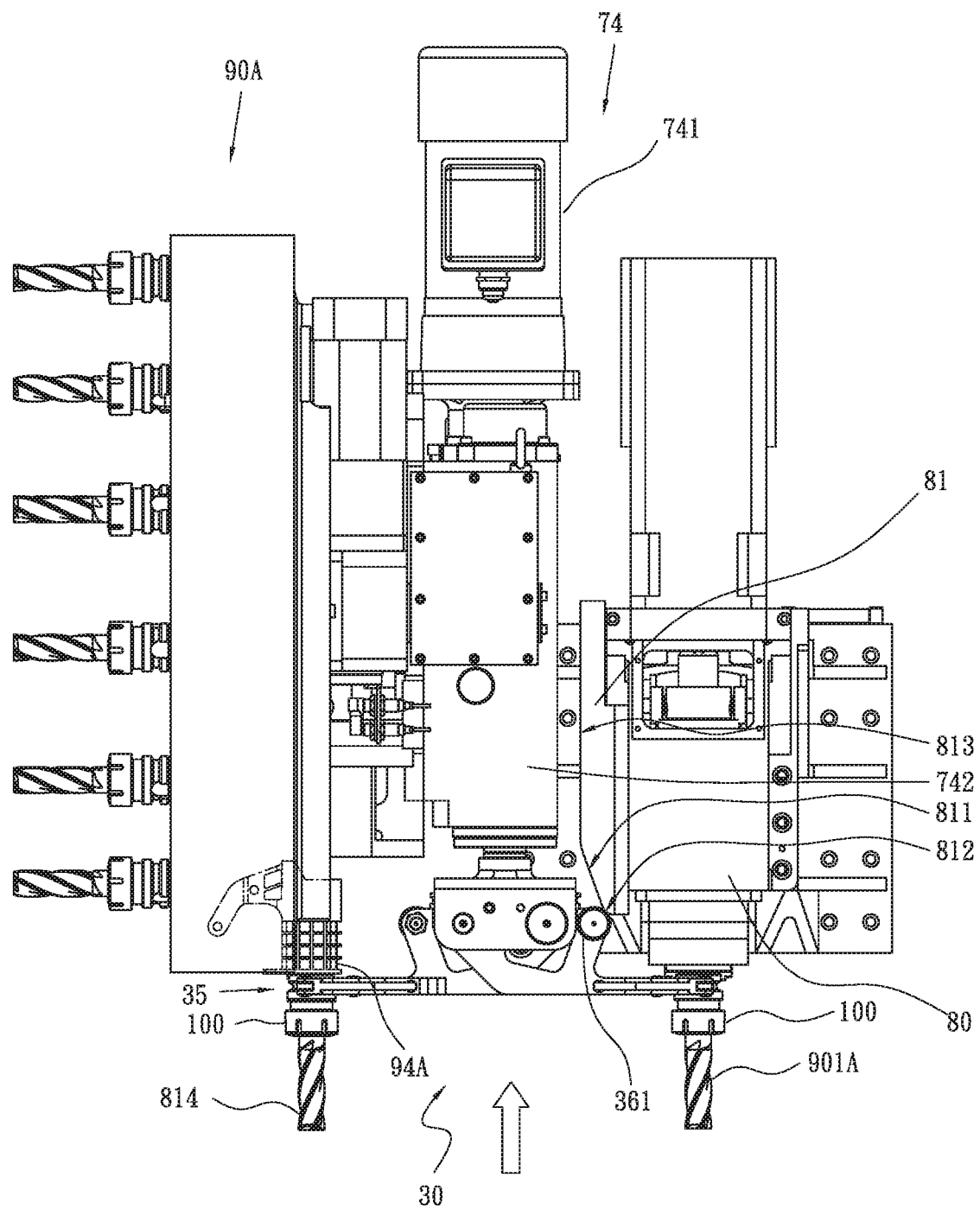
Figure 43:
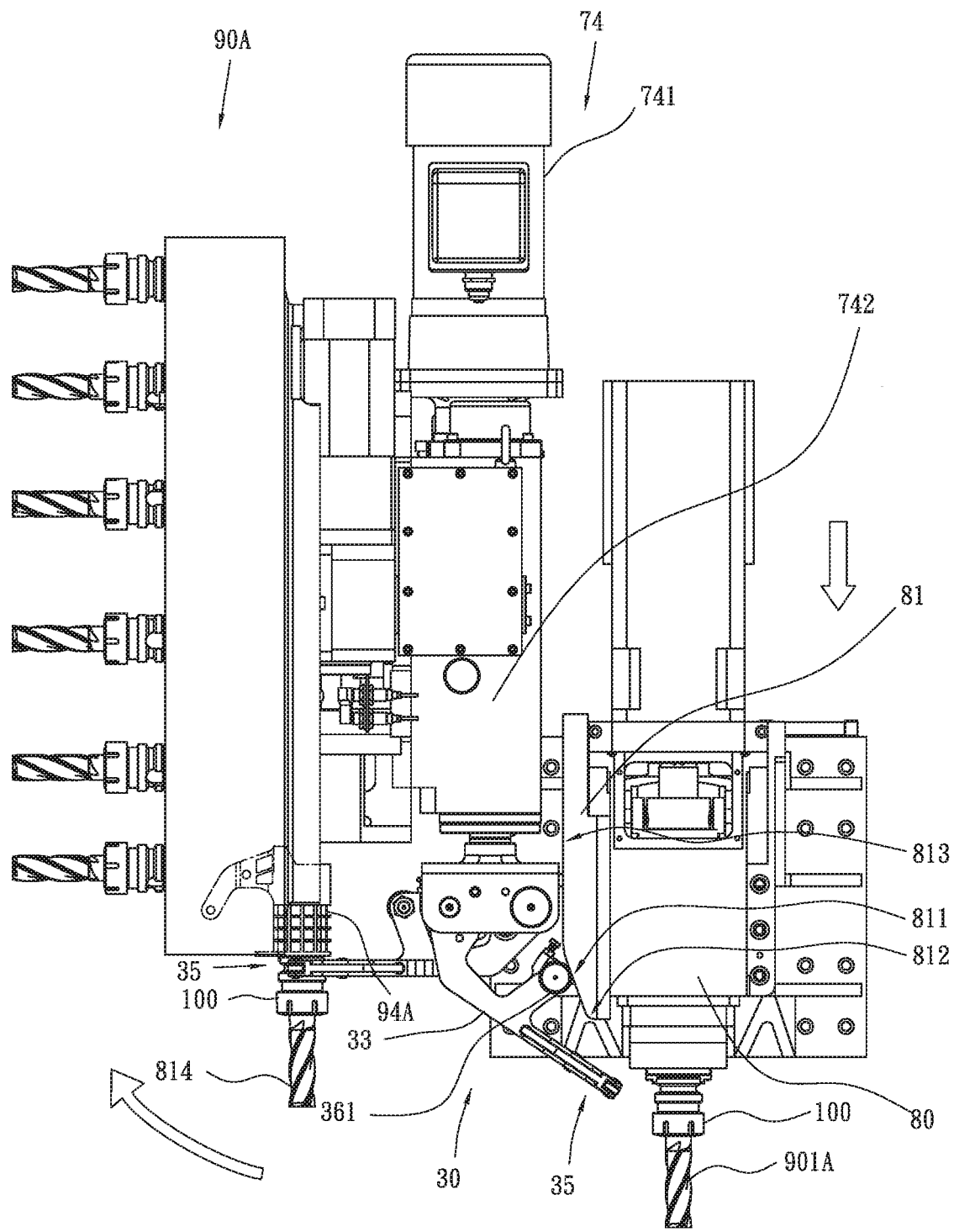
Figure 44:
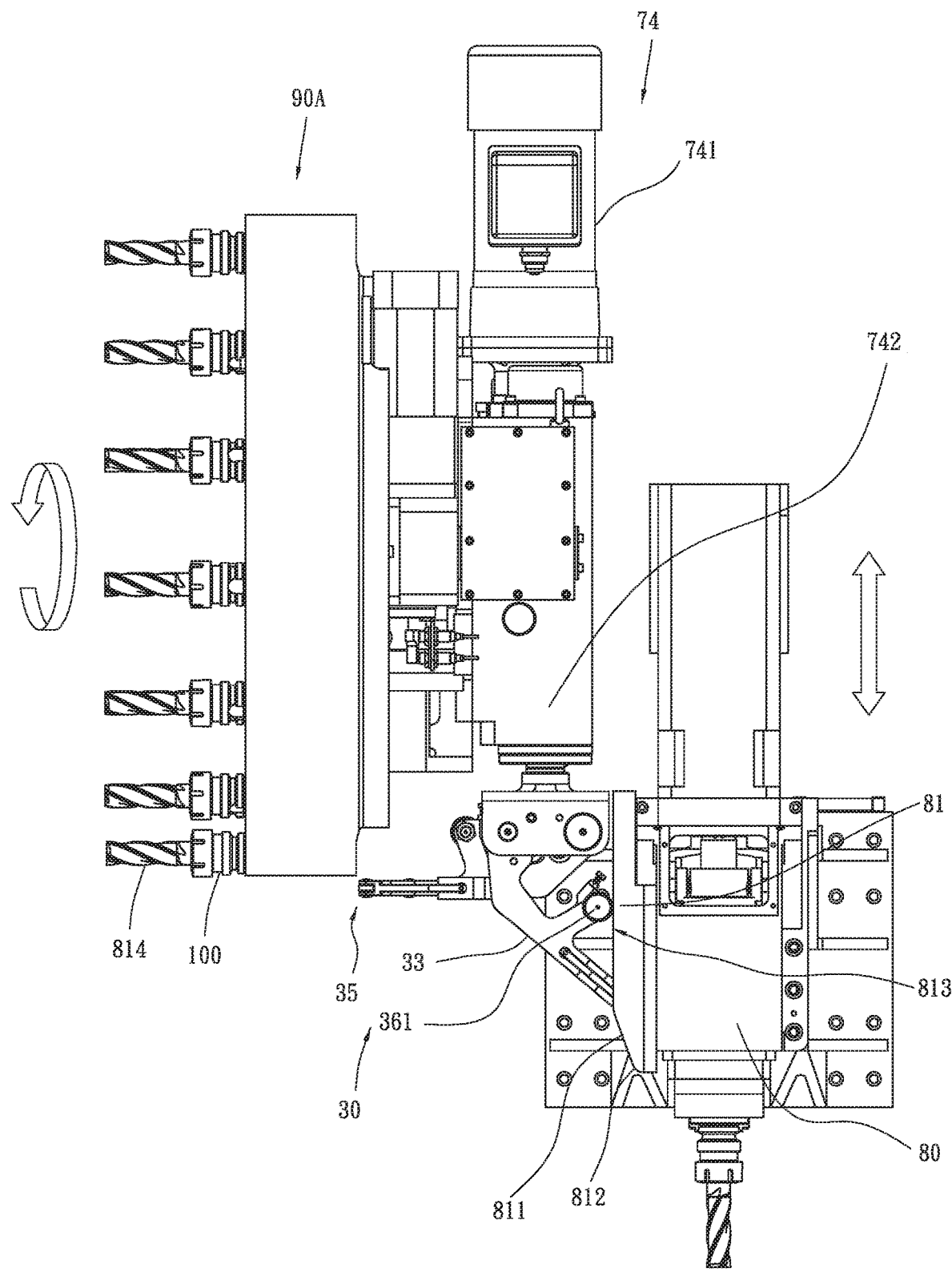
Figure 45:
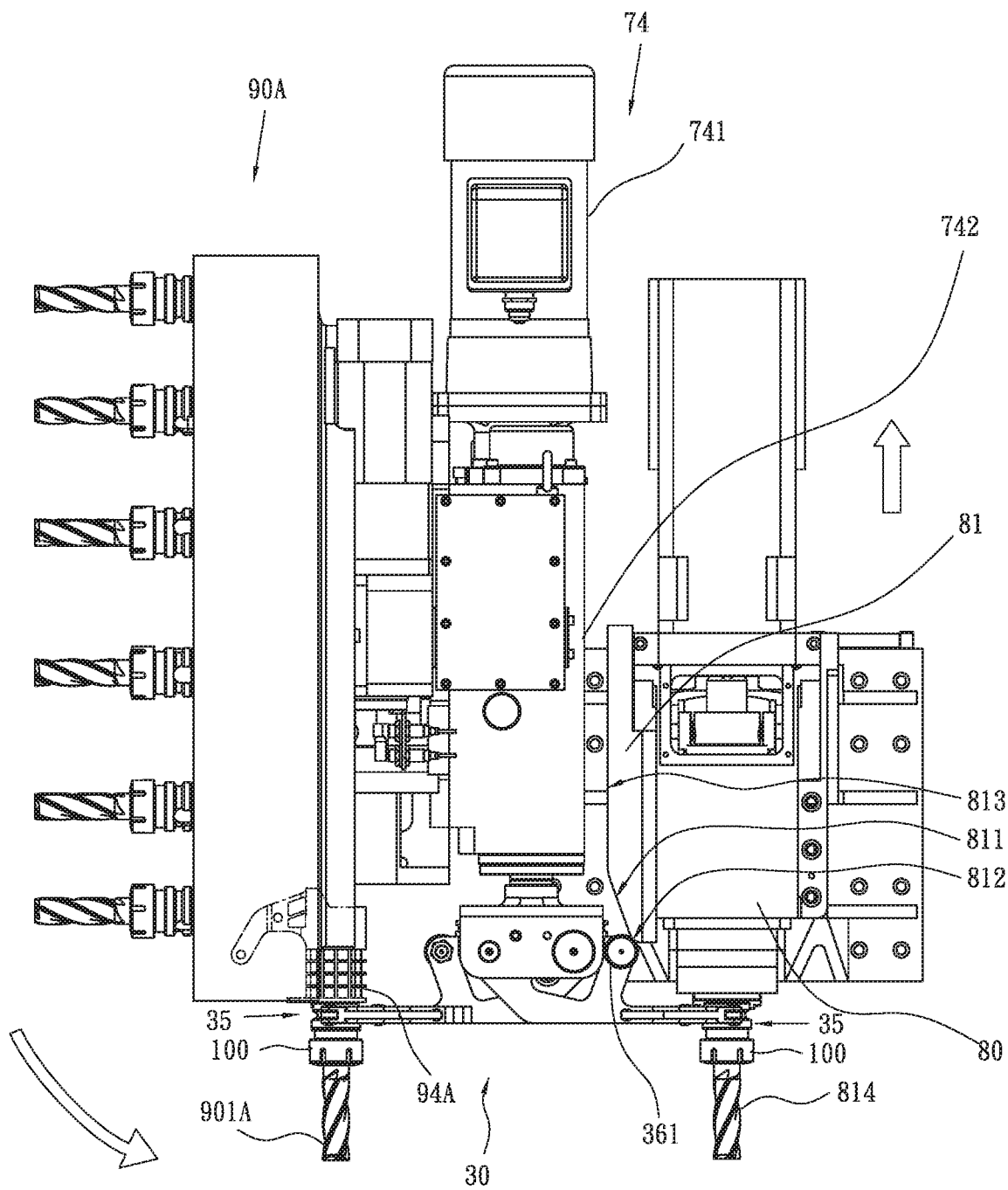

Referring to FIG. 39, when it comes for the main axle 80 to change the main-axle tool 814, it moves upwards and the arm body 33 of the tool change unit 30 follows the abutting engagement relationship between the constraining section 81 and the actuation element 361 to gradually return back to an original position, and when the constraining section 81 moves upwards to a location where the contact starting point 812 abuts the actuation element 361, the main axle 80 does not further move upwards, and the tool bar 100 to which the main-axle tool 814 is mounted is gripped and held by the gripping element 35. On the other hand, a selected magazine tool 901A is also gripped and held by the gripping element 35 on the other side and is set in a ready-for-tool-change state. The drive motor 741 drives the cam box 742 to operate so as to cause the rotational axle 743 to move downwards (as shown in FIG. 40) to complete a tool removal operation. The tool change unit 30 is further driven by the rotational axle 743 for rotation of 180 degrees to exchange the positions of the main-axle tool 814 and the magazine tool 901A (as shown in FIG. 41). Further, due to operation of an internal mechanism of the cam box 742 (this being a known structure and description being omitted herein), the rotational axle 743 drives the tool change unit 30 to move upwards and the tool bars 100 that carry the main-axle tool 814 and the magazine tool 901A could respectively insert into the main axle 80 and the tool receptacle 94A to complete a tool insertion operation (as shown in FIG. 42). The main axle 80 may, due to necessity of machining operation, need to move downwards and the slope-edge section 811 is brought into contact with the actuation element 361, causing the arm body 33 to gradually rotate for downward movement so as not to interfere with the subsequent downward movement of the main axle 80 (as shown in FIG. 43), and the tool receptacle 94A is driven to change from the longitudinal position to the transverse position and to remove the tool bar 100 that is gripped by the gripping element 35 on the other side of the tool change unit 30 and the main-axle tool 814 of which the position has been changed out of the gripping element 35 (as shown in FIG. 44). At this moment, the main axle 80 continues to move downwards, causing the straight-edge section 813 of the constraining section 81 constantly press against the actuation element 361 to keep the arm body 33 in a downward rotated and deflected state. An entire distance provided by the straight-edge section 813 is also set to meet a stroke for upward/downward movement of the main axle 80 necessary for a machining operation to be carried out. The tool magazine 90A will make selection of another one of the magazine tools and rotates, and the tool receptacle 94A of the selected the magazine tool 901A will be driven to change from the transverse position to the longitudinal position and the tool bar 100 of the magazine tool 901A is gripped and held by the gripping element 35 to be once again set in the read-for-tool-change position. The main axle 80 will move upwards again for further necessity of tool change, and before the contact starting point 812 of the constraining section 81 is brought into contact with the actuation element 361, the tool bar 100 that carries the main-axle tool 814 (here, the main-axle tool 814 being the magazine tool 901A that has been previously changed of the position thereof and being designated as 814 for distinguishing) has already been gripped and held by the gripping element 35 on the other side of the tool change unit 30 (as shown in FIG. 45). At this moment, it only needs to carry out the steps of FIGS. 39-44 to repeatedly perform tool change for the main-axle tool 814 and the magazine tool 901A.

It can be appreciated from the above description that the present invention provides the following advantages:

(1) The tool change unit 30, 40, 50, 60 according to each embodiment of the present invention each is equally applicable to tool change performed with upward and downward movement of a main axle 80 or performed with upward and downward movement of a tool change device 70, so that the tool change unit 30, 40, 50, 60 according to each embodiment of the present invention is limited to one specific way of tool change and possess expanded applicability.

(2) The tool change unit 30, 40, 50, 60 according to each embodiment of the present invention, either being applied to tool change performed with upward and downward movement of a main axle 80 or performed with upward and downward movement and rotation of a tool change device 70, requires a rotational path of just 180-degree of rotation for tool change, so as to effectively reduce the time required for tool change.

(3) The two tool arms of the tool change unit 30, 40, 50, 60 according to each embodiment of the present invention are allowed to rotate and move independently, so that the tool arm 32 on the side associated with the main axle 80 is allowed to independently driven by the main axle 80 to rotate downwards during the operation of the main axle 80, while the tool arm 32 on the side associated with the tool magazine is not influenced and may still perform an operation for tool section, this effectively improving the drawbacks of a grip arm type tool magazine.

(4) The tool change unit 30, 40, 50, 60 according to each embodiment of the present invention is applicable to various types of power unit 71, 72, 73, 74, providing flexibility of being used in metalworking machines having various demands for different functions.

I claim:

1. A tool change unit, at least comprising:
a base and two tool arms rotatably mounted on the base, each of the tool arms being located on a respective one of two opposite sides of the base, the base comprising a coupling section adapted to couple to a power unit for rotating the base about a first axis, each of the tool arms comprising a respective arm body, a respective position-returning element, a respective gripping element, and a respective actuation element;

wherein the base comprises a U-shaped body having a top wall and two sidewalls, each sidewall extending downwards from a respective one of two sides of the top wall;

wherein each of the arm bodies has one end forming a respective pivoting end pivotally coupled to the base via a respective axle bar that penetrates both of the two sidewalls, such that each of the arm bodies is pivotable relative to the base about a respective further axis, and each of the arm bodies has a respective opposite end opposite the corresponding pivoting end and forming a respective gripping end that is provided with a respective gripping element;

wherein each of the position-returning elements is arranged between the corresponding arm body and the base so as to connect the corresponding arm body and the base, so that by means of the arrangement of the corresponding position-returning element, each of the arm bodies is rotatable about the corresponding further axis upwards and downwards between a first position and a second position;

wherein each of the gripping elements is formed with a respective opening for gripping and holding a respective tool bar; and wherein each of the actuation elements is mounted on a respective one of the arm bodies and is adapted to be driven by a main tool axle to cause the corresponding arm body to rotate downwards.

2. The tool change unit according to claim 1, further comprising a stop element, wherein the stop element is selectively mounted on one of the arm bodies, positioned between that arm body and the base when that arm body has been rotated upward, so as to enable an adjustment of a degree of levelness of that arm body and the corresponding gripping element.

3. The tool change unit according to claim 1, wherein for each of the arm bodies, a respective curving configuration is formed between the corresponding pivoting end of the respective arm body and a remainder of the respective arm body to define a respective angle.

4. The tool change unit according to claim 1, wherein each of the arm bodies is provided with a respective actuation section that is raised upwards from the corresponding arm body, each of the actuation elements being mounted on a corresponding one of the actuation sections.

5. The tool change unit according to claim 4, wherein each of the position-returning elements comprises:
a respective barrel, a respective compression spring, a respective push rod, and a respective link rod,
each of the barrels being fixed to a side portion of an undersurface of the base,
each of the compression springs being disposed in the corresponding barrel,
each of the push rods having an end pivotally mounted to the corresponding link rod and having an opposite end supported by the corresponding compression spring, a respective end of the corresponding link rod being rotatably mounted on the corresponding actuation section.

6. The tool change unit according to claim 4, wherein each of the actuation elements comprises a respective roller rotatably mounted on the corresponding actuation section.

7. The tool change unit according to claim 1, wherein each of the position-returning elements comprises a respective torsion spring.

8. The tool change unit according to claim 1, wherein each of the position-returning elements comprises a respective extension spring.

9. The tool change unit according to claim 1, wherein each of the position-returning elements comprises a respective pneumatic cylinder.

10. The tool change unit according to claim 1, wherein each of the gripping elements at least comprises:
- a respective two gripping claws,
- a respective compression spring, and
- a respective locking block, the respective locking block being mounted to an end face of the corresponding gripping end in a detachable manner,
- each of the gripping claws having a respective middle portion that is pivotally coupled to a respective side of the corresponding gripping end,
- each of the compression springs being arranged such that each of two ends of each of the compression springs is respectively in abutting engagement with a corresponding one of the gripping claws,
- wherein for each of the gripping elements, the corresponding two gripping claws and the corresponding end face of the corresponding gripping end of the corresponding arm body form therebetween the corresponding opening, such that the two corresponding gripping claws are elastically expandable and retractable to grip and hold, in combination with the corresponding locking block, the corresponding tool bar.

11. A tool change device, at least comprising a tool change unit and a power unit,
- wherein the tool change unit at least comprises:
  - a base and two tool arms rotatably mounted on the base, each of the tool arms being located on a respective one of two opposite sides of the base, the base comprising a coupling section coupled to the power unit so that the power unit is configured to rotate the base about a first axis, each of the tool arms comprising a respective arm body, a respective position-returning element, a respective gripping element, and a respective actuation element;
  - wherein the base comprises a U-shaped both having a top wall and two sidewalls, each sidewall extending downwards from a respective one of two sides of the top wall;
  - wherein each of the arm bodies has one end forming a respective pivoting end pivotally coupled to the base via a respective axle bar that penetrates both of the two sidewalls, such that each of the arm bodies is pivotable relative to the base about a respective further axis, and each of the arm bodies has a respective opposite end opposite the corresponding pivoting end and forming a respective gripping end that is provided with a respective gripping element;
  - wherein each of the position-returning elements is arranged between the corresponding arm body and the base so as to connect the corresponding arm body and the base, so that by means of the arrangement of the corresponding position-returning element, each of the arm bodies is rotatable about the corresponding further axis upwards and downwards between a first position and a second position;
  - wherein each of the gripping elements is formed with a respective opening for gripping and holding a respective tool bar;
  - wherein each of the actuation elements is mounted on a respective one of the arm bodies and is adapted to be driven by a main tool axle to cause the corresponding arm body to rotate downwards; and
  - wherein the power unit at least comprises a rotational axle that is drivable to rotate, the tool change unit being coupled to the rotational axle.

12. The tool change device according to claim 11, wherein the power unit comprises a servomotor, and the rotational axle is connected to the servomotor.

13. The tool change device according to claim 11, wherein the power unit comprises a drive motor and an indexer, the motor being connected to the indexer, the rotational axle being connected to the indexer.

14. The tool change device according to claim 11, wherein the power unit comprises:
- a pneumatic cylinder;
- a servomotor;
- a driving roller;
- a driven roller;
- a belt;
- a driving shaft having an internal toothed section;
- a rotational axle having an external toothed section; and
- a protective cylinder,
- the driving roller being driven by the servomotor to rotate,
- the belt being wound around the driving roller and the driven roller,
- the driven roller being coupled to and fixed to the driving shaft,
- the rotational axle penetrating through the driving shaft,
- the external toothed section of the rotational axle being in mating engagement with the internal toothed section of the driving shaft,
- a top end of the rotational axle being coupled to and fixed to a cylinder rod of the pneumatic cylinder,
- the servomotor driving the rotational axle to rotate,
- the pneumatic cylinder driving the rotational axle to move upwards and downwards,
- the driving shaft and the rotational axle being received in the protective cylinder, and
- a bottom end of the rotational axle being coupled to the tool change unit.

15. The tool change device according to claim 11, wherein the power unit comprises a drive motor and a cam box, the drive motor being coupled to the cam box to drive components of the cam box to operate, the rotational axle being coupled to the cam box so that the cam box drives the rotational axle to move upwards and downwards and rotate.

16. The tool change device according to claim 11, further comprising a circular disc style tool magazine, wherein the circular disc style tool magazine at least comprises:
- a magazine body;
- a rotation disc;
- multiple tool receptacles mounted on the rotation disc for rotation with the rotation disc about a rotation disc rotation axis, the multiple tool receptacles being arranged annularly;
- a driving device; and
- an upward-downward push-pull device;
- the magazine body being provided, on one side thereof, with a protruding ring that protrudes axially in the direction of the rotation disc rotation axis;
- the rotation disc comprising:
  - a through hole;
  - multiple rotation bearings arranged in an annular form, and
  - multiple driving bearings annularly arranged along an outer circumference of the annular form of the rotation bearings, the rotation bearings being located closer to the through hole than are the driving bearings, wherein the annularly arranged multiple rotation bearings being fit over the protruding ring of the magazine body and being rotatable and rolling on the protruding ring;

the driving device being coupled to and fixed to the magazine body and located on a side of the magazine body that is opposite to the side of the magazine body at which the protruding ring is located, and the driving device comprising a driving section drivable to rotate, the driving section being set in abutting engagement with each of the driving bearings, so that the driving section, when rotating, drives the rotation disc to rotate forward or backward;

the upward-downward push-pull device comprising a push-pull section, the push-pull section being drivable to move upwards and downwards;

each of the tool receptacles comprising a respective receptacle body having a respective longitudinal direction, each of the receptacle bodies having a respective first end from which a respective constraining section extends transversely to the corresponding longitudinal direction, each of the constraining sections being provided with a respective roller rotatably mounted thereto, each of the top ends of the receptacle bodies being provided, with a respective axle bar projecting outward therefrom to pivotally couple to the rotation disc, each of the receptacle bodies having a respective second end that is made in a hollowed form, each of the receptacle bodies being of a partially covering form and including a respective opening formed in one side of the corresponding receptacle body and in communication with an area outside of the corresponding receptacle body, wherein each of the openings has a respective top end that is formed as a narrowed opening having a reduced diameter as compared to a diameter of an interior of the corresponding receptacle body, wherein each of the narrowed openings is in communication with the corresponding interior of the corresponding receptacle body, wherein a respective positioning section is formed inwardly of the corresponding one of each of the narrowed openings, wherein each of the receptacle bodies includes a respective inner surface, wherein for each of the receptacle bodies, a respective gripping section is provided to each of two sides of the corresponding inner surface; and wherein when the rotation disc rotates about the rotation disc rotation axis, each of the rollers of each of the tool receptacles passes through the push-pull section of the upward-downward push-pull device and is pushed and pulled in upwards and downward directions to pivot the corresponding tool receptacle relative to the rotation disc.

17. The tool change device according to claim 16, wherein each of the gripping sections of the tool receptacles has a respective gripping section first end and an opposite respective gripping section second end, each gripping section first end being formed with a respective open slot that is extended in the longitudinal direction of the corresponding receptacle body toward and connected to the respective gripping section second end, each of the open slots having a respective external end in communication with the outside area, each of the open slots having a respective internal end formed with a respective expanded slot, each of the expanded slots being also extended in the longitudinal direction of the corresponding receptacle body toward and connected to the respective gripping section second end, wherein the two gripping sections of each of the receptacle bodies are expandable upon application of a force thereto and returnable back to an original form upon removal of the force.

18. The tool change device according to claim 11, further comprising a chain style tool magazine, wherein the chain style tool magazine at least comprises:

a power roller;

a driven roller;

a chain wound around the power roller and the driven roller;

multiple tool receptacles rotatably mounted on the chain; and an upward-downward push-pull device, each of the tool receptacles comprising a respective receptacle body having a respective longitudinal direction, each of the receptacle bodies having a respective first end from which a respective constraining section extends transversely to the corresponding longitudinal direction, each of the constraining sections being provided with a respective roller rotatably mounted thereto, each of the top ends of the receptacle bodies being provided with a respective axle bar projecting outward therefrom to pivotally couple to the chain, each of the receptacle bodies having a respective second end that is made in a hollowed form, each of the receptacle bodies being of a partially covering form and including a respective opening formed in one side of the corresponding receptacle body and in communication with an area outside of the corresponding receptacle body, wherein each of the openings has a respective top end that is formed as a narrowed opening having a reduced diameter as compared to a diameter of an interior of the corresponding receptacle body, wherein each of the narrowed openings is in communication with the corresponding interior of the corresponding receptacle body, wherein a respective positioning section is formed inwardly of the corresponding one of each of the narrowed openings, wherein each of the receptacle bodies includes a respective inner surface, wherein for each of the receptacle bodies, a respective gripping section is provided to each of two sides of the corresponding inner surface; and wherein the power roller drives the chain and the driven roller to rotate in unison therewith so as to drive the tool receptacles to circulate in unison therewith, the upward-downward push-pull device pushing and pulling each of the tool receptacles to rotate relative to the chain.

19. The tool change device according to claim 18, wherein each of the gripping sections of the tool receptacles has a respective gripping section first end and an opposite respective gripping section second end, each gripping section first end being formed with a respective open slot that is extended in the longitudinal direction of the corresponding receptacle body toward and connected to the respective gripping section second end, each of the open slots having a respective external end in communication with the outside area, each of the open slots having a respective internal end formed with a respective expanded slot, each of the expanded slots being also extended in the longitudinal direction of the corresponding receptacle body toward and connected to the respective gripping section second end, wherein the two gripping sections of each of the receptacle bodies are expandable upon application of a force thereto and returnable back to an original form upon removal of the force.

20. A tool change device, at least comprising a tool change unit and a power unit,
wherein the tool change unit at least comprises:
a base and two tool arms rotatably mounted on the base, each of the tool arms being located on a respective one of two opposite sides of the base, the base comprising a coupling section coupled to the power unit so that the power unit is configured to rotate the base about a first axis, each of the tool arms comprising a respective arm body, a respective position-returning element, a respective gripping element, and a respective actuation element;
wherein each of the arm bodies has one end forming a respective pivoting end pivotally coupled to the base such that each of the arm bodies is pivotable relative to the base about a respective further axis, and each of the arm bodies has a respective opposite end opposite the corresponding pivoting end and forming a respective gripping end that is provided with a respective gripping element;
wherein each of the position-returning elements is arranged between the corresponding arm body and the base so as to connect the corresponding arm body and the base, so that by means of the arrangement of the corresponding position-returning element, each of the arm bodies is rotatable about the corresponding further axis upwards and downwards between a first position and a second position;
wherein each of the gripping elements is formed with a respective opening for gripping and holding a respective tool bar;
wherein each of the actuation elements is mounted on a respective one of the arm bodies and is adapted to be driven by a main tool axle to cause the corresponding arm body to rotate downwards; and
wherein the power unit at least comprises a rotational axle that is drivable to rotate, the tool change unit being coupled to the rotational axle,
the tool change device further comprising a circular disc style tool magazine, wherein the circular disc style tool magazine at least comprises:
a magazine body;
a rotation disc;
multiple tool receptacles mounted on the rotation disc for rotation with the rotation disc about a rotation disc rotation axis, the multiple tool receptacles being arranged annularly;
a driving device; and
an upward-downward push-pull device;
the magazine body being provided, on one side thereof, with a protruding ring that protrudes axially in the direction of the rotation disc rotation axis;
the rotation disc comprising:
a through hole;
multiple rotation bearings arranged in an annular form, and
multiple driving bearings annularly arranged along an outer circumference of the annular form of the rotation bearings, the rotation bearings being located closer to the through hole than are the driving bearings,
wherein the annularly arranged multiple rotation bearings being fit over the protruding ring of the magazine body and being rotatable and rolling on the protruding ring;
the driving device being coupled to and fixed to the magazine body and located on a side of the magazine body that is opposite to the side of the magazine body at which the protruding ring is located, and the driving device comprising a driving section drivable to rotate, the driving section being set in abutting engagement with each of the driving bearings, so that the driving section, when rotating, drives the rotation disc to rotate forward or backward;
the upward-downward push-pull device comprising a push-pull section, the push-pull section being drivable to move upwards and downwards;
each of the tool receptacles comprising a respective receptacle body having a respective longitudinal direction, each of the receptacle bodies having a respective first end from which a respective constraining section extends transversely to the corresponding longitudinal direction, each of the constraining sections being provided with a respective roller rotatably mounted thereto, each of the top ends of the receptacle bodies being provided with a respective axle bar projecting outward therefrom to pivotally couple to the rotation disc, each of the receptacle bodies having a respective second end that is made in a hollowed form, each of the receptacle bodies being of a partially covering form and including a respective opening formed in one side of the corresponding receptacle body and in communication with an area outside of the corresponding receptacle body, wherein each of the openings has a respective top end that is formed as a narrowed opening having a reduced diameter as compared to a diameter of an interior of the corresponding receptacle body, wherein each of the narrowed openings is in communication with the corresponding interior of the corresponding receptacle body, wherein a respective positioning section is formed inwardly of the corresponding one of each of the narrowed openings, wherein each of the receptacle bodies includes a respective inner surface, wherein for each of the receptacle bodies, a respective gripping section is provided to each of two sides of the corresponding inner surface; and
wherein when the rotation disc rotates about the rotation disc rotation axis, each of the rollers of each of the tool receptacles passes through the push-pull section of the upward-downward push-pull device and is pushed and pulled in upwards and downward directions to pivot the corresponding tool receptacle relative to the rotation disc.

* * * * *